(12) United States Patent
Jang

(10) Patent No.: US 12,210,209 B2
(45) Date of Patent: Jan. 28, 2025

(54) CAMERA ACTUATOR AND CAMERA MODULE COMPRISING SAME

(71) Applicant: LG INNOTEK CO., LTD., Seoul (KR)

(72) Inventor: Dae Sik Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 905 days.

(21) Appl. No.: 17/281,765

(22) PCT Filed: Oct. 11, 2019

(86) PCT No.: PCT/KR2019/013334
§ 371 (c)(1),
(2) Date: Mar. 31, 2021

(87) PCT Pub. No.: WO2020/076112
PCT Pub. Date: Apr. 16, 2020

(65) Prior Publication Data
US 2021/0389551 A1 Dec. 16, 2021

(30) Foreign Application Priority Data

Oct. 11, 2018 (KR) .................. 10-2018-0121007

(51) Int. Cl.
*G02B 27/64* (2006.01)
*G02B 7/02* (2021.01)
(Continued)

(52) U.S. Cl.
CPC .............. *G02B 7/09* (2013.01); *G02B 7/021* (2013.01); *G02B 27/646* (2013.01); *G03B 5/00* (2013.01);
(Continued)

(58) Field of Classification Search
CPC . G02B 7/021; G02B 7/09; G02B 7/10; G02B 7/18; G02B 7/1805; G02B 27/64;
(Continued)

(56) References Cited

U.S. PATENT DOCUMENTS 7,531,773 B2  5/2009  Westerweck et al.
10,310,290 B2  6/2019  Yu et al.
(Continued)

FOREIGN PATENT DOCUMENTS

CN  108141518 A  6/2018
JP  2008-191647 A  8/2008
(Continued)

OTHER PUBLICATIONS

Office Action dated Mar. 23, 2022 in Chinese Application No. 201980067181.0.
(Continued)

*Primary Examiner* — Clayton E. LaBalle
*Assistant Examiner* — Fang-Chi Chang
(74) *Attorney, Agent, or Firm* — SALIWANCHIK, LLOYD & EISENSCHENK

(57) ABSTRACT

An embodiment relates to a camera actuator and a camera module comprising same. A camera actuator according to an embodiment may comprise: a housing; a base which is coupled to the housing and on which a lens assembly is disposed; a shaper unit disposed in the housing; a first driving part coupled to the shaper unit; and a prism unit coupled to the housing. The housing may comprise a housing body having an opening formed therethrough and a housing side part extending from the housing body. The first driving part may be disposed to overlap with the prism unit in the direction vertical to an optical axis.

18 Claims, 38 Drawing Sheets

(51) Int. Cl.
*G02B 7/09* (2021.01)
*G03B 5/00* (2021.01)

(52) U.S. Cl.
CPC ............... *G03B 2205/0007* (2013.01); *G03B 2205/003* (2013.01); *G03B 2205/0046* (2013.01); *G03B 2205/0069* (2013.01)

(58) Field of Classification Search
CPC .......... G02B 27/646; G03B 5/00; G03B 5/02; G03B 2205/0007; G03B 2205/0023; G03B 2205/003; G03B 2205/0046; G03B 2205/0053; G03B 2205/0069
See application file for complete search history.

(56) References Cited

U.S. PATENT DOCUMENTS

| | | |
|---|---|---|
| 10,516,773 B2 | 12/2019 | Yoon et al. |
| 10,678,062 B2 | 6/2020 | Im et al. |
| 10,884,321 B2 | 1/2021 | Jerby et al. |
| 2008/0144198 A1 | 6/2008 | Sato |
| 2009/0046376 A1 | 2/2009 | Westerweck et al. |
| 2018/0239161 A1 | 8/2018 | Seol et al. |
| 2018/0367714 A1* | 12/2018 | Im .................. H04N 23/687 |
| 2020/0355910 A1* | 11/2020 | Smolka ............. G02B 26/0833 |

FOREIGN PATENT DOCUMENTS

| | | |
|---|---|---|
| KR | 10-2013-0041283 A | 4/2013 |
| KR | 10-2018-0041040 A | 4/2018 |
| KR | 10-2018-0092251 A | 8/2018 |
| KR | 10-2018-0095420 A | 8/2018 |
| KR | 10-2018-0096073 A | 8/2018 |
| WO | WO-2018/130898 A1 | 7/2018 |

OTHER PUBLICATIONS

Office Action dated May 19, 2023 in Korean Application No. 10-2018-0121007.
International Search Report dated Jan. 23, 2020 in International Application No. PCT/KR2019/013334.

* cited by examiner

CAMERA ACTUATOR AND CAMERA MODULE COMPRISING SAME

CROSS-REFERENCE TO RELATED APPLICATIONS

This application is the U.S. national stage application of International Patent Application No. PCT/KR2019/013334, filed Oct. 11, 2019, which claims the benefit under 35 U.S.C. § 119 of Korean Application No. 10-2018-0121007, filed Oct. 11, 2018, the disclosures of each of which are incorporated herein by reference in their entirety.

TECHNICAL FIELD

Embodiments relate to a camera actuator and a camera module including the same.

BACKGROUND ART

A camera module performs a function of photographing a subject and storing the subject as an image or a moving image, and is mounted on a mobile terminal such as a mobile phone, a laptop, a drone, a vehicle, and the like.

A camera actuator is a product that quickly focuses by moving a lens in the camera module up, down, left, and right. Ultra-slim or ultra-thin issues, low power consumption, and low cost are major technical issues in the camera actuator.

Such a camera module is applied to a mobile camera module, a camera module for a vehicle, or the like.

The mobile camera module is an essential part for taking and storing pictures in a mobile device such as a smart phone and a tablet PC. The mobile camera module converts light entering a lens into an electrical signal using an image sensor, outputs pictures to a device display through software, and then allows a user to view and store the pictures.

In addition, the mobile camera module may detect movement of an object, such as a person's facial expression and hand gestures, and may operate a digital device, thereby expanding an application area to an input device.

In the mobile camera module, there are technical issues of realization of a high-performance module such as camera-shake correction or wide-angle optical system in addition to ultra-small and ultra-thin issues.

Next, the camera module for the vehicle is a product for transmitting a video around the vehicle or inside the vehicle to a display, and may be mainly used in a parking assistance and a driving assistance system.

In addition, the camera module for the vehicle detects lanes and vehicles around the vehicle and collects and transmits related data, so that the camera module for the vehicle may warn from ECU or control the vehicle.

Meanwhile, an ultra-small mobile camera module is built into a portable device such as a smartphone, a tablet PC, and a laptop, and such a mobile camera module may perform an autofocus function adjusting automatically a distance between an image sensor and a lens to adjust a focal length of the lens.

Recently, a camera module may perform a zooming function of zooming up or zooming out photographing a subject by increasing or decreasing a magnification of a long-distance subject through a zoom lens.

In addition, recently, a camera module adopts an image stabilization (IS) technology to correct or inhibit image shake caused by camera movement due to an unstable fixing device or user movement. Such a IS technology includes an optical image stabilizer (OIS) technology and an image stabilization technology using an image sensor.

The OIS technology is a technology that corrects movement by changing a light path, and the image stabilization technology using the image sensor is a technology that corrects movement by mechanical and electronic methods, but the OIS technology is often used.

Meanwhile, in an image sensor, as a pixel is higher, a resolution increases and a size of the pixel becomes smaller, and when the size of the pixel becomes smaller, an amount of light received at the same time will be reduced. Therefore, in a darker environment, in a high-pixel camera, image shake due to camera shake that occurs while a shutter speed is slower occurs more seriously.

Accordingly, recently, an OIS function has been indispensable for photographing an image without deformation using a high-pixel camera in dark nights or moving images.

Meanwhile, OIS technology is a method to correct image quality by changing an optical path by moving a lens or an image sensor of a camera. In particular, in the OIS technology, movement of the camera is sensed through a gyro sensor, and a distance that the lens or the image sensor should move based on the movement is calculated.

For example, an OIS correction method includes a lens moving method and a module tilting method. In the lens moving method, only a lens in a camera module is moved in order to realign the center of an image sensor and an optical axis. On the other hand, the module tilting method is a method of moving the entire module including the lens and the image sensor.

Specifically, the module tilting method has an advantage that a correction range is wider than that of the lens moving method and a focal length between the lens and the image sensor is fixed, and thus image deformation may be minimized.

Meanwhile, in case of the lens moving method, a hall sensor is used to sense a position and movement of the lens. On the other hand, in the module tilting method, a photo reflector is used to sense movement of the module. However, both methods use a gyro sensor to sense movement of a user of the camera.

An OIS control unit uses data recognized by the gyro sensor to predict a position in which the lens or the module should move in order to compensate for movement of a user.

Meanwhile, as described above, a camera module is applied to vehicles together with a radar, and may be used for an advanced driver assistance system (ADAS), which may greatly affect the safety and life of drivers and pedestrians as well as convenience for the driver.

For example, an advanced driver assistance system (ADAS) include an autonomous emergency braking system (AEB) that reduces speed or stops by itself even if a driver does not step on a brake in an event of a collision, a lane keep assist system (LKAS) that maintains a lane by controlling a traveling direction when leaving the lane, an advanced smart cruise control (ASCC) that maintains a distance from a vehicle ahead while running at a predetermined speed, an active blind spot detection system (ABSD) that detects the danger of blind spot collision and helps to change to a safe lane, and an around view monitor system (AVM) that visually displays a situation around a vehicle.

In such an advanced driver assistance system (ADAS), a camera module functions as a core component together with a radar and the like, and a portion in which the camera module is applied is gradually increasing.

For example, in case of an autonomous emergency braking system (AEB), a vehicle or a pedestrian in front of a vehicle is detected by a camera sensor and a radar sensor in front of the vehicle, so that emergency braking may be automatically performed when a driver does not control the vehicle.

Alternatively, in case of a lane keep assist system (LKAS), it detects through a camera sensor whether a driver leaves a lane without operating a turn signal, and automatically steers a steering wheel, so that it may control to maintain the lane.

In case of an around view monitor system (AVM), it may display visually a situation around a vehicle through a camera sensor disposed on four sides of the vehicle.

Meanwhile, FIG. 1 is a view showing a camera module 10 according to the related art.

The conventional camera module 10 in which the OIS technology is adopted has a lens unit 12 mounted in an actuator 11, and since a mechanical driving device is required for moving a lens or tilting the module, there is a problem that a structure is complicated.

In addition, in the related art, a driving element 16 or a gyro sensor 15 should be mounted on a circuit board 13, so that there is a limit in implementing an ultra-small camera module. For example, as shown in FIG. 1, in the camera module 10 structure in which the conventional OIS technology is adopted, since the gyro sensor 15 or the driving element 16 is disposed in a horizontal direction of the camera module 10, a size of the entire camera module increases, and thus it is difficult to implement the ultra-small camera module.

Meanwhile, as described above, when a camera module is applied to an advanced driver assistance system (ADAS) of a vehicle, OIS technology is more important due to vibration of the vehicle, and a precision of OIS data may be directly related to the safety or life of drivers and pedestrians.

In addition, referring to FIG. 1, the conventional OIS technology may implement AF or Zoom at the same time as OIS driving, but a magnet for OIS and a magnet for AF or Zoom are disposed close to each other due to space limitation of a camera module and a position of a driving part of the conventional OIS technology, and cause a magnetic field interference, and thus there is a problem that the OIS driving is not performed normally, and a decent or a tilt phenomenon is induced, which causes problems with the accuracy of OIS data and affects the safety and life of drivers and pedestrians.

In addition, in the related art, the circuit board 13 includes a flexible printed circuit board (Flexible PCB) 13a and a rigid printed circuit board (Rigid PCB) 13b, and the gyro sensor 15 may be disposed on the Rigid PCB 13b. However, in order to increase the accuracy of data in OIS driving, the flatness of the gyro sensor is important, but there is a problem that it is difficult to reach a required accuracy level.

In addition, according to the related art, since the gyro sensor is disposed to be spaced apart from the camera module 10, it is difficult to accurately detect a degree of movement of the camera module according to the movement of the user. For example, when the camera module 10 is rotated around the gyro sensor 15 by the user, a difference between a degree of movement of the gyro sensor 15 and a degree of movement of the actuator 11 or the lens unit 12 becomes large, and thus there is a problem that the accuracy of angular acceleration data is lowered.

In addition, recently, an ultra-slim and ultra-small camera module is required in accordance with technological trends, but since the ultra-small camera module has a space limitation for OIS drive, there is a problem that it is difficult to implement the OIS function applied to a general large camera, and there is a problem that the ultra-slim and ultra-small camera module cannot be implemented when the OIS drive is applied.

In addition, in the conventional OIS technology, an OIS driver is disposed at a side surface of a solid-state lens assembly within a limited camera module size, and thus there is a problem that it is difficult to secure a sufficient amount of light because a size of a lens to be subjected to OIS is limited.

Specifically, in order to achieve the best optical characteristics in a camera module, an alignment between the lens groups at the time of OIS implementation should be well matched through movement of a lens or tilting of a module, but in the conventional OIS technology, when a decenter in which a spherical center between the lens groups deviates from an optical axis or a tilt which is a phenomenon of lens tilt occurs, there is a problem that adversely affects image quality or resolution.

In addition, in the conventional OIS technology, since a mechanical driving device is required for moving the lens or tilting the module, there is a problem that a structure is complicated and power consumption is increased.

DISCLOSURE

Technical Problem

An object of an embodiment is directed to providing an ultra-small and ultra-slim camera actuator and a camera module including the same.

In addition, an object of the embodiment is directed to providing a camera actuator capable of implementing OIS technology with high data precision when a vehicle vibration occurs when a camera module is applied to an advanced driver assistance system (ADAS) of a vehicle, and a camera module including the same.

In addition, an object of the embodiment is directed to providing a camera actuator capable of inhibiting a magnetic field interference with a magnet for AF or Zoom when the OIS is implemented, and a camera module including the same.

In addition, an object of the embodiment is directed to providing a camera actuator capable of securing high accuracy of a gyro sensor by securing a high flatness of the gyro sensor, and a camera module including the same.

In addition, an object of the embodiment is directed to providing a camera actuator capable of remarkably improving the accuracy of a gyro sensor by reducing an error rate due to temperature drift while improving the accuracy of angular acceleration by disposing the gyro sensor close to the camera module in relation to arrangement of the gyro sensor of the camera module, and a camera module including the same.

In addition, an object of the embodiment is directed to providing a camera actuator that may secure a sufficient amount of light by eliminating lens size limitation of an optical system lens assembly when OIS is implemented, and a camera module including the same.

In addition, an object of the embodiment is directed to providing a camera actuator capable of achieving the best optical characteristics and a camera module including the same by minimizing occurrence of a decenter or tilt phenomenon when the OIS is implemented.

In addition, an object of the embodiment is directed to providing a camera actuator capable of implementing the OIS with low power consumption, and a camera module including the same.

The objects of the embodiments are not limited to those described in this item, but include those that may be understood from the description of the invention.

Technical Solution

A camera actuator according to an embodiment may include a housing 210, a base 20 coupled to the housing 210 and on which a lens assembly is disposed, a shaper unit 222 disposed in the housing 210, a first driving part 72M coupled to the shaper unit 222, and a prism unit 230 coupled to the housing 210.

The housing 210 may include a housing body 212 having an opening and a housing side portion 214P extending from the housing body 212.

The first driving part 72M may be disposed to overlap the prism unit 230 in a direction perpendicular to an optical axis.

The embodiment may further include a guide pin 50 coupled to the base 20, a third driving part 140 including a coil and disposed on the base 20, and a fourth driving part 160 including a magnet and moving along the guide pin 50.

The first driving part 72M may be a magnet driving part, and the second driving part 72C may be a coil driving part.

The first driving part 72M, which is the magnet driving part, may be disposed in a first side direction of the housing 210, and the fourth driving part 160, which is the magnet driving part, may be disposed on the base 20 disposed in a direction opposite to the first side direction.

In addition, the camera actuator according to the embodiment may include a first camera actuator 100 that performs a zooming function, and a second camera actuator 200 that is disposed on one side of the first camera actuator 100 and performs an OIS function.

The first camera actuator 100 may include the third driving part 140 including the base 20 on which an optical system is disposed, the guide pin 50 coupled to the base 20, and the coil and disposed on the base 20, and the fourth driving part 160 including the magnet and moving along the guide pin 50.

The second camera actuator 200 may include the first driving part 72M including the housing, 210, the shaper unit 222 and the magnet disposed in the housing 210, the second driving part 72C including the coil on the housing 210 outside the first driving part 72M and disposed therein, and the prism unit 230 disposed on the shaper unit 222.

The third driving part 140 may be a coil driving part, and may include a third-first driving part 141 and a third-second driving part 142.

The fourth driving part 160 may include a first magnet 116 and a second magnet 126.

The first driving part 72M may be a magnet driving part, and the second driving part 72C may be a coil driving part.

The first driving part 72M, which is the magnet driving part, may be disposed in the first side direction of the housing 210 in the second camera actuator 200, and the fourth driving part 160 including the first magnet 116 and the second magnet 126 is disposed in the first camera actuator 100 disposed in the direction opposite to the first side direction.

The shaper unit 222 may include a shaper body 222a, a protrusion 222b extending laterally from the shaper body 222a and coupled to the first driving part 72M, and a lens unit 222c disposed on the shaper body 222a.

The second camera actuator 200 may include the prism unit 230 disposed on an image shaking control unit 220 and including a fixed prism 232.

The lens unit 222c of the second camera actuator 200 may include a light transmitting support part 222c2, a tunable prism 222cp, or a liquid lens, and a second light transmitting support part (not shown).

The lens unit 222c may also function as a prism for changing a path of light.

The first camera actuator 100 may include a second circuit board 412 disposed on a sidewall of the base 20, and a gyro sensor 151 disposed on the second circuit board 412.

The second circuit board 412 may be disposed extending in a vertical axis direction on a horizontal coordinate plane perpendicular to an optical axis.

The first camera module 1000A may further include a shield can 510 on an outer surface of the base 20 of the first camera actuator 100.

The shield can 510 may include a predetermined support bracket 513, and a guide groove 513R in which the second circuit board 412 is disposed in the support bracket 513.

The gyro sensor 151 may be spaced apart from the second camera actuator 200 to be disposed perpendicular to a side surface of the first camera actuator 100.

A camera module according to an embodiment may include an image sensor unit and the camera actuator disposed on one side of the image sensor unit.

Advantageous Effects

According to the embodiment, there is a technical effect that it is possible to provide a camera actuator capable of inhibiting a magnetic field interference with a magnet for AF or Zoom and a camera module including the same when the OIS is implemented.

For example, according to the embodiment, when the OIS is implemented, the first driving part 72M, which is a magnet driving part, is disposed on the second camera actuator 200 separated from the first camera actuator 100, and thus there is a technical effect that that it is possible to provide a camera actuator capable of inhibiting a magnetic field interference with a magnet for AF or Zoom and a camera module including the same.

Thus, according to the embodiment, when a vehicle vibration occurs when a camera module is applied to an advanced driver assistance system (ADAS) of a vehicle, it is possible to provide a camera actuator capable of implementing OIS technology with high data precision and a camera module including the same.

For example, according to the embodiment, when the camera module is applied to the advanced driver assistance system (ADAS) of the vehicle, the first driving part 72M, which is a magnet driving part, is disposed on the second camera actuator 200, so that a magnetic field interference with the first magnet 116 or the second magnet 126 for AF or Zoom of the first camera actuator 100 may be inhibited, and accordingly, it is possible to provide a camera actuator capable of implementing OIS technology with high data precision when vehicle vibration occurs, and a camera module including the same.

For example, according to the embodiment, the first driving part 72M, which is the magnet driving part, is disposed in a first side direction of the housing 210 in the second camera actuator 200, and the fourth driving part 160 including the first magnet 116 and the second magnet 126 is disposed in the first camera actuator 100 disposed in a direction opposite to the first side direction so that magnetic field interference between the first driving part 72M and the fourth driving part 160 is inhibited, and accordingly, there is a technical effect capable of implementing OIS technology with high data precision when vehicle vibration occurs.

In addition, the embodiment has effect that it is possible to provide an ultra-small and ultra-thin camera actuator and a camera module including the same. For example, according to the embodiment, a gyro sensor 151 is disposed on a circuit board that is disposed to extend in a direction perpendicular to a horizontal coordinate axis (x-axis) direction and horizontal to an optical axis (z-axis) direction, and a size of the camera actuator is controlled to a level of a horizontal width of a base, and accordingly, it is possible to implement the ultra-small and ultra-thin camera actuator and the camera module including the same.

For example, in the conventional internal technology, a gyro sensor was disposed on a circuit board disposed to extend from the camera actuator in the horizontal coordinate axis (x-axis) direction, and a horizontal width of the corresponding circuit board reached about 3 mm to 4 mm, but in the embodiment, since a horizontal region of the circuit board may be reduced by about 25% or more by reducing the horizontal width of the circuit board, there is a technical effect that it is possible to implement an ultra-small and ultra-thin camera actuator and a camera module including the same.

In addition, according to the embodiment, as the circuit board on which the gyro sensor 151 is disposed in a guide groove 513R of a support bracket 513 is fixedly disposed firmly, the flatness of the gyro sensor 151 can be highly secured, and accordingly, there is a complex technical effect that it is possible provide an ultra-small camera actuator and a camera module including the same while securing high precision of the gyro sensor.

In addition, according to the embodiment, as the circuit board on which the gyro sensor 151 is disposed in a guide groove 513R of a support bracket 513 is fixedly disposed firmly, the flatness of the gyro sensor 151, and accordingly, there is a complex technical effect that it is possible provide an ultra-small camera actuator and a camera module including the same while securing high precision of the gyro sensor.

For example, in the camera module of the embodiment, the shield can 510 is provided with the support bracket 513, and the support bracket 513 includes the guide groove 513R in which the circuit board is disposed, so that the circuit board is fixedly disposed firmly in the guide groove 513R of the support bracket 513, and accordingly, there is a special technical effect that it is possible to secure a high flatness and to provide an ultra-small and ultra-slim camera actuator and a camera module including the same.

In addition, in relation to the disposition of the gyro sensor of the camera module, the gyro sensor 151 is disposed close to the camera module to improve the accuracy of angular acceleration and simultaneously, to reduce the error rate due to temperature drift, and accordingly there is a complex technical effect that it is possible to remarkably improve the precision of the gyro sensor and to provide an ultra-small camera module.

For example, as shown in the embodiment, the shield can 510 is provided with the support bracket 513, and the support bracket 513 includes the guide groove 513R in which the circuit board is disposed, so that the circuit board is fixedly disposed firmly in the guide groove 513R of the support bracket 513, and accordingly, the gyro sensor 151 is disposed close to the camera module to improve the accuracy of angular acceleration and simultaneously, is disposed to be spaced apart from the image sensor, which generates a lot of heat, to reduce the error rate due to temperature drift, and accordingly, there is a complex technical effect that it is possible to remarkably improve the precision of the gyro sensor and to provide an ultra-small camera module.

Meanwhile, in the related art, there was a technical problem that an error occurs in the degree of movement of the lens unit and the degree of movement sensed by the gyro sensor according to the user's movement as the gyro sensor is disposed to be spaced apart from the lens unit. For example, when the camera module rotates around the gyro sensor, there is a problem that a difference between the degree of movement of the gyro sensor and the degree of movement of the lens unit increases, and thus the accuracy of angular acceleration data is lowered.

However, according to the embodiment, an error in the degree of movement of the lens unit and the degree of movement sensed by the gyro sensor according to the user's movement is remarkably reduced as the gyro sensor 251 is disposed close to the side surface of the base 20 on which the lens unit is disposed, and accordingly, there is a special technical effect that it is possible to remarkably improve the accuracy of angular acceleration of the gyro sensor.

In addition, according to the embodiment, there is also a complex technical effect of shielding EMI, EMC, noise and the like by the support bracket 513 in addition to the shielding effect of the shield can 510.

In addition, a camera actuator and a camera module according to the embodiment solve a problem of lens decenter or tilt generation during zooming, and align a plurality of lens groups well to inhibit a change in an angle of view or occurrence of defocusing, and thus there is a technical effect that image quality or resolution is significantly improved.

In addition, according to the embodiment, there is a technical effect that it is possible to solve a problem of generating friction torque during zooming. For example, according to the embodiment, regions other than the first pin guide part 112$p$1 and the second pin guide part 112$p$2 are removed from an upper region of the first driving part housing 112$b$ in which the first guide pin 51 is positioned to reduce the weight of the first driving part housing 112$b$, so that frictional resistance is reduced by reducing friction torque, and accordingly, there are technical effects such as improvement of driving force, reduction of power consumption, and improvement of control characteristics during zooming.

Accordingly, according to the embodiment, there is a complex technical effect that image quality or resolution may be improved remarkably by inhibiting occurrence of a decenter of a lens and tilt of the lens, while minimizing the friction torque during zooming.

In addition, according to the embodiment, there is a technical effect that a zooming function can be smoothly performed even in a compact camera module. For example, according to the embodiment, a compact camera module may be implemented by disposing the hall sensor in the internal region of the first coil part to reduce a region occupied by the hall sensor.

In addition, according to the embodiment, there is a technical effect that it is possible to provide an ultra-slim and ultra-small camera actuator and a camera module including the same.

For example, according to the embodiment, the image shaking control unit 220 is disposed so as to utilize a space below the prism unit 230 and overlap each other, and accordingly, there is a technical effect that it is possible to provide an ultra-slim and ultra-small camera actuator and a camera module including the same.

In addition, according to the embodiment, there is a technical effect that it is possible to provide a camera actuator capable of securing a sufficient amount of light and a camera module including the same by eliminating lens size limitation of an optical system lens assembly when the OIS is implemented.

For example, according to the embodiment, lens size limitation of an optical system lens assembly is eliminated when implementing the OIS by disposing the image shaking control unit 220 under the prism unit 230, and thus there is a technical effect that it is possible to provide a camera actuator capable of securing a sufficient amount of light and a camera module including the same.

In addition, according to the embodiment, there is a technical effect that it is possible to provide a camera actuator capable of achieving the best optical characteristics and a camera module including the same by minimizing occurrence of a decenter or tilt phenomenon when the OIS is implemented.

For example, according to the embodiment, the image shaking control unit 220 stably disposed on the housing 210 is provided, and a shaper unit 222 and a first driving part 72M are included, and thus there is a technical effect that it is possible to provide a camera actuator capable of achieving the best optical characteristics and a camera module including the same by minimizing occurrence of a decenter or tilt phenomenon when the OIS is implemented through a lens unit 222c including a tunable prism 222cp.

In addition, according to the embodiment, there is a technical effect that it is possible to provide a camera actuator capable of implementing the OIS with low power consumption and a camera module including the same.

For example, according to the embodiment, unlike the conventional method of moving a plurality of solid lenses, the OIS is implemented by driving the shaper unit 222 through the lens unit 222c including the tunable prism, the first driving part 72M which is a magnet driving part, and the second driving part 72C which is a coil driving part, and thus there is a technical effect that it is possible to provide a camera actuator capable of implementing the OIS with low power consumption and a camera module including the same.

In addition, according to the embodiment, the prism unit 230 and the lens unit 222c including the tunable prism may be disposed very close to each other, and thus there is a special technical effect that even though the change in the optical path is made fine in the lens unit 222c, the change in the optical path may be widely secured in an actual image sensor unit.

For example, according to the embodiment, the prism unit 230 and the lens unit 222c including the tunable prism may be disposed very close to each other, and it is possible to secure a relatively long distance between the lens unit 222c and an image plane 190P of a first lens assembly (not shown). Accordingly, it is possible to secure widely a first distance D1δ reflected on the image plane 190P according to a slope change of a predetermined angle Θ in the tunable prism 222cp, and thus there is a special technical effect that even though the change in the optical path is made fine in the lens unit 222c, the change in the optical path may be widely secured in the actual image sensor unit.

That is, in the embodiment, when the first protrusion 222b1 and the second protrusion 222b2 of the shaper unit 222 are spaced apart from each other, and the third protrusion 222b3 and the fourth protrusion 222b4 are spaced from each other, each protrusion moves on the x-axis or y-axis, it may have less influence on other protrusions, and thus there is a special technical effect that the change amount in error that occurs is remarkably reduced compared to the target value (ideal) when driving in each axial direction, and performance is improved. (see FIG. 22)

In addition, in the embodiment, a jig hole (ZH) may be provided in the housing 210, and during an assembly process of the second camera actuator 200, the assembly process may be performed in a state in which a predetermined jig is firmly coupled to the jig hole (ZH) of the housing 210. At this time, the jig may pass through the jig hole (ZH) and protrude upward from the housing 210, and the shaper unit 222 may be firmly disposed on the protruding jig. The first to fourth jigs may be disposed to overlap the first to fourth protrusions 222b1, 222b2, 222b3, and 222b4 of the shaper body in a vertical direction. Thereafter, the first driving part 72M, the second driving part 72C, and the like may be firmly coupled to the shaper unit 222, and there is a special technical effect capable of remarkably inhibiting the occurrence of a tilt (hereinbefore, see FIG. 26B).

The technical effects of the embodiments are not limited to those described in this item, but include those that may be understood from the entire description of the invention.

MODES OF THE INVENTION

Figure 1:
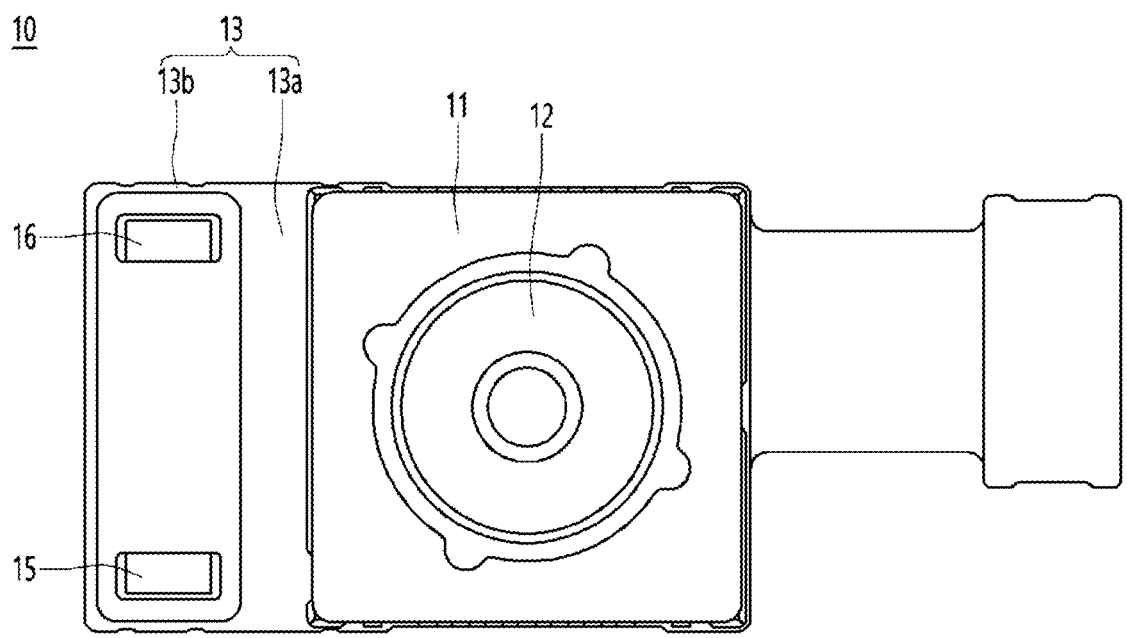
FIG. 1 is a view showing a camera module according to the related art.

Hereinafter, embodiments will be described in detail with reference to the accompanying drawings. While the invention may be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

Although the terms "first," "second," etc. may be used to describe various elements, these elements should not be limited by these terms. These terms are only used to distinguish one element from another. In addition, terms defined specially in consideration of a configuration and operation of the embodiment are only for describing the embodiment, and do not limit the scope of the embodiment.

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element.

FIRST EMBODIMENT

Figure 2:
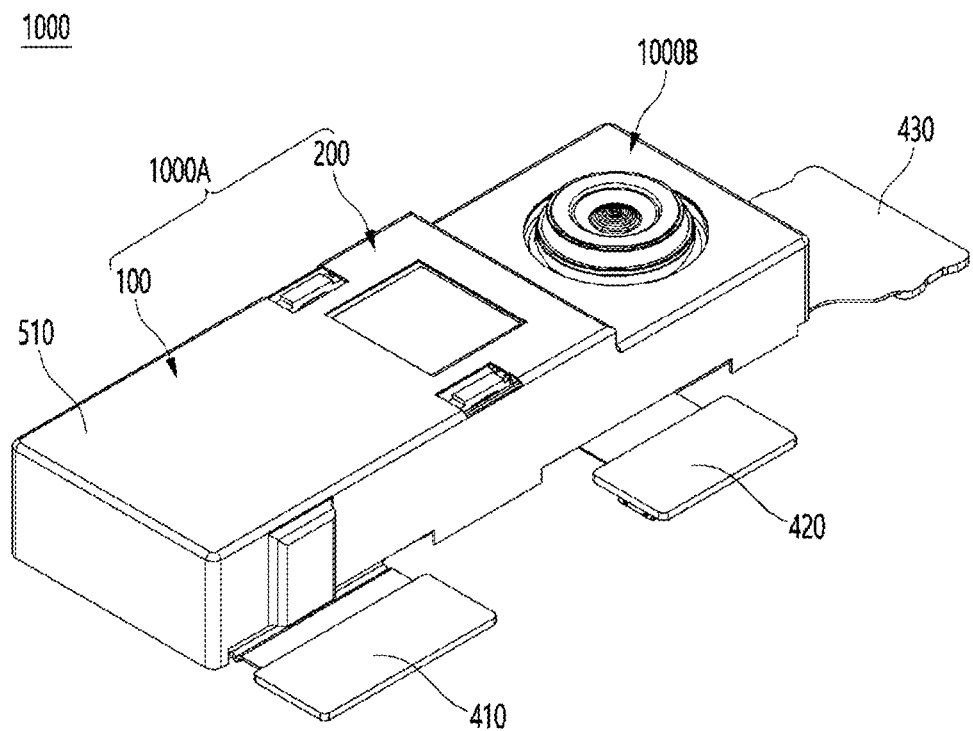
FIG. 2 is a perspective view showing a camera module of an embodiment.
Figure 3A:
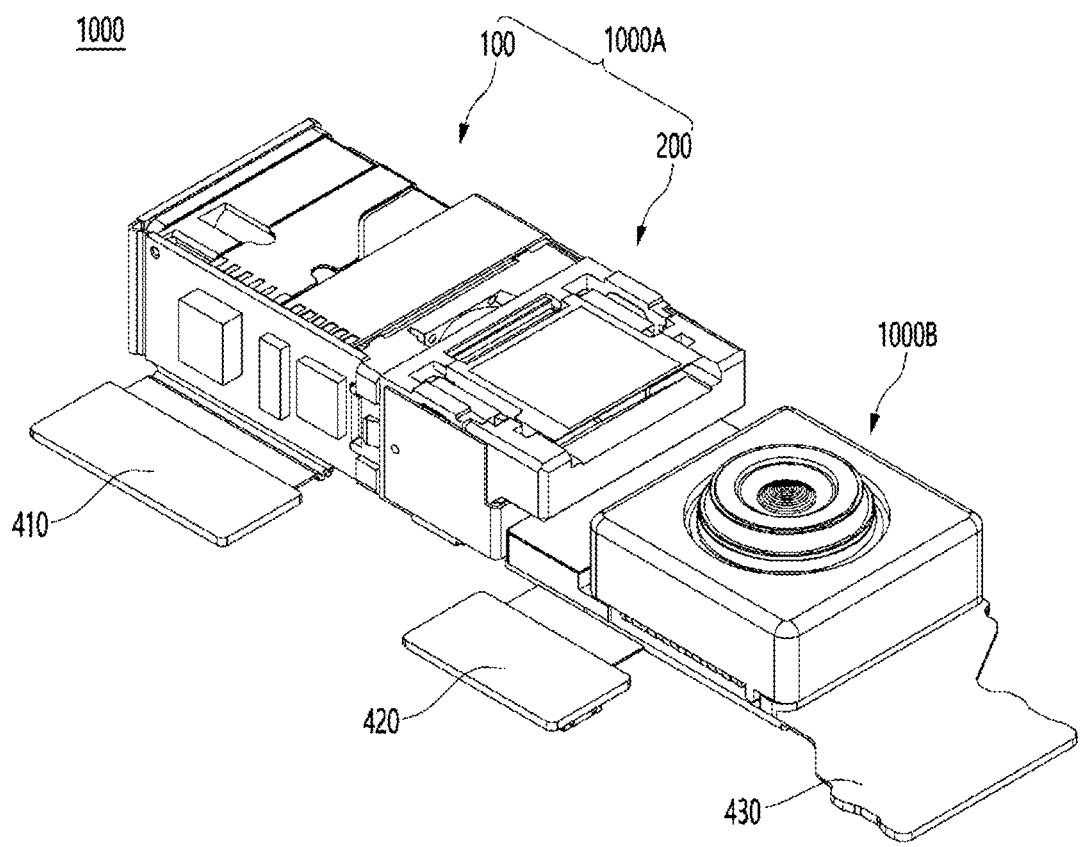
FIG. 3A is a perspective view of a shield can removed from the camera module of the embodiment shown in FIG. 2.
Figure 3B:
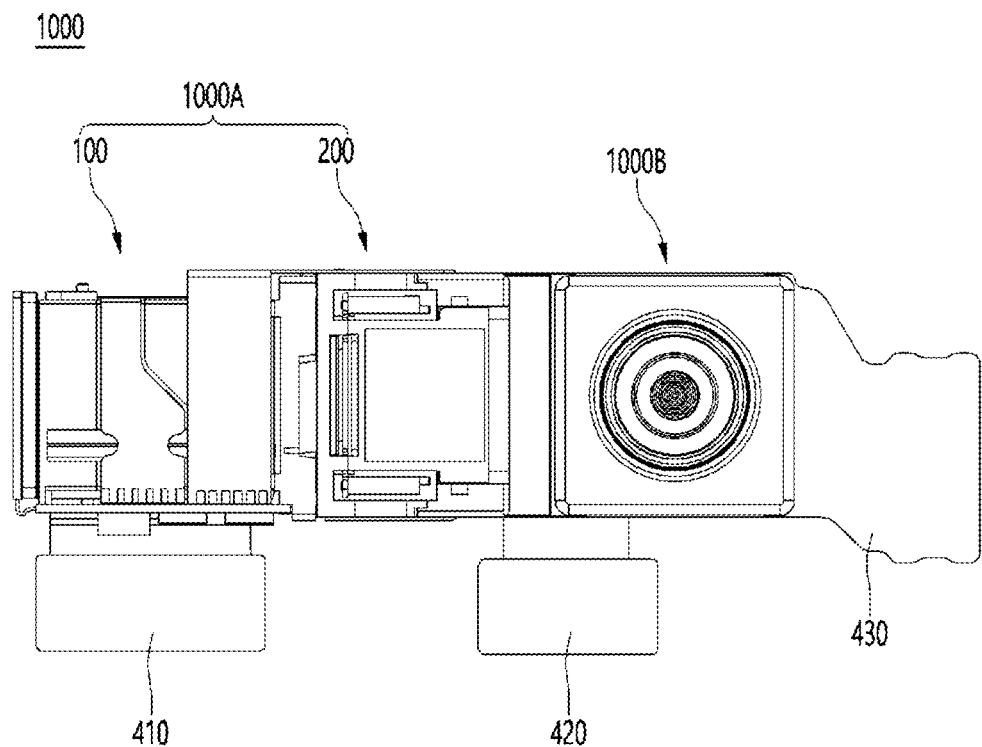
FIG. 3B is a plan view of the camera module of the embodiment shown in FIG. 3A.

FIG. 2 is a perspective view showing a camera module 1000 of an embodiment, FIG. 3A is a perspective view of a shield can 510 removed from the camera module 1000 of the embodiment shown in FIG. 2, and FIG. 3B is a plan view of the camera module 1000 of the embodiment shown in FIG. 3A.

First, referring to FIG. 2, the camera module 1000 according to the embodiment may include a single or a plurality of camera modules. For example, the embodiment may include a first camera module 1000A and a second camera module 1000B. The first camera module 1000A and the second camera module 1000B may be covered by a predetermined shield can 510.

Referring to FIGS. 2, 3A, and 3B together, in an embodiment, the first camera module 1000A may include a single or a plurality of camera actuators. For example, the first camera module 1000A of the embodiment may include a first camera actuator 100 and a second camera actuator 200.

The first camera actuator 100 may be electrically connected to a circuit board 410 of a first group, the second camera actuator 200 may be electrically connected to a circuit board 420 of a second group, and the second camera module 1000B may be electrically connected to a circuit boards 430 of a third group.

The first camera actuator 100 may be a zoom actuator or an auto focus (AF) actuator, and may be electrically connected to the circuit board 410 of the first group. For example, the first camera actuator 100 may support one or a plurality of lenses through a predetermined driving part, and may perform an auto focusing function or a zoom function by moving the lens up and down in response to a control signal from a predetermined control unit.

The second camera actuator 200 may be an optical image stabilizer (OIS) actuator, and may be electrically connected to the circuit board 420 of the second group. The circuit board 420 of the second group may be electrically connected to the circuit board 410 of the first group.

Meanwhile, the second camera module 1000B may have a fixed focal length lens disposed in a predetermined barrel (not shown), and may be electrically connected to the circuit board 430 of the third group. The fixed focal length lens may be referred to as a "single focal length lens" or a "single lens".

In the second camera module 1000B, an actuator (not shown) capable of driving a lens unit may be disposed in a predetermined housing (not shown). The actuator may be a voice coil motor, a micro actuator, a silicon actuator, or the like, and may be applied in various ways, such as an electrostatic method, a thermal method, a bimorph method, and an electrostatic force method, but the embodiment is not limited thereto.

Figure 4A:
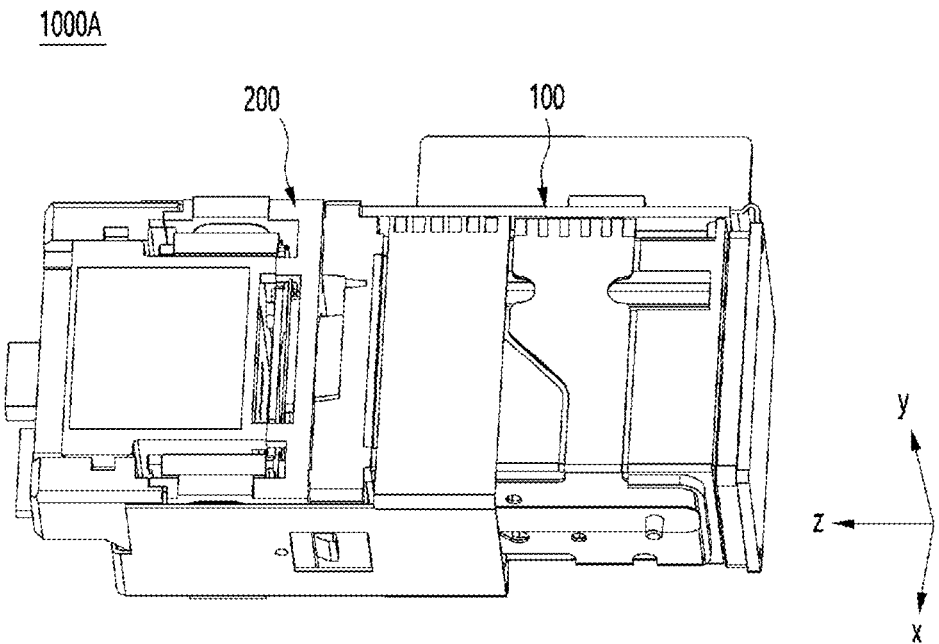
FIG. 4A is a perspective view of a first camera module of the embodiment shown in FIG. 3A in a second direction.
Figure 4B:
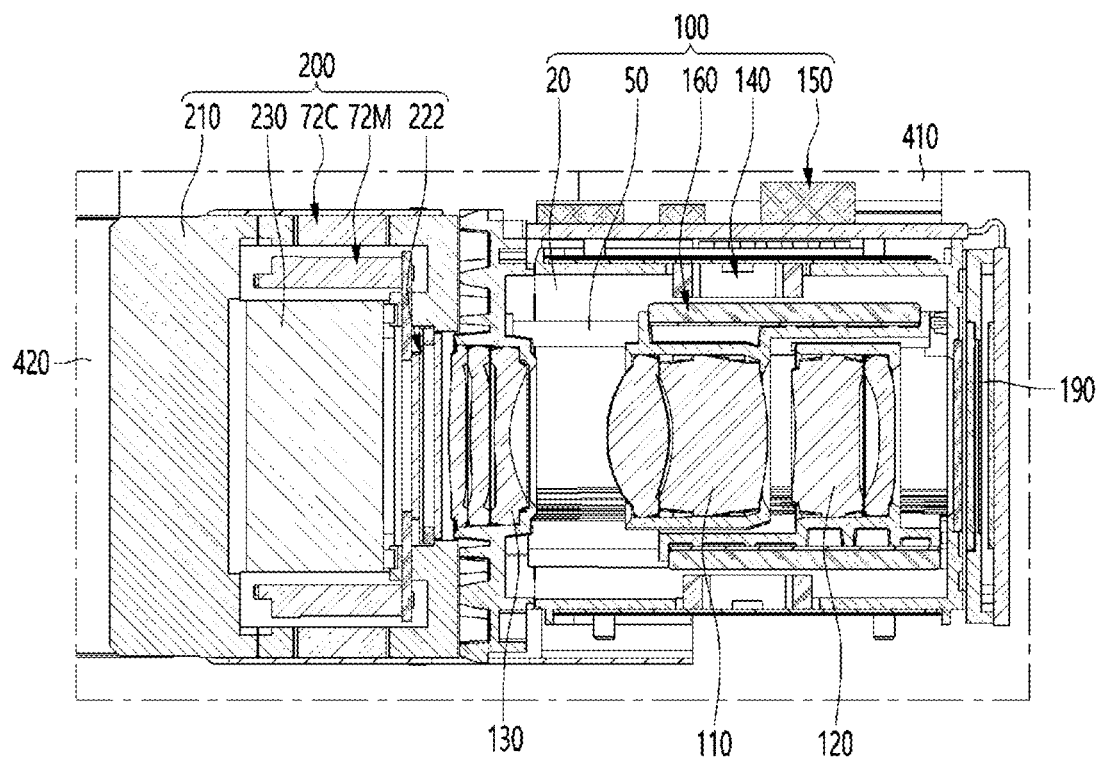
FIG. 4B is a cross-sectional view of the first camera module of the embodiment shown in FIG. 4A.

Next, FIG. 4A is a perspective view of the first camera module 1000A of the embodiment shown in FIG. 3A in a second direction, and FIG. 4B is a side cross-sectional view of the first camera module 1000A of the embodiment shown in FIG. 4A.

Referring to FIG. 4A, the first camera module 1000A according to the embodiment may include the first camera actuator 100 performing a zooming function or an AF function, and the second camera actuator 200 disposed on one side of the first camera actuator 100 and performing an OIS function.

Referring to FIG. 4B, in the first camera actuator 100, an optical system and a lens driving part may be disposed on a base 20. For example, in the first camera actuator 100 according to the embodiment, at least one or more of a first lens assembly 110, a second lens assembly 120, a third lens group 130, and a guide pin 50 may be disposed on the base 20.

In addition, the first camera actuator 100 according to the embodiment may include a third driving part 140 and a fourth driving part 160 to perform a high magnification zooming function. The third driving part 140 may be a coil driving part, and the fourth driving part 160 may be a magnet driving part.

For example, in the embodiment, the first lens assembly 110 and the second lens assembly 120 may be moving lenses that move through the third driving part 140, the fourth driving part 160, and the guide pin 50, and the third lens group 130 may be a fixed lens, but the embodiment is not limited thereto.

For example, in the embodiment, the first lens assembly 110 and the second lens assembly 120 may be driven by electromagnetic force due to interaction with the third driving part 140 and the fourth driving part 160, respectively. Thus, the camera actuator and the camera module according to the embodiment solve a problem of lens decenter or tilt generation during zooming, and align a plurality of lens groups well to inhibit a change in an angle of view or occurrence of defocusing, and thus there is a technical effect that image quality or resolution is remarkably improved.

In addition, the first camera actuator 100 of the embodiment may include the circuit board 410 of the first group disposed outside the base 20 and an element unit 150 including a gyro sensor. In the embodiment, a predetermined image sensor unit 190 may be disposed perpendicular to an optical axis direction of parallel light.

Next, in the embodiment, the second camera actuator 200 may include a housing 210, a shaper unit 222 and a first driving part 72M disposed in the housing 210, a second driving part 72C disposed on the housing 210 outside the first driving part 72M, and a prism unit 230 disposed on the shaper unit 222. The first driving part 72M may be a magnet driving part, and the second driving part 72C may be a coil driving part. The second camera actuator 200 may be electrically connected to the circuit board 420 of the second group.

Accordingly, according to the embodiment, there is a technical effect that it is possible to provide a camera actuator capable of achieving the best optical characteristics and a camera module including the same by minimizing occurrence of a decenter or tilt phenomenon when the OIS is implemented through controlling a lens unit including the shaper unit 222 and the first driving part 72M which are stably disposed on the housing 210, and a tunable prism disposed on the shaper unit 222 by electromagnetic force due to interaction between the first driving part 72M and the second driving part 72C.

In addition, according to the embodiment, there is a technical effect that it is possible to provide a camera actuator capable of inhibiting a magnetic field interference with a magnet for AF or Zoom and a camera module including the same when the OIS is implemented.

For example, according to the embodiment, when the OIS is implemented, the first driving part 72M, which is a magnet driving part, is disposed in the second camera actuator 200 separated from the first camera actuator 100, and thus there is a technical effect that it is possible to provide a camera actuator capable of inhibiting a magnetic field interference with a magnet for AF or Zoom and a camera module including the same.

Hereinafter, features of the first camera actuator 100 according to the embodiment will be described in detail with reference to the drawings of FIGS. 5A to 11B, and features of the second camera actuator 200 will be described with reference to the drawings of FIG. 14A and below.

Figure 5A:
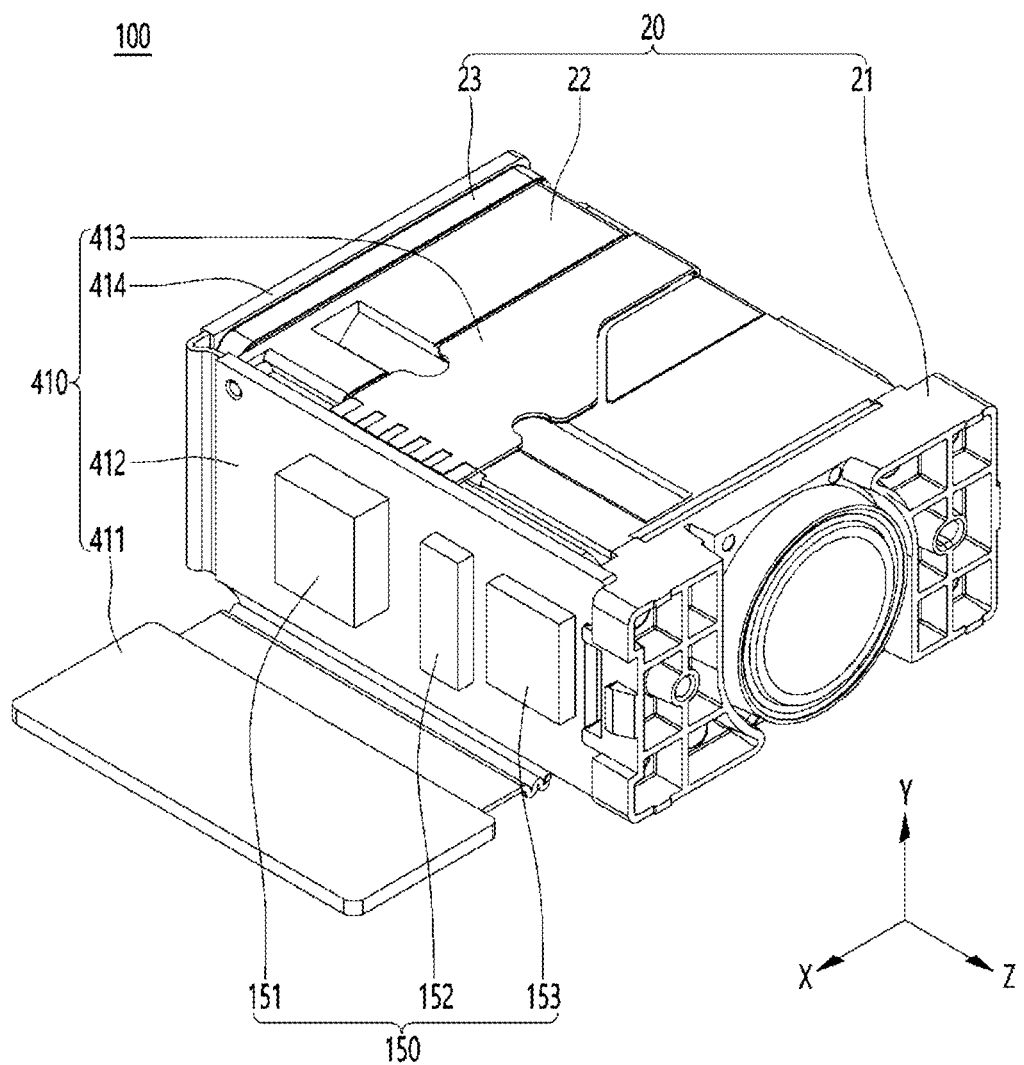
FIG. 5A is a perspective view of a first camera actuator of the embodiment shown in FIG. 3A in a first direction.
Figure 5B:
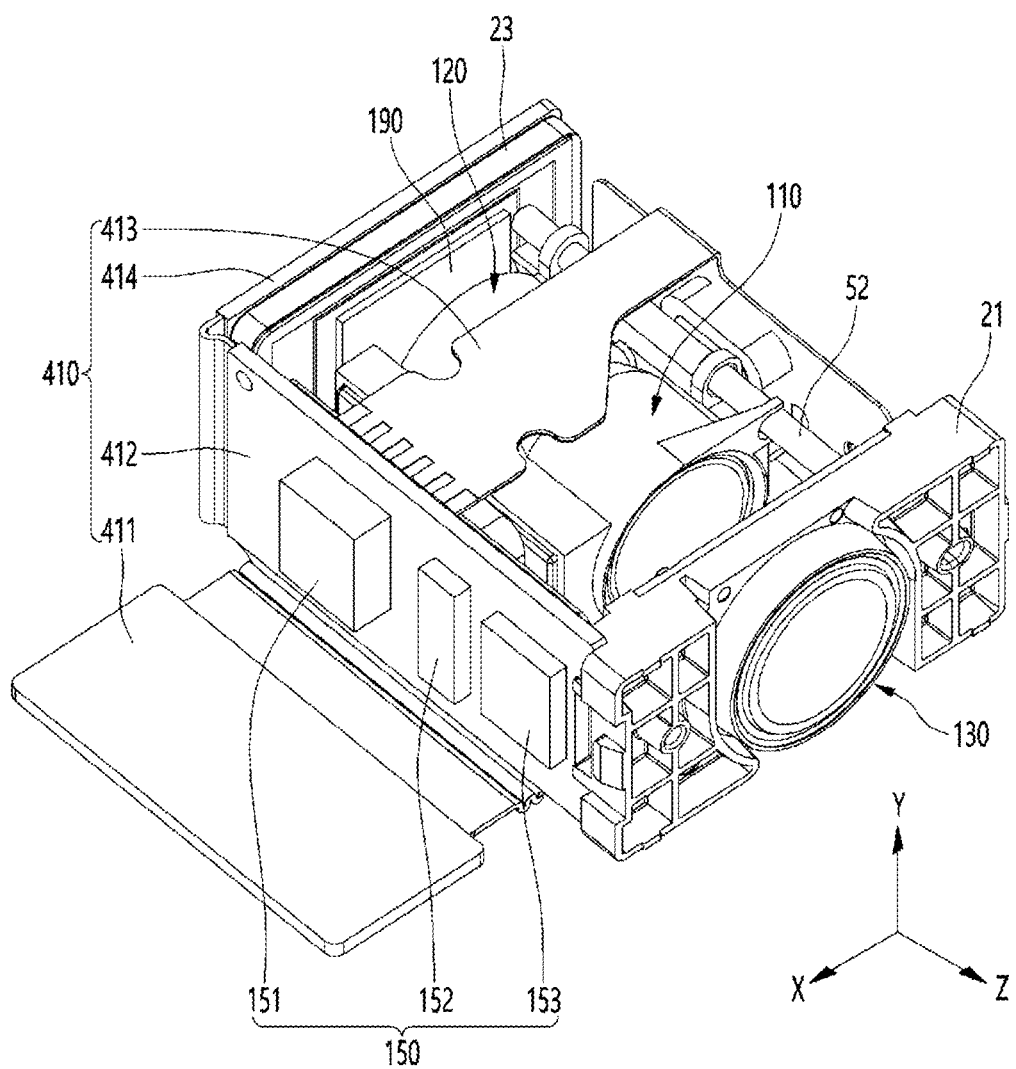
FIG. 5B is a perspective view in which a part of a base in the first camera actuator of the embodiment shown in FIG. 5A is removed.

First, FIG. 5A is a perspective view in a first direction of the first camera actuator 100 of the embodiment shown in FIG. 3A, and FIG. 5B is a perspective view in which a part of the base 20 in the first camera actuator 100 of the embodiment shown in FIG. 5A is removed.

Figure 5C:
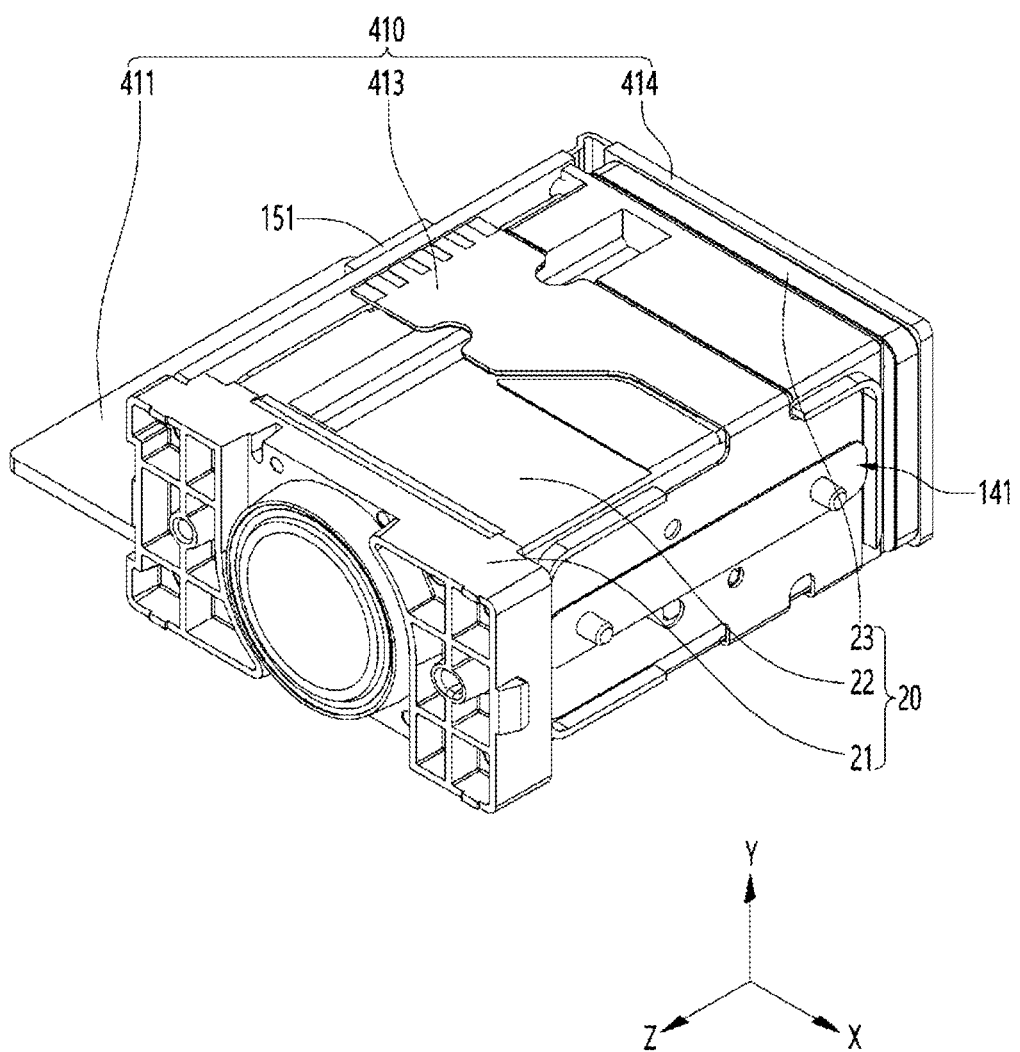
FIG. 5C is a perspective view of the first camera actuator of the embodiment shown in FIG. 3A in the second direction.
Figure 5D:
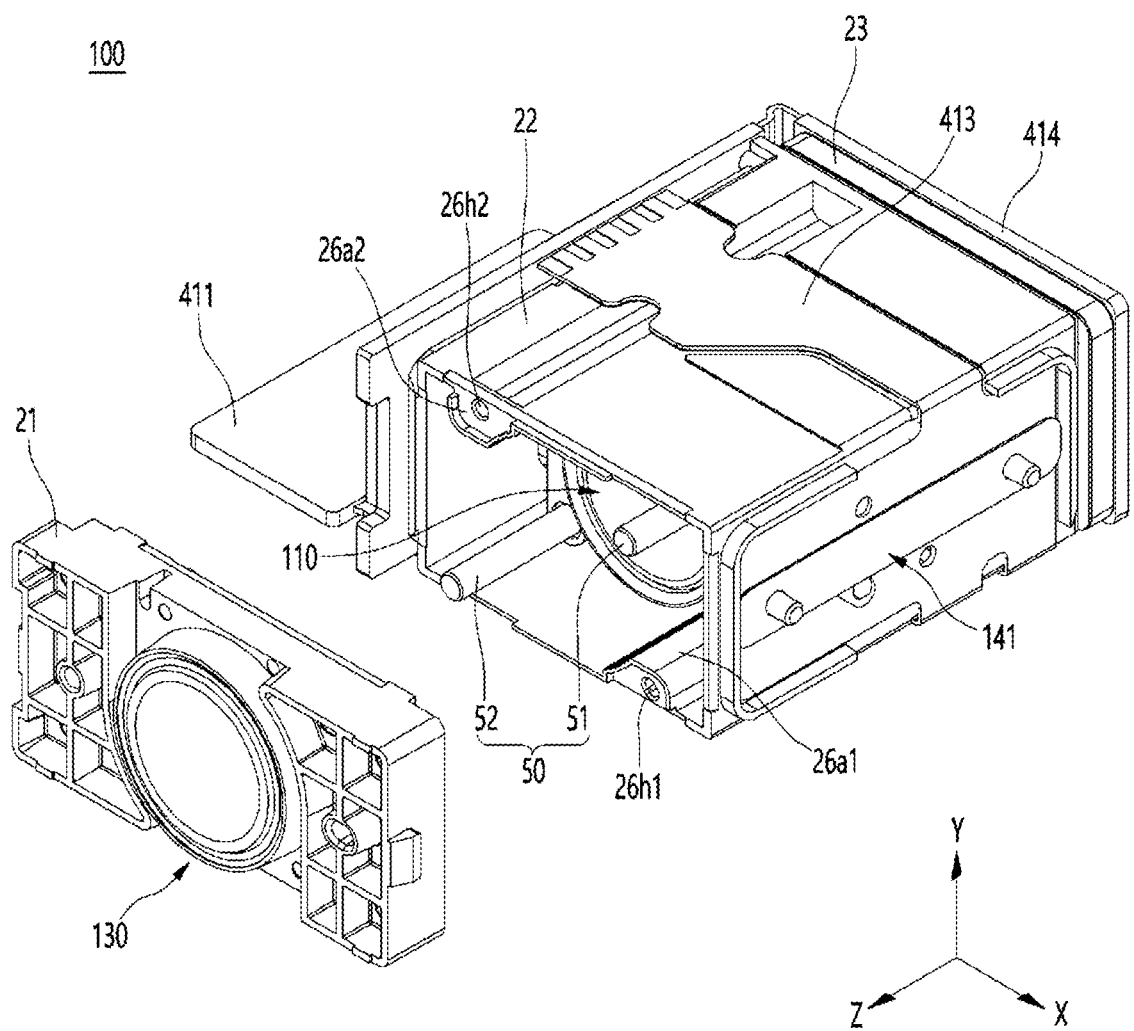
FIG. 5D is an exploded perspective view of the first camera actuator of the embodiment shown in FIG. 5C.

In addition, FIG. 5C is a perspective view of the first camera actuator 100 of the embodiment shown in FIG. 5A in a second direction, and FIG. 5D is an exploded perspective view of the first camera actuator 100 of the embodiment shown in FIG. 5C.

For example, FIG. 5A is a perspective view in which the element unit 150 including a gyro sensor 151 may be seen in front of the first camera actuator 100, and on the other hand, FIG. 5C is a perspective view of the first camera actuator 100 in which the gyro sensor 151 is disposed on a rear surface thereof.

In an xyz-axis direction shown in FIGS. 5A, 5B, 5C and 5D, a z-axis may refer to an optic axis direction or a direction parallel thereto, an xz plane represents the ground, an x-axis may refer to a direction perpendicular to the z-axis on the ground (xz plane), and a y-axis may refer to a direction perpendicular to the ground.

Referring to FIGS. 5A and 5B, in the camera module of the embodiment, the first camera actuator 100 may include the base 20 and the circuit board of the first group 410 and the element unit 150 disposed outside the base 20.

The base 20 may include a base body 22, a first cover 21 disposed on one side of the base body 22, and a second cover 22 disposed on the other side of the base body 22.

The base 20 may be formed of one or more of plastic, glass-based epoxy, polycarbonate, metal, and a composite material.

In the embodiment, the base 20 may be designed in a master barrel structure surrounding the entire zoom module for foreign matter protection, stray light blocking, pin fixing, and lens fixing, but the embodiment is not limited thereto. The first cover 21 and the second cover 22 may be coupled to the base body 22 by shape fitting or an adhesive.

Referring to FIGS. 5A and 5B, the circuit board 410 of the first group may include a single or multiple circuit boards. For example, the circuit board 410 of the first group may include a first circuit board 411, a second circuit board 412, a third circuit board 413, and a fourth circuit board 414.

The second circuit board 412 may be electrically connected to the first circuit board 411 and have the gyro sensor 151 sensing a movement, a first electronic element 152, and a second electronic element 153 disposed thereon. The first electronic element 152 may be a driver IC, and the second electronic element 153 may be an EEPROM, but the embodiment is not limited thereto.

The third circuit board 413 may be electrically connected to a driving part driving the lens unit, and an image sensor 190 (see FIG. 5B) may be disposed on the fourth circuit board 414.

Next, referring to FIG. 5B, various optical systems such as the first lens assembly 110, the second lens assembly 120, and the third lens group 130 may be disposed on the base body 22, a first side surface of the base 20 may be coupled to the first cover 21 in the optical axis direction, and the other side surface of the base 20 may be coupled to the second cover 22. A predetermined image sensor unit 190 may be disposed in a direction of the second cover 22.

Next, referring to FIGS. 5C and 5D, in an embodiment, the first cover 21 and the second cover 22 may be coupled to the guide pin 50. For example, the guide pin 50 may include a first guide pin 51 and a second guide pin 52 disposed to be spaced apart from each other in parallel with the optical axis. One ends of the first guide pin 51 and the second guide pin 52 and the other end of the first cover 21 may be coupled and fixed to the second cover 22.

In an embodiment, the first cover 21 may include a first hook (not shown) and a second hook (not shown) protruding from a first cover body (not shown) in the direction of the base body 22 and disposed in a diagonal direction.

In addition, the base body 22 has a first hook coupling part 26a1 and a second hook coupling part 26a2 disposed at positions corresponding to the first hook and the second hook, and a first hole 26h1 and a second hole 26h2 may be disposed in the first hook coupling part 26a1 and the second hook coupling part 26a2, respectively.

The first hook and the second hook of the first cover 21 may be coupled to the first hole 26h1 and the second life hole 26h2 of the base body 22, respectively. Further, the first cover 21 may be stably coupled to the base body 22 using the adhesive.

In addition, the first cover 21 may include a first pin coupling part (not shown) and a second pin coupling part (not shown) that are respectively coupled to the first guide pin 51 and the second guide pin 52, and the first guide pin 51 and the second guide pin 52 may be inserted and coupled thereto, respectively.

In addition, the third lens group 130 may be disposed on the first cover 21. The third lens group 130 may be a fixed lens, but the embodiment is not limited thereto.

The first lens assembly 110 and the second lens assembly 120 (see FIG. 6) may be disposed inside the base body 22.

According to the embodiment, a bottom groove (not shown) in which the first lens assembly 110 and the second lens assembly 120 move may be formed in parallel in the optical axis (z) direction in a bottom surface of the base body 22. The bottom groove may be a concave shape downward according to an outer circumferential shape of the lens, but the embodiment is not limited thereto.

Subsequently, referring to FIG. 5D, in the embodiment, the third driving part 140 may be disposed on the base body 22. For example, the third driving part 140 may include a third-first driving part 141 and a third-second driving part 142 (see FIG. 6) disposed on both sides of the base body 22.

Figure 6:
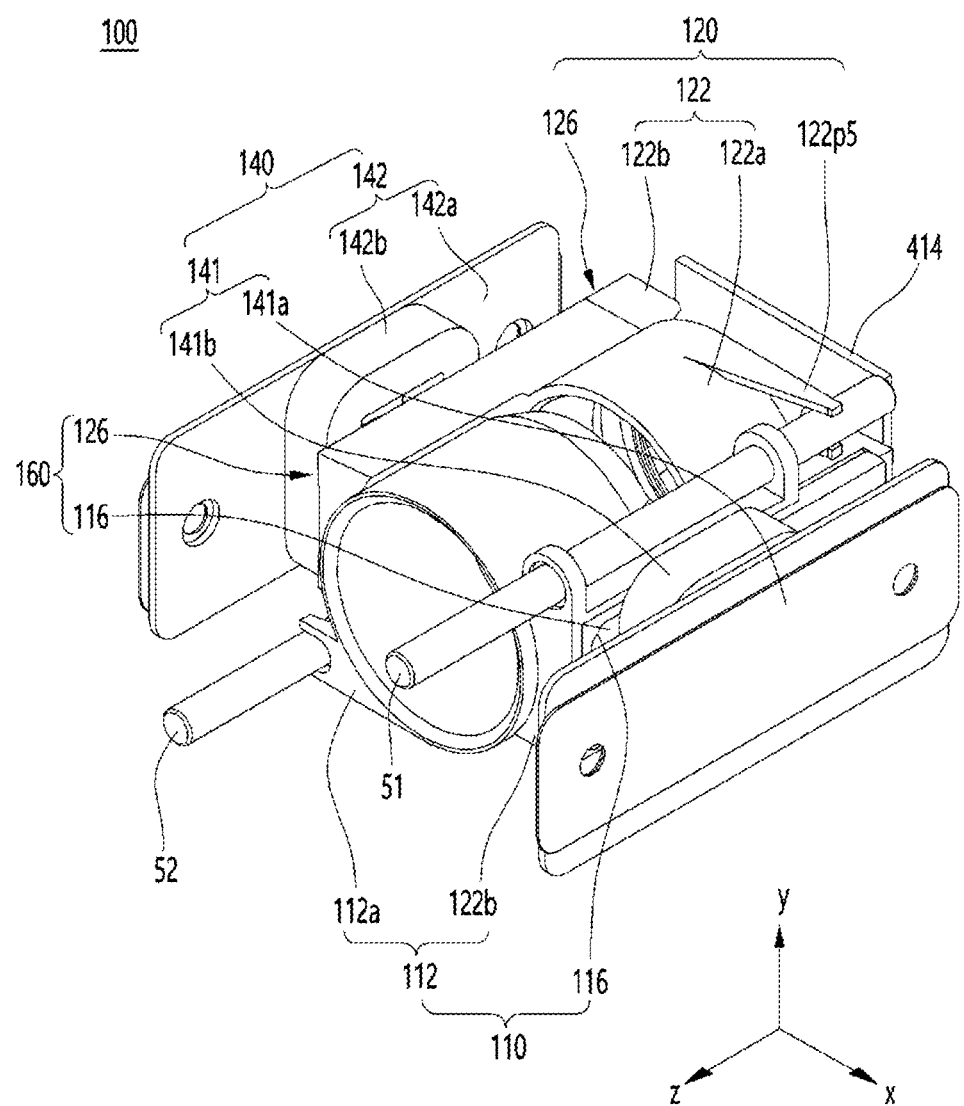
FIG. 6 is a perspective view in which a base body, a first cover, and a second cover are removed from the first camera actuator in the embodiment shown in FIG. 5A.

Next, FIG. 6 is a perspective view in which the base body 22, the first cover 21, and the second cover 22 are removed from the first camera actuator 100 in the embodiment shown in FIG. 5C, and the lens itself is omitted.

Referring to FIGS. 6 and 5C together, in the first camera actuator 100 according to the embodiment, an optical system and a lens driving part may be disposed on the base body 22. For example, in the first camera actuator 100 according to the embodiment, at least one of the first lens assembly 110, the second lens assembly 120, the third lens group 130, and the guide pin 50 may be disposed on the base body 22. The third-first driving part 141 and the third-second driving part 142 may be disposed outside the base body 22, thereby performing a high magnification zooming function.

Meanwhile, the first lens assembly 110, the second lens assembly 120, the third lens group 130, and the image sensor unit may be classified as the optical system.

In addition, the third-first driving part 141, the third-second driving part 142, the guide pin 50, and the like may be classified as the lens driving part, and the first lens assembly 110 and the second lens assembly 120 may also have a function of the lens driving part. The third-first driving part 141 and the third-second driving part 142 may be a driving part having a coil and a yoke, but the embodiment is not limited thereto.

Referring to FIG. 6, the guide pin 50 may perform a guide function of the lens assembly to be moved, and may be provided in a singular or plural. For example, the guide pin 50 may include the first guide pin 51 and the second guide pin 52, but the embodiment is not limited thereto. The guide pin 50 may be referred to as a rod or a shaft, but the embodiment is not limited thereto.

In the embodiment, a predetermined prism may be disposed at the third lens group 130 side, and the predetermined image sensor unit 190 may be disposed at the second cover 22 side. The prism may also be included in the optical system.

In the embodiment, the prism may convert incident light to parallel light. For example, the prism may change the incident light to the parallel light by changing an optical path of the incident light to the optical axis (z axis) parallel to a central axis of the lens group. Thereafter, the parallel light passes through the third lens group 130, the first lens assembly 110, and the second lens assembly 120 to be incident on the image sensor unit 190 to capture an image.

The prism may be an optical member having a triangular prism shape. In addition, the embodiment may adopt a reflection plate or a reflection mirror instead of or in addition to the prism.

In addition, in the embodiment, when the image sensor unit 190 is not disposed in a direction perpendicular to the optical axis, an additional prism (not shown) may be provided for the image sensor unit to capture the light that has passed through the lens group.

In the embodiment, the image sensor unit 190 may be disposed perpendicular to the optical axis direction of parallel light. The image sensor unit may include a solid-state imaging element disposed on a predetermined fourth circuit board 414. For example, the image sensor unit 190 may include a charge coupled device (CCD) image sensor or a complementary metal-oxide-semiconductor (CMOS) image sensor.

In the following description of the embodiment, it will be described as a case in which there are two moving lens groups, but the embodiment is not limited thereto, and the number of moving lens groups may be three, four, or five or more. In addition, the optical axis direction z may refer to a direction that is the same as or parallel to a direction in which the lens groups are aligned.

Subsequently, referring to FIGS. 5D and 6, the first camera actuator 100 according to the embodiment may perform the zooming function. For example, in the embodiment, the first lens assembly 110 and the second lens assembly 120 may be the moving lens moving through the third-first driving part 141, the third-second driving part 142, and the guide pin 50, and the third lens group 130 (see FIG. 5D) may be the fixed lens, but the embodiment is not limited thereto.

In this case, the third lens group 130 may perform a function of a focator for image forming the parallel light at a specific position.

Next, the first lens assembly 110 may perform a function of a variator that re-images the image formed in the third lens group 130 that is the focator. Meanwhile, the first lens assembly 110 may be in a state in which a distance to a subject or an image distance may change a lot, and thus a magnification change may be large, and the first lens assembly 110, which is the variator, may serve an important role in a focal length or a magnification change of the optical system.

Meanwhile, an image point formed in the first lens assembly 110, which is the variator, may differ slightly depending on a position thereof.

Accordingly, the second lens assembly 120 may perform a position compensation function for the image formed by the variator. For example, the second lens assembly 120 may perform a function of a compensator that serves to accurately image the image point formed in the first lens assembly 110, which is the variator, at a position of an actual image sensor unit.

In the embodiment, the actuator may include a mover and a fixed part. The mover may be referred to as a moving part in a concept corresponding to the fixed part. For example, the mover may refer to the first and second lens assemblies 110 and 120 that are moved through the guide pin 50. On the other hand, the fixed part may refer to the base 20, the guide pin 50, the third-first driving part 141, the third-second driving part 142, and the like that are not moved.

Subsequently, referring to FIG. 6, in the embodiment, one or more of the guide pins 50 may be disposed in parallel with the optical axis (z-axis). For example, the guide pin 50 may include the first guide pin 51 and the second guide pin 52 disposed to be spaced apart from each other in parallel with the optical axis direction. The first guide pin 51 and the second guide pin 52 may be coupled to the first cover 21 and the second cover 22 of the base 20 (see FIGS. 5A-5D) to function as a movement guide of the first lens assembly 110 and the second lens assembly 120. The guide pin 50 may be formed of any one or more of plastic, glass-based epoxy, polycarbonate, metal and a composite material, but the embodiment is not limited thereto.

Next, in the embodiment, the first lens assembly 110 and the second lens assembly 120 may be driven by electromagnetic force by interacting with the third-first driving part 141 and the third-second driving part 142, respectively, but the embodiment is not limited thereto.

The third-first driving part 141 and the third-second driving part 142 may be a driving part having a coil and a yoke. For example, the third-first driving part 141 may include a first yoke 141a and a first coil part 141b, and the third-second driving part 142 may include a second yoke 142a and a second coil part 142b.

In addition, the first lens assembly 110 of the embodiment may include any one or more of a first housing 112, the first lens group (not shown), and a first magnet 116. The first housing 112 may include a first lens housing 112a in which the first lens group (not shown) is accommodated and a first driving part housing 112b in which the first magnet 116 is accommodated. The lens housing may be referred to as a lens barrel, but the embodiment is not limited thereto.

In addition, the first housing 112 may further include a first-second yoke (not shown) under the first magnet 116 inside the first driving part housing 112b to block the magnetic force of the first magnet 116 from affecting the inside of the base body 22.

In addition, the second lens assembly 120 of the embodiment may include any one or more of a second housing 122, the second lens group (not shown), and a second magnet 126. The second housing 122 may include a second lens housing 122a in which the second lens group (not shown) is accommodated and a second driving part housing 122b in which the second magnet 126 is accommodated. In addition, the second lens housing 122a may include a fifth pin guide part 122p5 fitted to the first guide pin 51.

In addition, the second housing 122 may further include a second-second yoke (not shown) under the second magnet 126 inside the second driving part housing 122b to block the magnetic force of the second magnet 126 from affecting the inside of the base body 22.

The first magnet 116 and the second magnet 126 may form the fourth driving part 160.

Hereinafter, the first lens assembly 110 will be mainly described with reference to FIGS. 7 and 8.

Figure 7:
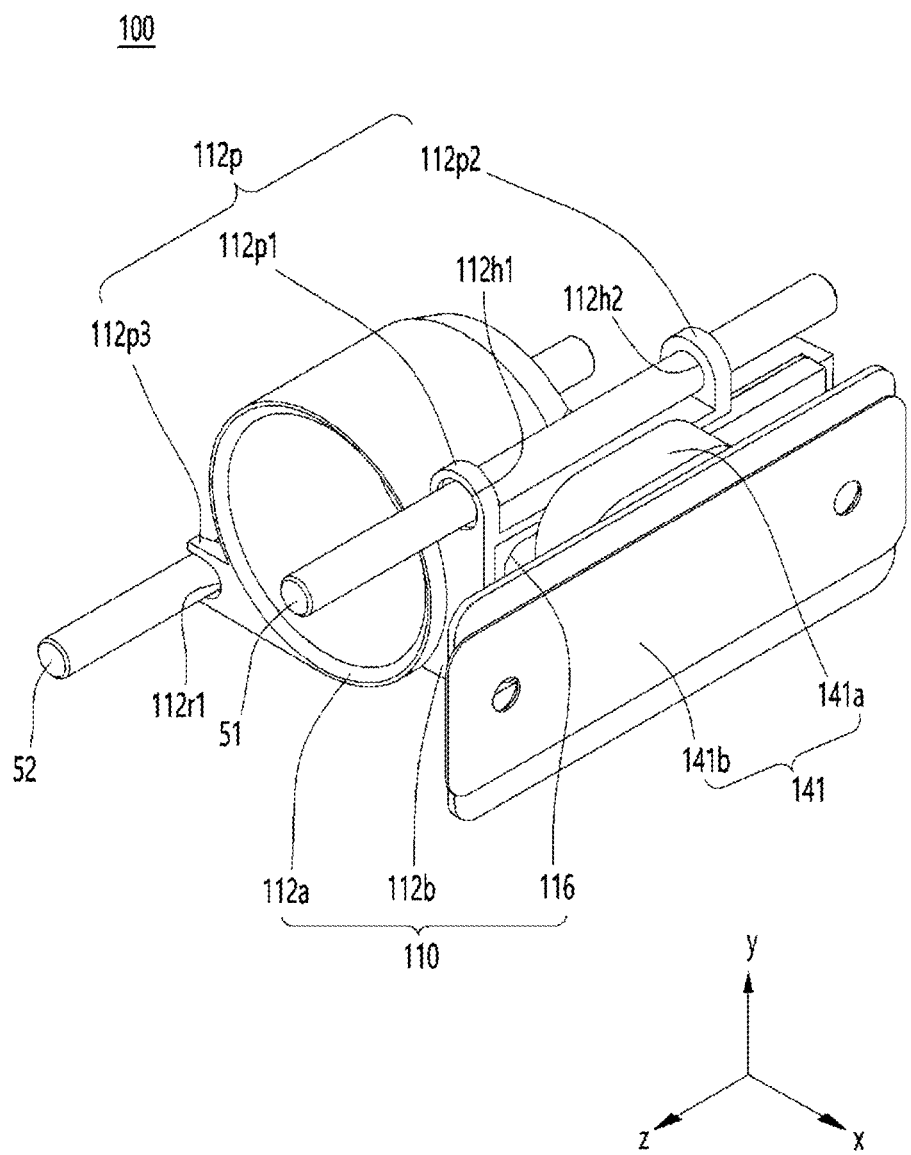
FIG. 7 is a perspective view of a first lens assembly and a first driving part in the first camera actuator in the embodiment shown in FIG. 6.
Figure 8:
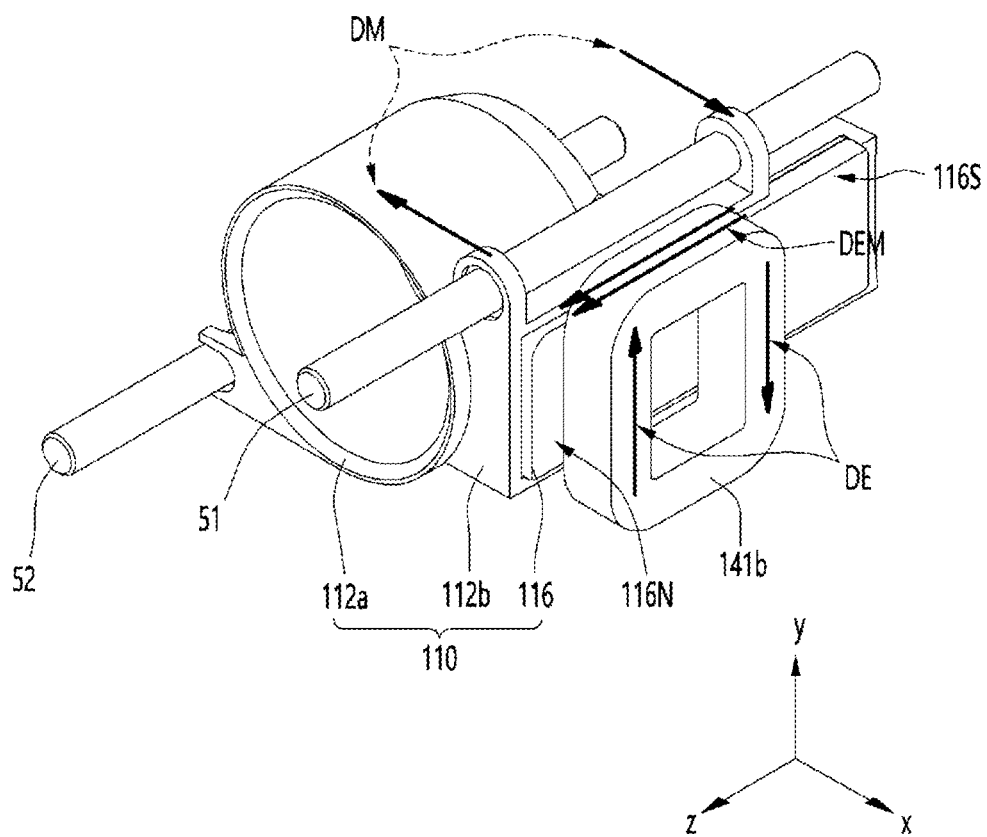
FIG. 8 is an example view showing the interaction between a first magnet and a first coil part in the first camera actuator in the embodiment shown in FIG. 7.

FIG. 7 is a perspective view of the first lens assembly 110 and the third-first driving part 141 in the first camera actuator 100 according to the embodiment shown in FIG. 6, and FIG. 8 is an example of the interaction between the first magnet 116 and the first coil part 141b in the first camera actuator 100 according to the embodiment shown in FIG. 7.

Referring to FIG. 7, the first lens assembly 110 may include the first lens housing 112a and the first driving part housing 112b. The first lens housing 112a may function as a barrel or a lens-barrel, and the first lens group (not shown) may be mounted thereon. The first lens group (not shown) may be a moving lens group, and may include a single lens or a plurality of lenses. The second housing 122 of the second lens assembly 120 may also include the second lens housing 122a and the second driving part housing 122b.

Next, the first magnet 116 may be disposed on the first driving part housing 112b of the first lens assembly 110.

The first magnet 116 of the first lens assembly 110 may be a magnet driving part, but the embodiment is not limited thereto. For example, the first magnet 116 may include a first magnet that is a permanent magnet. In addition, the second driving part 126 of the second lens assembly 120 may also be a magnet driving part, but the embodiment is not limited thereto.

With reference to FIG. 8 for a while, an interaction in which an electromagnetic force DEM is generated between the first magnet 116 and the first coil part 141b in the first camera actuator 100 according to the embodiment will be described.

As shown in FIG. 8, in the first camera actuator 100 according to the embodiment, a magnetization method of the first magnet 116 may be a vertical magnetization method. For example, in the embodiment, both an N-pole 116N and an S-pole 116S of the first magnet 116 may be magnetized so as to face the first coil part 141b. Accordingly, the N-pole 116N and the S-pole 116S of the first magnet 116 may be respectively disposed so as to correspond to a region in which current flow in a y-axis direction perpendicular to the ground at the first coil part 141b.

Referring to FIG. 8, in the embodiment, a magnetic force DM is applied in a direction opposite to an x-axis at the N-pole 116N of the first magnet 116, and when a current DE flows in a y-axis direction in a region of the first coil part 141b corresponding to the N-pole 116N, the electromagnetic force DEM acts in a z-axis direction based on the Fleming's left-hand rule.

In addition, in the embodiment, the magnetic force DM is applied in the x-axis direction at the S-pole 116S of the first magnet 116, and when the current DE flows in a direction opposite to the y-axis perpendicular to the ground at the first coil part 141b corresponding to the S pole 116S, the electromagnetic force DEM acts in a z-axis direction based on the Fleming's left-hand rule.

At this time, since a third-first driving part 141 including the first coil part 141b is in a fixed state, the first lens assembly 110, which is a mover on which the first magnet 116 is disposed, may be moved back and forth in a direction parallel to the z-axis direction by the electromagnetic force DEM according to a current direction. The electromagnetic force DEM may be controlled in proportion to the current DE applied to the first coil part 141b.

Likewise, an electromagnetic force DEM is generated between the second magnet 126 and the second coil part 142b in the camera module according to the embodiment, and thus the second lens assembly 120 may be moved horizontally with respect to the optic axis.

Referring again to FIG. 7, in the embodiment, the first driving part housing 112b may include one or more pin guide parts 112p to guide the first lens assembly 110 in the optical axis direction. In the embodiment, the pin guide part 112p may include a first pin guide part 112p1 and a second pin guide part 112p2.

For example, the first driving part housing 112b may include the first pin guide part 112p1 protruding upward, and a first guide hole 112h1 may be disposed in the first pin guide part 112p1.

In addition, the first driving part housing 112b may further include the second pin guide part 112p2 protruding upward and disposed to be spaced apart from the first pin guide part 112p1. A second guide hole 112h2 may be disposed in the second pin guide part 112p2.

According to the embodiment, the first guide pin 51 may be fitted into the first and second guide holes 112h1 and 112h2 of the first pin guide part 112p1 and the second pin guide part 112p2 to precisely guide the first lens assembly 110 in parallel with the optical axis direction.

Thus, according to the embodiment, it is possible to inhibit frictional resistance by minimizing a contact area therebetween when the first pin guide part 112p1 and the second pin guide part 112p2 of the first housing 112 are in contact with the first guide pin 51. Accordingly, according to the embodiment, there are technical effects such as improvement of driving force and reduction of power consumption by inhibiting occurrence of friction torque during zooming.

In addition, according to the embodiment, there are technical effects such as improvement of driving force during zooming, reduction of power consumption, and improvement of control characteristics by reducing a weight of the first driving part housing 112b to reduce frictional torque.

For example, according to the embodiment, regions other than the first pin guide part 112p1 and the second pin guide part 112p2 are removed from an upper region of the first driving part housing 112b in which the first guide pin 51 is positioned to reduce the weight of the first driving part housing 112b, so that frictional resistance is reduced, and accordingly, there are technical effects such as improvement of driving force, reduction of power consumption, and improvement of control characteristics during zooming.

Subsequently, referring to FIG. 7, the first lens housing 112a may be provided with one or more pin guide parts 112p protruding from a side surface thereof to guide movement of the first lens assembly 110 in the optical axis direction and to inhibit the lens unit from tilting to the upper and lower sides, thereby inhibiting the central axis from shifting.

For example, the first lens housing 112a may include a third pin guide part 112p3 protruding to the side surface thereof, and a first guide groove 112r1 may be disposed in the third pin guide part 112p3.

According to the embodiment, the second guide pin 52 may be fitted into a first guide groove r1 of the third pin guide part 112p3 to precisely guide the first lens assembly 110 in parallel with the optical axis direction.

Accordingly, according to the embodiment, the second guide pin 52 is supported in the third pin guide part 112p3 of the first lens housing 112a to inhibit the lens unit from tilting to the upper and lower sides, thereby inhibiting the central axis from shifting.

In addition, according to the embodiment, there are technical effects such as improvement of driving force, reduction of power consumption, and improvement of control characteristics during zooming by minimizing a friction area therebetween to inhibit frictional resistance when the third pin guide part 112p3 of the first lens housing 112a is in contact with the second guide pin 52.

In addition, according to the embodiment, there are technical effects such as improvement of driving force during zooming, reduction of power consumption, and improvement of control characteristics by reducing a weight of the first lens housing 112a to reduce friction torque.

For example, according to the embodiment, regions other than the third pin guide part 112p3 are removed from a side surface region of the first lens housing 112a in which the second guide pin 52 is positioned to reduce the weight of the first lens housing 112a, thereby reducing frictional resistance, and thus there are technical effects such as improvement of driving force, reduction of power consumption, and improvement of control characteristics during zooming.

Figure 9:
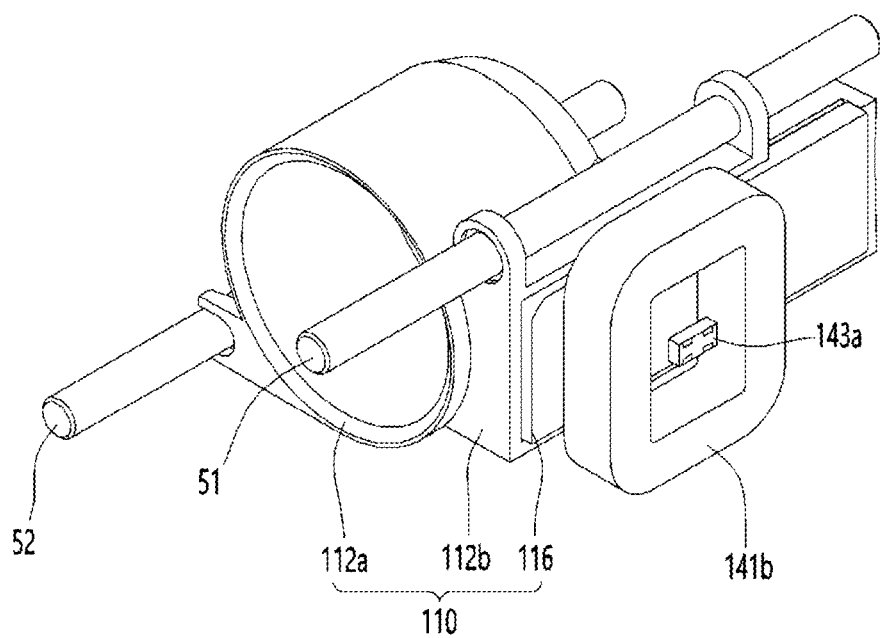
FIG. 9 is a partial perspective view of the first camera actuator shown in FIG. 7.

Next, FIG. 9 is a partial perspective view of the first camera actuator 100 shown in FIG. 7. In the first camera actuator 100 according to the embodiment, the third-first driving part 141 may further include a first hall sensor 143a inside the first coil part 141b.

For example, according to the embodiment, a compact camera module may be implemented by disposing the first hall sensor 143a in the internal region of the first coil part 141b to reduce a region occupied by the hall sensor.

In addition, according to the embodiment, there is a special technical feature capable of implementing the compact camera module using the first magnet 116 in common without using a separate sensing magnet.

Accordingly, according to the embodiment, even in the compact camera module, there is a technical effect that the zooming function may be smoothly performed.

Figure 10:
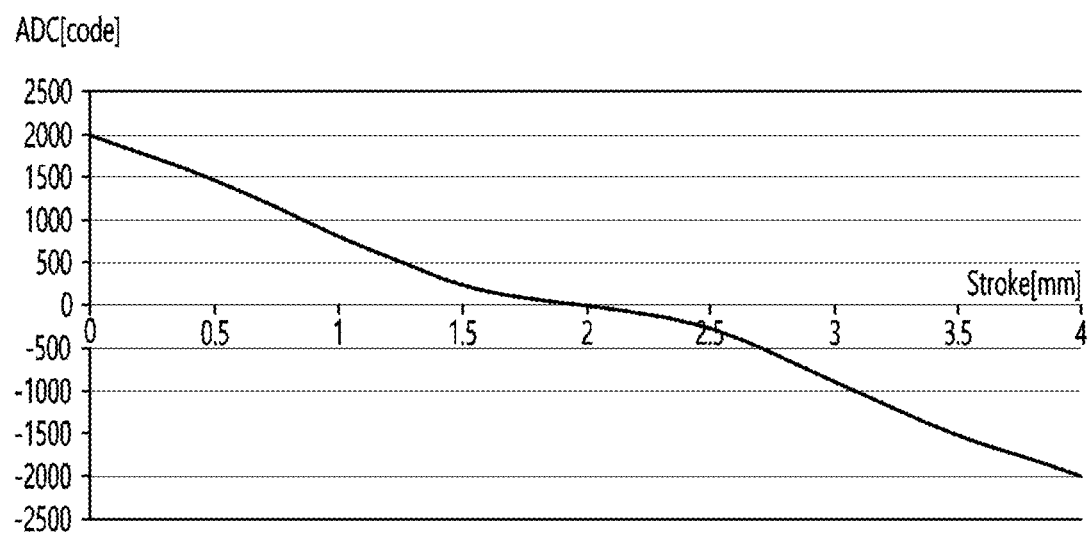
FIG. 10 is a graph showing hall sensor linearity according to a stroke in the first camera actuator shown in FIG. 9.

Next, FIG. 10 is a graph showing hall sensor linearity according to a stroke of the first camera module 1000 shown in FIG. 9.

According to FIG. 10, when the stroke of the lens assembly in the first camera actuator 100 according to the embodiment is about 4 mm, it can be seen that the hall sensor linearity is extremely excellent.

Accordingly, according to the embodiment, there is a technical effect that only one first hall sensor 143a may greatly improve the reliability of lens position measurement by placing the first hall sensor 143a at a center of the first driving magnet 116.

Figure 11A:
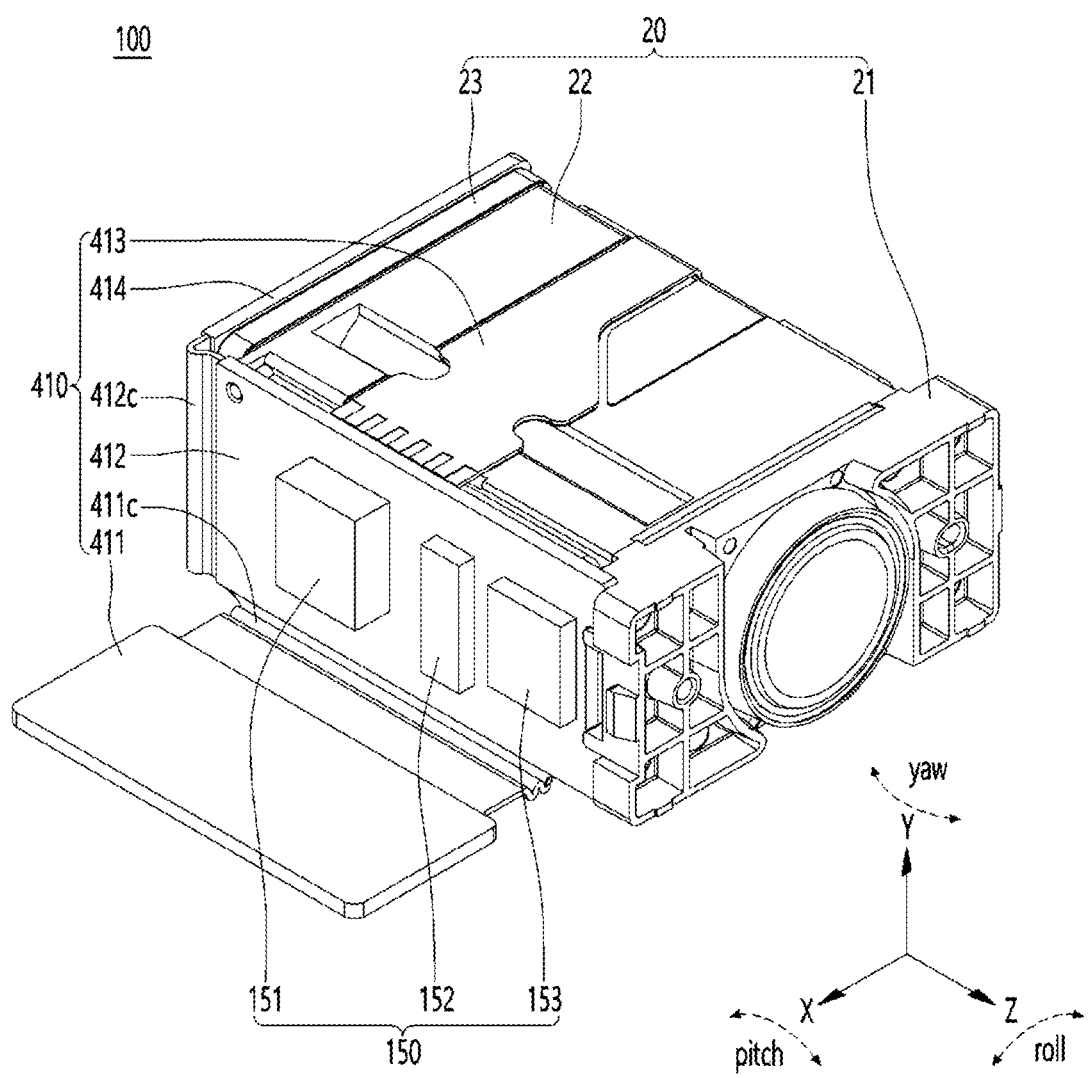
FIG. 11A is a detailed perspective view of the first camera actuator in the camera module of the embodiment shown in FIG. 3A.
Figure 11B:
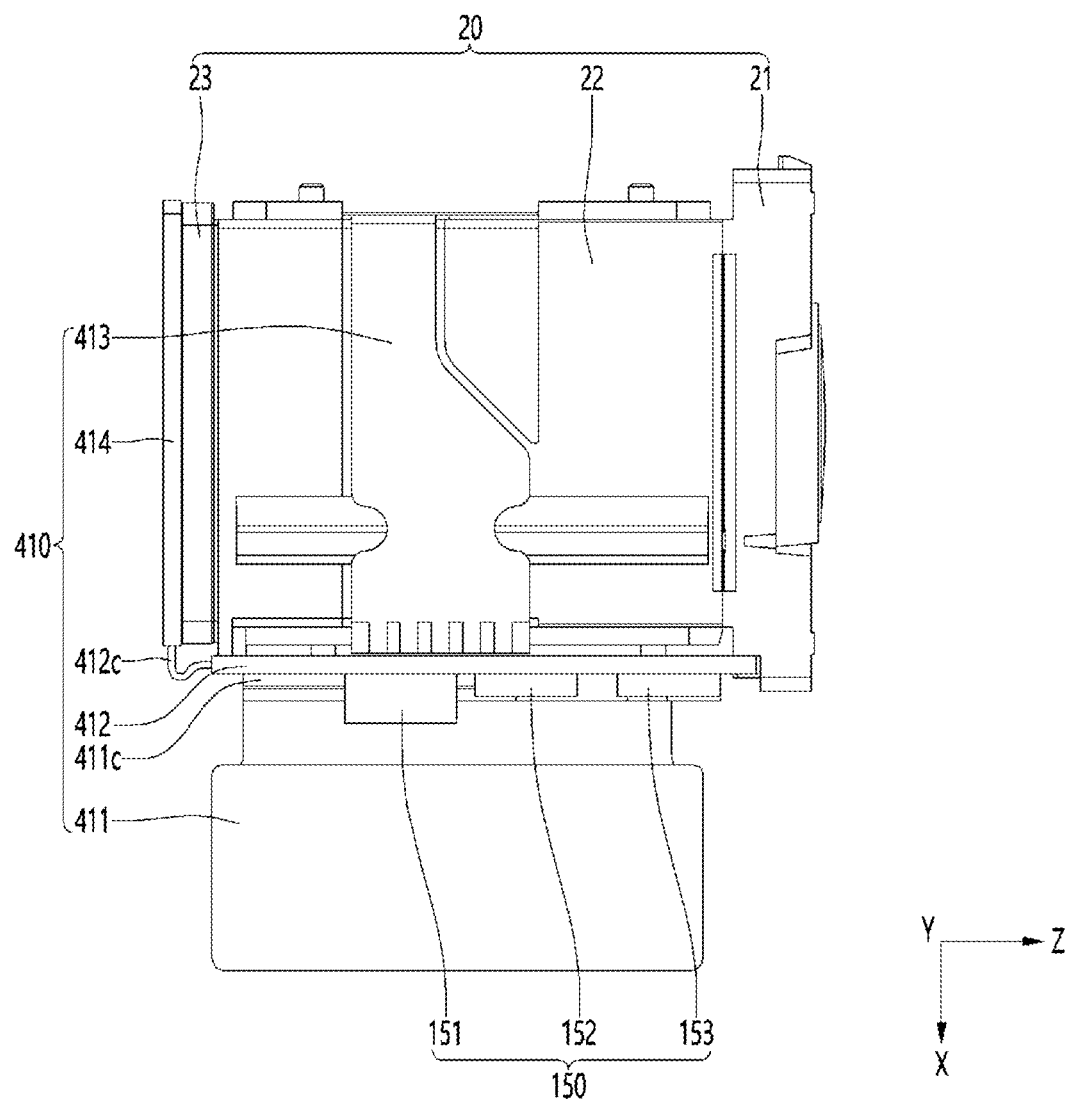
FIG. 11B is a plan view of the first camera actuator of the embodiment shown in FIG. 11A.

Next, FIG. 11A is a detailed perspective view of the first camera actuator 100 of the embodiment, and FIG. 11B is a plan view of the first camera actuator 100 of the embodiment shown in FIG. 11A.

The circuit boards 410 of the first group of the first camera actuator 100 of the embodiment may include a single or a plurality of circuit boards. For example, the circuit board 410 of the first group may include the first circuit board 411, the second circuit board 412, the third circuit board 413, the fourth circuit board 414, a first connection board 411C, and a second connection board 412C.

The gyro sensor 151, the first electronic element 152, and the second electronic element 153 that sense movement may be disposed on the second circuit board 412. The first electronic element 152 may be a driver IC, and the second electronic element 153 may be an EEPROM, but the embodiment is not limited thereto.

The third circuit board 413 may be electrically connected to a driving part driving the lens unit, and the image sensor 190 may be disposed on the fourth circuit board 414.

The first circuit board 411 and the second circuit board 412 may be electrically connected by the first connection board 411c, and the second circuit board 412 and the fourth circuit board 414 may be electrically connected by the second connection board 412c.

In the embodiment, the circuit board 410 of the first group may include any circuit board having a wiring pattern that may be electrically connected, such as a rigid printed circuit board (Rigid PCB), a flexible printed circuit board (Flexible PCB), and a rigid flexible printed circuit board (Rigid Flexible PCB).

For example, the first to fourth circuit boards 411, 412, 413, and 414 may be rigid printed circuit boards (Rigid PCBs), and the first and second connection boards 411c and 412c may be the flexible printed circuit board (Flexible PCB) or the flexible printed circuit board (Rigid Flexible PCB), but the embodiment is not limited thereto.

Referring to FIGS. 11A and 11B, the first camera actuator 100 of the embodiment may implement the OIS technology that corrects image quality by correcting an optical path by detecting a movement and moving the lens by adopting the gyro sensor 151.

The movement of the camera module may include a linear movement that moves along an axis and a rotational movement that rotates around the axis.

First, as shown in FIG. 11A, the linear movement may include a movement in a horizontal coordinate axis (x-axis) direction of the camera module, a movement in a vertical coordinate axis (y-axis) direction of the camera module, and a movement in an optical axis (z-axis) direction disposed in the front-rear direction of the camera module.

Next, as shown in FIG. 11A, the rotational movement may include a pitch, which refers to a rotational movement in a vertical direction with the horizontal coordinate axis (x-axis) of the first camera actuator 100 as a rotational axis, a yaw, which refers to a rotational movement in a horizontal direction with the vertical coordinate axis (y-axis) as a rotation axis, and a roll, which refers to a rotational movement with the optical axis (z-axis) passing in a front-back direction of the first camera actuator 100 as a rotation axis.

In the embodiment, the gyro sensor 151 may adopt a two-axis gyro sensor that detects amounts of two rotational movements of the pitch and the yaw, which represent large movements in a two-dimensional image frame, and may adopt a three-axis gyro sensor that detects all of amounts of movements of the pitch, yaw, and roll for more accurate a camera-shake correction. The movement corresponding to the pitch, yaw, and roll detected by the gyro sensor 151 may be converted into an appropriate physical quantity according to a camera-shake correction method and a correction direction.

In an embodiment, the first circuit board 411 may be disposed to extend in the horizontal coordinate axis (x-axis) direction of the first camera actuator 100, and the second circuit board 412 may be disposed in the y-axis direction perpendicular to the horizontal coordinate axis (x-axis) direction. In this case, the second circuit board 412 may be disposed to extend in a direction horizontal to the optical axis (z-axis) direction.

Thus, according to the embodiment, the gyro sensor 151 is disposed on the second circuit board 412, and thus there is a technical effect that it is possible to implement an ultra-small camera module.

For example, in a private internal technology, as a length of the circuit board 410 of the first group in the horizontal coordinate axis (x-axis) direction of the camera module occupies about 15 mm, there is a limit to implementing an ultra-small camera module.

However, as shown in FIGS. 11A and 11B, the gyro sensor 151 is disposed on the second circuit board 412 that is disposed to extend in a direction perpendicular to the horizontal coordinate axis (x-axis) direction and horizontal to the optical axis (z-axis) direction, and a size of the first camera actuator 100 is controlled to a level of a horizontal width of the base 20, and accordingly, there is a technical effect that it is possible to implement an ultra-small camera module.

For example, it is possible to reduce a region of about 3 mm to 4 mm or more (about 25% or more) of a region of a circuit board disposed to extend in the horizontal coordinate axis (x-axis) direction and having a gyro sensor disposed thereon in the conventional internal technology, and thus there is a technical effect that it is possible to implement an ultra-small camera module.

According to the embodiment, the gyro sensor 151 is disposed on the second circuit board 412 that is disposed to extend in a direction perpendicular to the horizontal coordinate axis (x-axis) direction and horizontal to the optical axis (z-axis) direction, and accordingly, a central axis of the gyro sensor 151 may be horizontal in the horizontal coordinate axis (x-axis) direction, and may be perpendicular to the optical axis (z-axis) direction.

The second circuit board 412 may be disposed to extend in a vertical axis direction from a horizontal coordinate plane perpendicular to the optical axis.

Accordingly, in the embodiment, in measurement data of the gyro sensor 151, the pitch movement may be controlled by replacing each other with the roll, and the roll movement may be controlled by replacing each other with the pitch, but the embodiment is not limited thereto.

Alternatively, in designing the measurement data of the gyro sensor 151, the pitch movement may be set by the pitch, and the roll movement may be set by the roll.

Meanwhile, in the related art, there is a technical problem that an error occurs in the degree of movement of the lens unit and the degree of movement sensed by the gyro sensor according to the user's movement as the gyro sensor is disposed to be spaced apart from the lens unit. For example, when the camera module rotates around the gyro sensor, there is a problem that a difference between the degree of movement of the gyro sensor and the degree of movement of the lens unit increases, and thus the accuracy of angular acceleration data is lowered.

However, according to the embodiment, an error in the degree of movement of the lens unit and the degree of movement sensed by the gyro sensor according to the user's movement is remarkably reduced as the gyro sensor 151 is disposed in close contact with the side surface of the base 20 of the first camera actuator 100 on which the lens unit is disposed, and thus there is a special technical effect that may greatly improve the accuracy of angular acceleration of the gyro sensor.

Figure 12A:
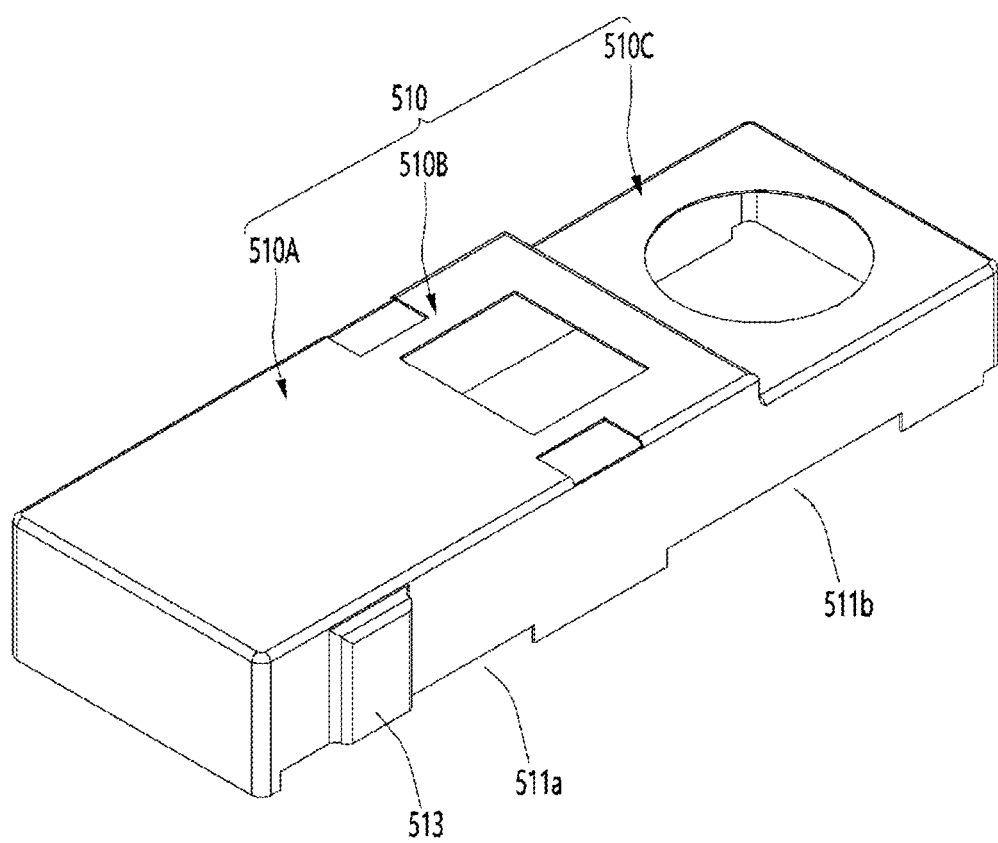
FIG. 12A is a perspective view of a shield can in the camera module of the embodiment shown in FIG. 2.
Figure 12B:
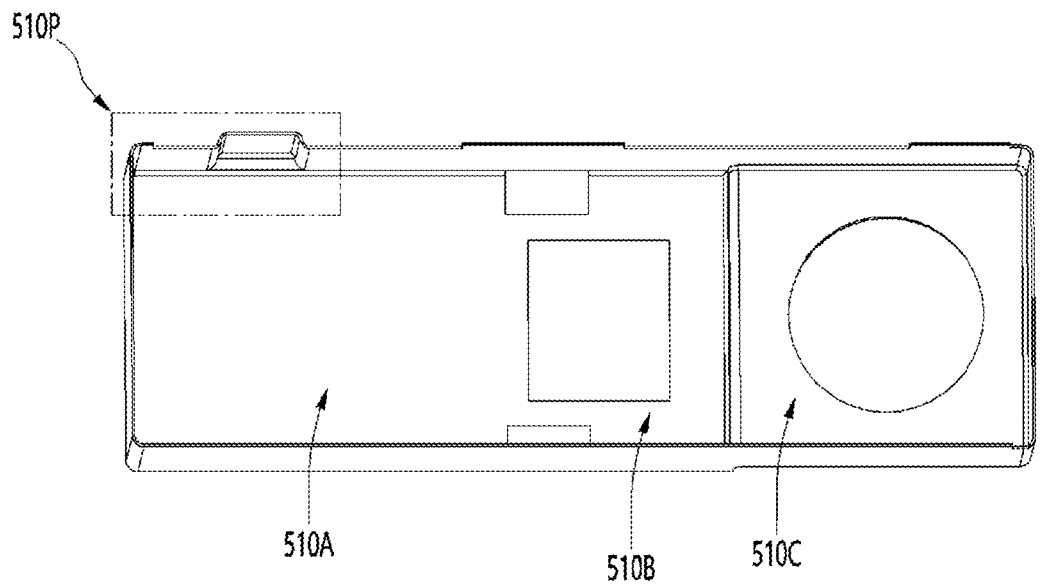
FIG. 12B is a bottom perspective view of the shield can in the camera module of the embodiment shown in FIG. 12A.
Figure 12C:
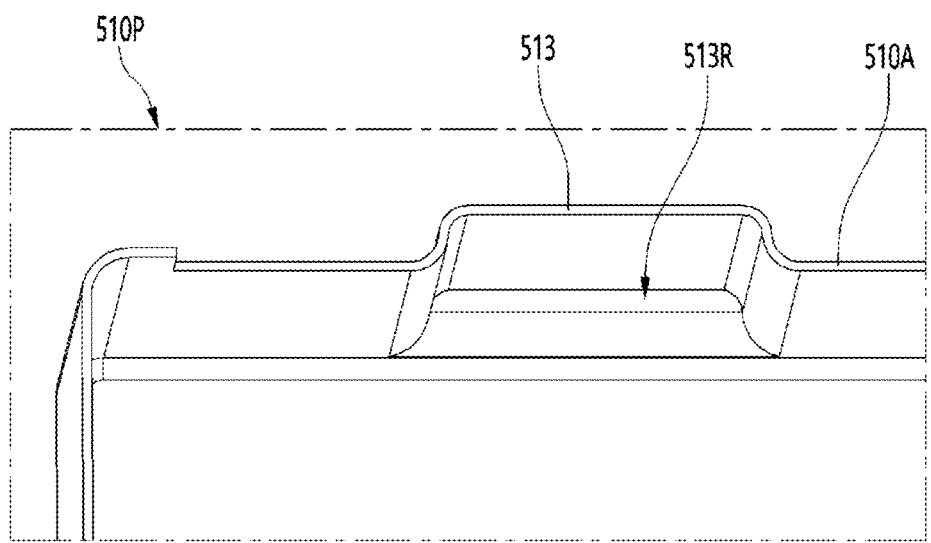
FIG. 12C is a partially enlarged view of the shield can in the camera module of the embodiment shown in FIG. 12B.

Next, FIG. 12A is a perspective view of the shield can 510 in the camera module 1000 of the embodiment shown in FIG. 2, and FIG. 12B is a bottom perspective view of the shield can 510 in the camera module of the embodiment shown in FIG. 12A, and FIG. 12C is an enlarged view of a portion 510P of the shield can in the camera module of the embodiment shown in FIG. 12B.

In the camera module 1000 of the embodiment, the shield can 510 may be additionally installed on an outer surface of the base of each camera module. The shield can 510 may be referred to as a cover housing.

The shield can 510 may include a first shield region 510A corresponding to the first camera actuator 100, a second shield region 510B corresponding to the second camera actuator 200, and a third shield region 510C corresponding to the second camera module 1000B.

The shield can 510 may be formed of a metal material such as steel (SUS) to shield electromagnetic waves flowing into and out of the camera module, and may also inhibit foreign matter from flowing into the camera module.

A first recess 511a on which the circuit board 410 of the first group is disposed may be provided at a lower end of the first shield region 510A. A second recess 511b on which the circuit board 420 of the second group is disposed may be provided at a lower end of the second shield region 510B.

Next, referring to FIG. 12C, in the camera module of the embodiment, the shield can 510 may be provided with a support bracket 513, and the support bracket 513 may include a guide groove 513R in which the gyro sensor 151 is disposed.

Accordingly, as the gyro sensor 151 is fixedly disposed firmly in the guide groove 513R of the support bracket 513, the flatness of the gyro sensor 151 may be secured high.

For example, as the gyro sensor 151 is firmly fixedly disposed in the guide groove 513R of the support bracket 513, the flatness of the gyro sensor 151 may be secured greatly precisely within about 1°.

In the related art, an attempt was not made to dispose a center of the gyro sensor in the direction perpendicular to the optical axis direction rather than in the direction parallel thereto, and in particular, since flatness is important in the precision of the data in the gyro sensor, it was difficult to try to dispose the center of the gyro sensor in a direction that is not horizontal in the optical axis direction.

However, in the camera module of the embodiment, the shield can 510 is provided with the support bracket 513, and the support bracket 513 includes the guide groove 513R in which the gyro sensor 151 is disposed, so that the gyro sensor 151 is fixedly disposed firmly, and accordingly, there is a special technical effect that it is possible to secure a high flatness and to provide an ultra-small camera module. The guide groove 513R may be referred to as a recess, but the embodiment is not limited thereto.

In addition, in relation to the disposition of the gyro sensor of the camera module, there is a problem that error probability of the angular acceleration increases as the gyro sensor moves away from the camera module, and there is a technical contradiction that an error rate due to temperature drift also increases as the gyro sensor moves closer.

However, as shown in the embodiment, the shield can 510 is provided with the support bracket 513, and the support bracket 513 includes the guide groove 513R in which the gyro sensor 151 is disposed, so that the gyro sensor 151 is fixedly disposed firmly, and accordingly, the gyro sensor 151 is disposed close to the driving part and the lens unit of the camera module to improve the accuracy of angular acceleration and simultaneously, is disposed to be spaced apart from the image sensor 190, which generates a lot of heat, to reduce the error rate due to temperature drift, and accordingly there is a complex technical effect that it is possible to remarkably improve the precision of the gyro sensor and to provide an ultra-small camera module.

In addition, in the related art, there was a technical problem that an error occurs in the degree of movement of the lens unit and the degree of movement sensed by the gyro sensor according to the user's movement as the gyro sensor is disposed to be spaced apart from the lens unit.

For example, when the camera module rotates around the gyro sensor, there is a problem that a difference between the degree of movement of the gyro sensor and the degree of movement of the lens unit increases, and thus the accuracy of angular acceleration data is lowered.

On the other hand, according to the embodiment, an error in the degree of movement of the lens unit and the degree of movement sensed by the gyro sensor according to the user's movement is remarkably reduced as the gyro sensor is disposed in close contact with the side surface of the base 20 on which the lens unit is disposed, and accordingly, the accuracy of angular acceleration of the gyro sensor may be remarkably improved.

In addition, according to the embodiment, there is also a complex technical effect of shielding EMI, EMC, noise and the like by the support bracket 513 in addition to the shielding effect of the shield can 510.

Figure 13A:
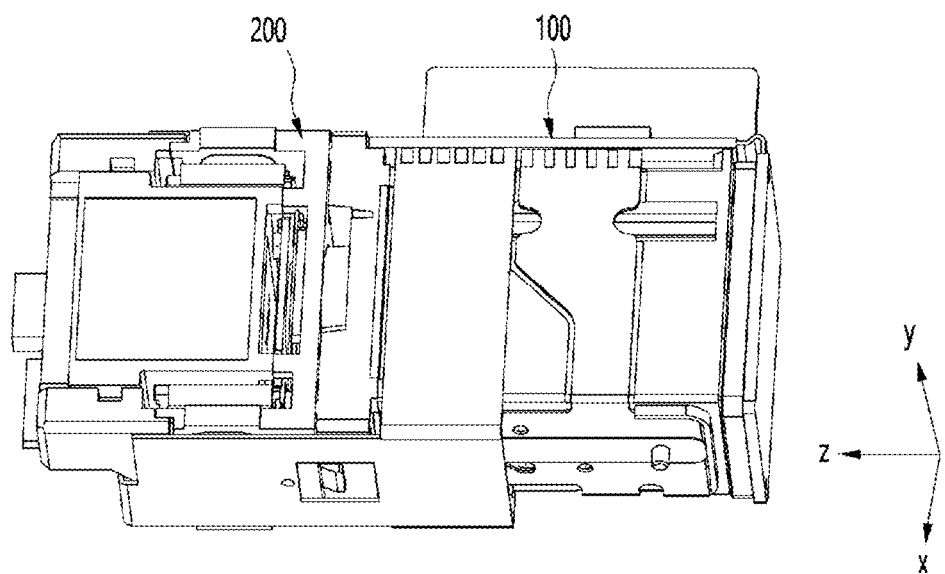
FIG. 13A is a perspective view of the first camera module of the embodiment shown in FIG. 3A in a second direction.
Figure 13B:
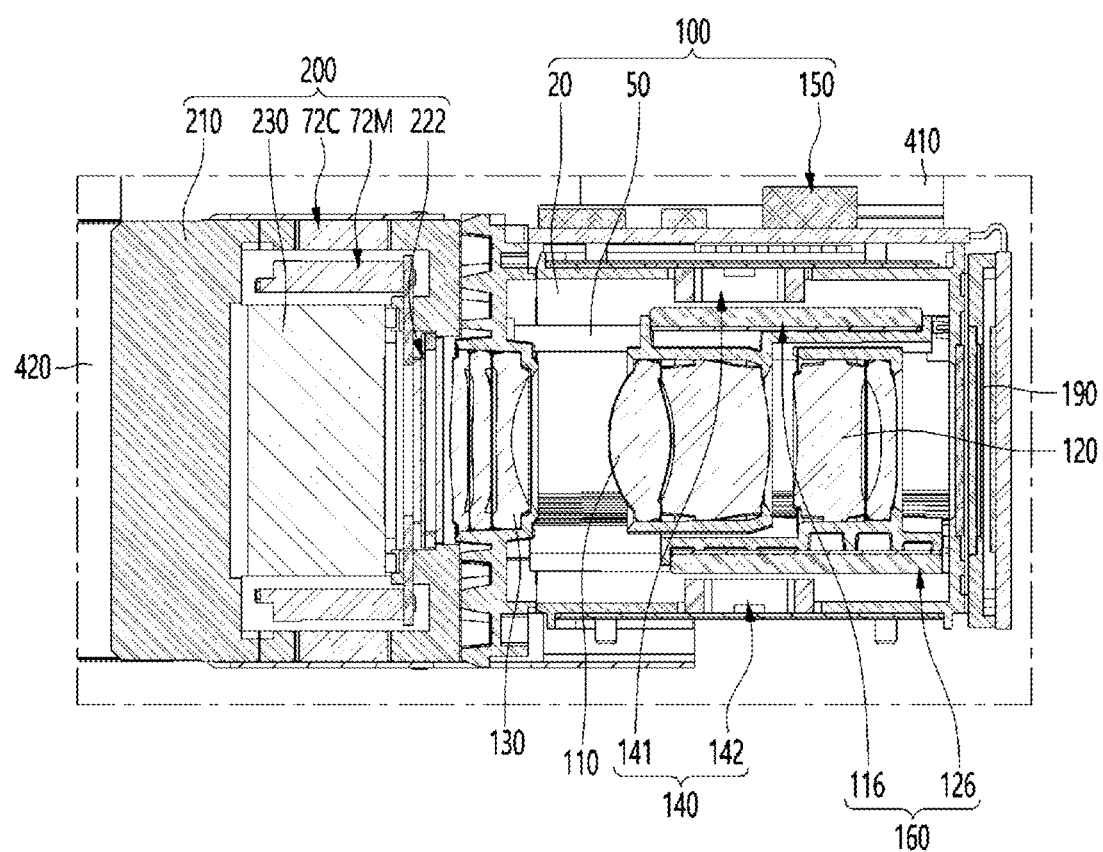
FIG. 13B is a cross-sectional view of the first camera module of the embodiment shown in FIG. 12A

FIG. 13A is a perspective view in the second direction of the first camera module 1000A of the embodiment shown in FIG. 3A, and FIG. 13B is a side cross-sectional view of the first camera module 1000A of the embodiment shown in FIG. 12A.

Referring to FIG. 13B, the first camera module 1000A according to the embodiment may include the first camera actuator 100 performing a zooming function or an AF function, and the second camera actuator 200 disposed on one side of the first camera actuator 100 and performing an OIS function.

Specifically, in the first camera actuator 100, the optical system and the lens driving part may be disposed on the base 20. For example, in the first camera actuator 100 according to the embodiment, at least one or more of the first lens assembly 110, the second lens assembly 120, the third lens group 130, and the guide pin 50 may be disposed on the base 20.

In addition, the first camera actuator 100 according to the embodiment may include the third driving part 140 and the fourth driving part 160 to perform a high magnification zooming function. The third driving part 140 may be a coil driving part, and the fourth driving part 160 may be a magnet driving part.

The third driving part 140 may be a coil driving part, and may include the third-first driving part 141 and the third-second driving part 142. The fourth driving part 160 may include the first magnet 116 and the second magnet 126.

For example, in the embodiment, the first lens assembly 110 and the second lens assembly 120 may be driven by electromagnetic force due to interaction with the third driving part 140 and the fourth driving part 160, respectively. Thus, the camera actuator and the camera module according to the embodiment solve a problem of lens decenter or tilt generation during zooming, and align a plurality of lens groups well to inhibit a change in an angle of view or occurrence of defocusing, and thus there is a technical effect that image quality or resolution is significantly improved.

Next, in the embodiment, the second camera actuator 200 may include a housing 210, a shaper unit 222 and a first driving part 72M disposed in the housing 210, a second driving part 72C disposed on the housing 210 outside the first driving part 72M, and a prism unit 230 disposed on the shaper unit 222. The first driving part 72M may be a magnet driving part, and the second driving part 72C may be a coil driving part. The second camera actuator 200 may be electrically connected to the circuit board 420 of the second group.

Accordingly, according to the embodiment, there is a technical effect that it is possible to provide a camera actuator capable of achieving the best optical characteristics and a camera module including the same by minimizing occurrence of a decenter or tilt phenomenon when the OIS is implemented through controlling a lens unit including the shaper unit 222 and the first driving part 72M which are stably disposed on the housing 210, and a tunable prism disposed on the shaper unit 222 by electromagnetic force due to interaction between the first driving part 72M and the second driving part 72C.

In particular, according to the embodiment, there is a technical effect that it is possible to provide a camera actuator capable of inhibiting a magnetic field interference with a magnet for AF or Zoom and a camera module including the same when the OIS is implemented.

For example, according to the embodiment, when the OIS is implemented, the first driving part 72M, which is a magnet driving part, is disposed in the second camera actuator 200 separated from the first camera actuator 100, and thus there is a technical effect that it is possible to provide a camera actuator capable of inhibiting a magnetic field interference with the first magnet 116 or the second magnet 126 for AF or Zoom and a camera module including the same.

Thus, according to the embodiment, when the camera module is applied to an advanced driver assistance system (ADAS) of a vehicle, the first driving part 72M, which is a magnet driving part, is disposed on the second camera actuator 200, so that a magnetic field interference with the first magnet 116 or the second magnet 126 for AF or Zoom of the first camera actuator 100 may be inhibited, and accordingly, it is possible to provide a camera actuator capable of implementing OIS technology with high data precision when vehicle vibration occurs, and a camera module including the same.

For example, according to the embodiment, the first driving part 72M, which is the magnet driving part, is disposed in a first side direction of the housing 210 in the second camera actuator 200, and the fourth driving part 160 including the first magnet 116 and the second magnet 126 is disposed in the first camera actuator 100 disposed in a direction opposite to the first side direction so that magnetic field interference between the first driving part 72M and the fourth driving part 160 is inhibited, and accordingly, there is a technical effect capable of implementing OIS technology with high data precision when vehicle vibration occurs.

Next, the second camera actuator 200 will be described with reference to FIGS. 14A to 26B. The second camera actuator 200 may be an optical image stabilizer (OIS) actuator, but the embodiment is not limited thereto.

Figure 14A:
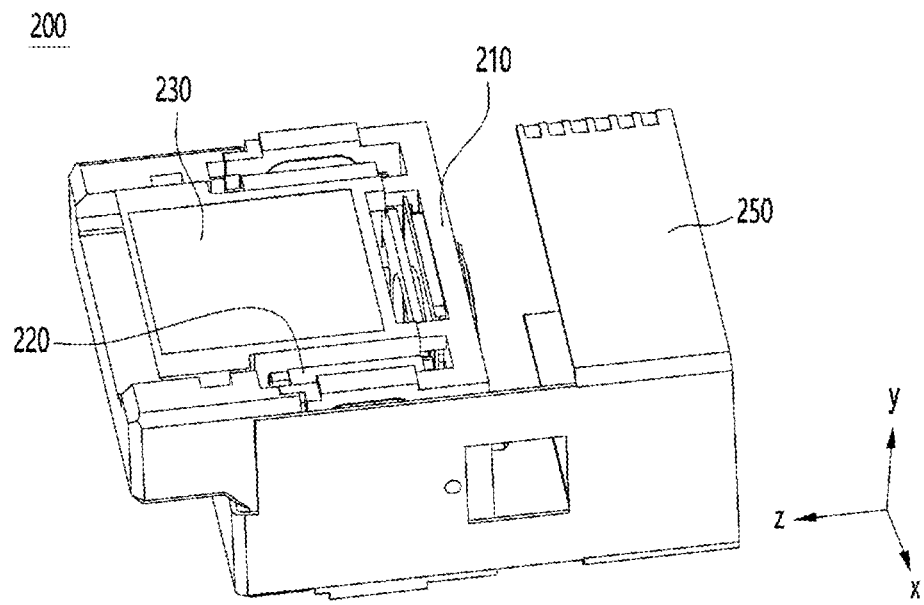
FIG. 14A is a perspective view in the first direction of a second camera actuator in the camera module of the embodiment shown in FIG. 3A.
Figure 14B:
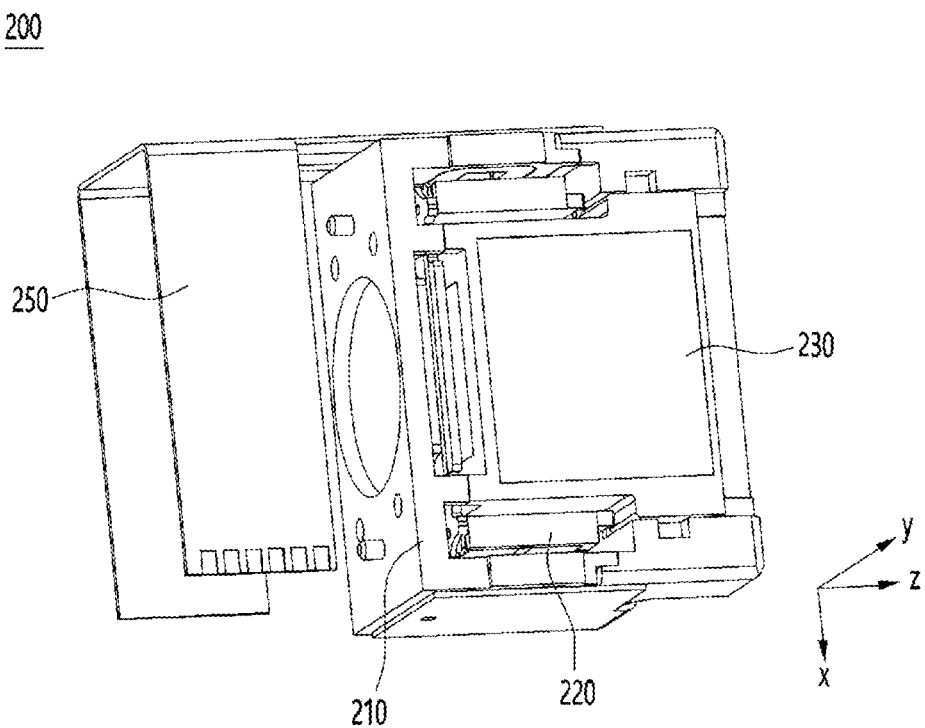
FIG. 14B is a perspective view in the second direction of the second camera actuator in the camera module of the embodiment shown in FIG. 3A.

First, FIG. 14A is a perspective view in the first direction of the second camera actuator 200 in the camera module 1000A of the embodiment shown in FIG. 3A, and FIG. 14B is a second direction perspective view of the camera actuator 200 in the camera module 1000A of the embodiment shown in FIG. 3A.

Referring to FIGS. 14A and 14B, the second camera actuator 200 of the embodiment may include a housing 210, an image shake control unit 220 disposed on the housing 210, a prism unit 230 disposed on the image shaking control unit 220, and a second driving part 72C (see FIG. 15) electrically connected to a second circuit board 250.

Thus, according to the embodiment, the image shaking control unit 220 is provided, which is disposed on the housing 210, and thus there is a technical effect that it is possible to provide an ultra-thin and ultra-small camera actuator and a camera module including the same.

In addition, according to the embodiment, the image shaking control unit 220 is disposed below the prism unit 230, and thus there is a technical effect that when the OIS is implemented, lens size limitation of an optical system lens assembly may be eliminated, and a sufficient amount of light may be secured.

In addition, according to the embodiment, the image shaking control unit 220 stably disposed on the housing 210 is provided, and a shaper unit 222 and a first driving part 72M described later are included, and thus there is a technical effect that when the OIS is implemented through a lens unit 222c including a tunable prism 222cp, occurrence of a decenter or tilt phenomenon may be minimized to achieve the best optical characteristics.

Further, according to the embodiment, when the OIS is implemented, the first driving part 72M, which is a magnet driving part, is disposed on the second camera actuator 200 separated from the first camera actuator 100, and thus there is a technical effect that a magnetic field interference with a magnet for AF or Zoom of the first camera actuator 100 may be inhibited.

Furthermore, according to the embodiment, unlike the conventional method of moving a plurality of solid lenses, the OIS is implemented by including the lens unit 222c including the tunable prism 222cp, the shaper unit 222, and the first driving part 72M, and thus there is a technical effect that the OIS may be implemented with low power consumption.

Hereinafter, the second camera actuator 200 of the embodiment will be described in more detail with reference to the drawings.

Figure 15:
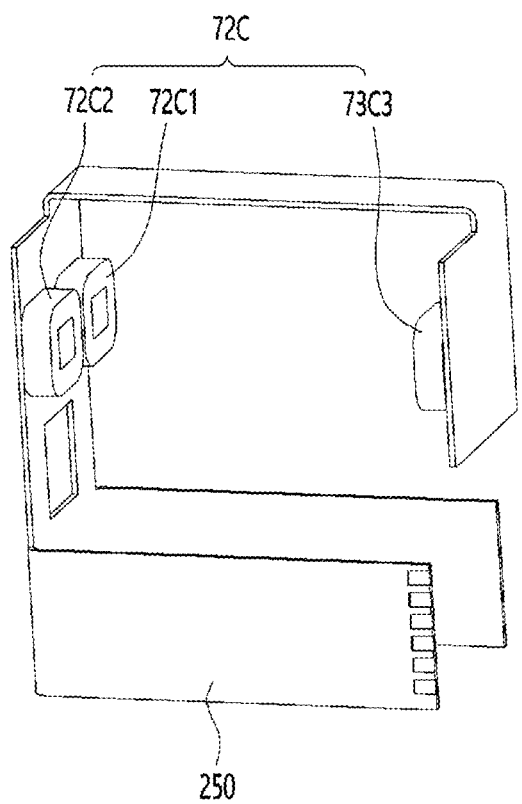
FIG. 15 is a perspective view of a first circuit board and a coil part of the second camera actuator of the embodiment shown in FIG. 14B.
Figure 16A:
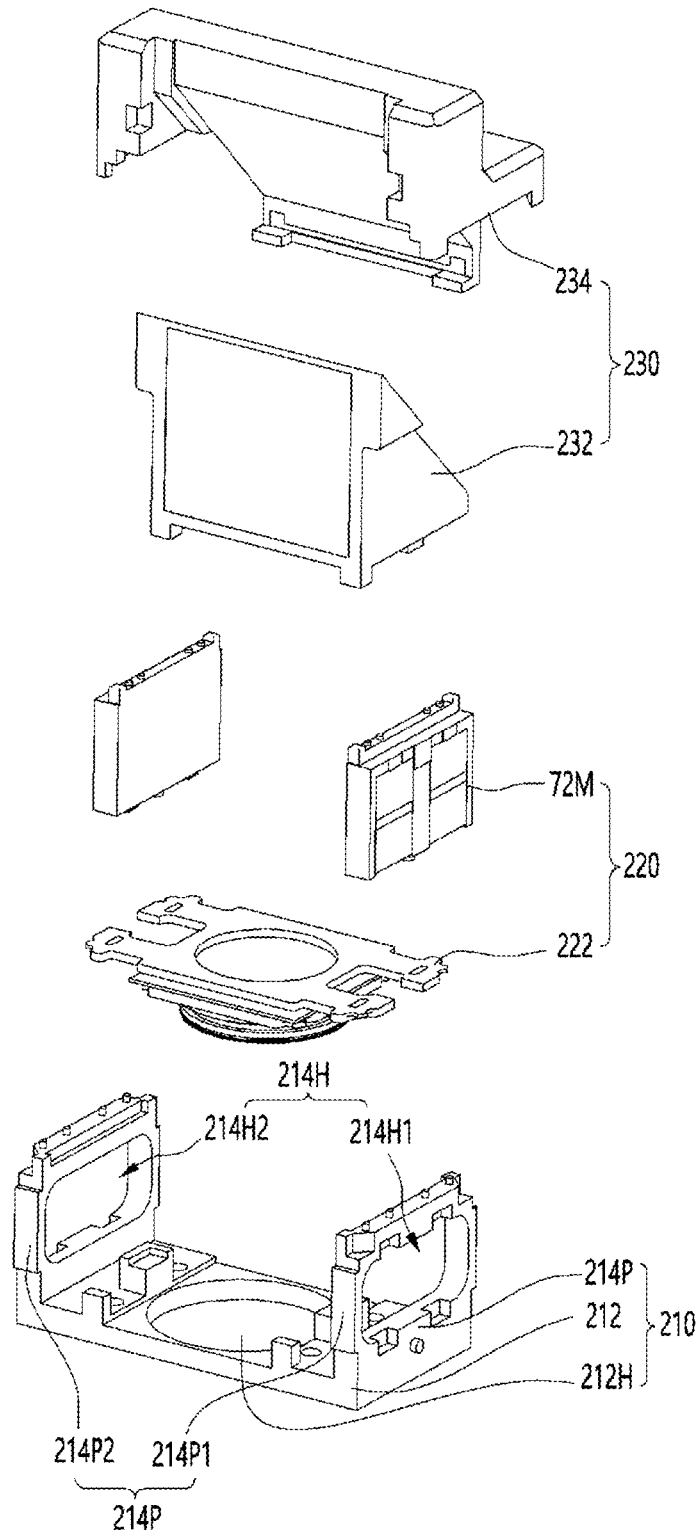
FIG. 16A is a partially exploded perspective view of the second camera actuator of the embodiment shown in FIG. 14B.
Figure 16B:
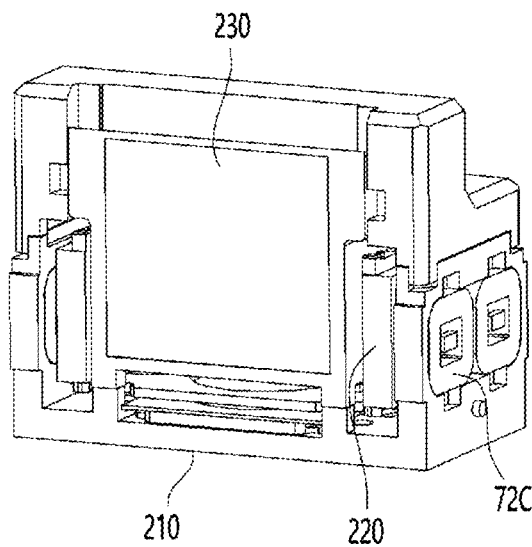
FIG. 16B is a perspective view in which the first circuit board is removed from the second camera actuator of the embodiment shown in FIG. 14B.

FIG. 15 is a perspective view of the second circuit board 250 and the second driving part 72C of the second camera actuator 200 of the embodiment shown in FIG. 14B, and FIG. 16A is a partially exploded perspective view of the second camera actuator 200 of the embodiment shown in FIG. 14B, and FIG. 16B is a perspective view in which the second circuit board 250 is removed from the second camera actuator 200 of the embodiment shown in FIG. 14B.

First, referring to FIG. 15, the second circuit board 250 may be connected to a predetermined power supply (not shown) to apply power to the second driving part 72C. The second circuit board 250 may include a circuit board having a wiring pattern that may be electrically connected, such as a rigid printed circuit board (Rigid PCB), a flexible printed circuit board (Flexible PCB), and a rigid flexible printed circuit board (Rigid Flexible PCB).

The second driving part 72C may include a single or a plurality of unit driving parts, and may include a plurality of coils. For example, the second driving part 72C may include a fifth unit driving part 72C1, a sixth unit driving part 72C2, a seventh unit driving part 72C3, and an eighth unit driving part (not shown).

In addition, the second driving part 72C may further include a hall sensor (not shown) to recognize a position of a first driving part 72M (see FIG. 16A) described later. For example, the fifth unit driving part 72C1 may further include a first hall sensor (not shown), and the seventh unit driving part 72C3 may further include a second hall sensor (not shown).

According to the embodiment, the image shaking control unit 220 stably disposed on the housing 210 is provided, and the OIS is implemented through the second driving part 72C which is a coil driving part, the first driving part 72M which is a magnet driving part, and the lens unit 222c including a tunable prism, and thus occurrence of a decenter or tilt phenomenon may be minimized to achieve the best optical characteristics.

In addition, according to the embodiment, unlike the conventional method of moving a plurality of solid lenses, the OIS is implemented by driving the shaper unit 222 through the lens unit 222c including the tunable prism, the first driving part 72M which is a magnet driving part, and the second driving part 72C which is a coil driving part, and thus there is a technical effect that the OIS may be implemented with low power consumption.

Next, referring to FIG. 16A and FIG. 16B, the second camera actuator 200 of the embodiment may include the housing 210, the image shaking control unit 220 including the shaper unit 222 and the first driving part 72M and disposed on the housing 210, the second driving part 72C disposed on the housing 210, and a prism unit 2230 disposed on the image shaking control unit 220 and including a fixed prism 232.

Referring to FIG. 16A, the housing 210 may include a predetermined opening 212H through which light may pass at a housing body 212, and may include a housing side portion 214P extending above the housing body 212 and including a driving part hole 214H in which the second driving part 72C is disposed.

For example, the housing 210 may include a first housing side portion 214P1 extending above the housing body 212 and including a first driving part hole 214H1 in which the second driving part 72C is disposed, and a second housing side portion 214P2 including a second driving part hole 214H2 in which the second driving part 72C is disposed.

According to the embodiment, the second driving part 72C is disposed on the housing side portion 214P, and the OIS is implemented by driving the shaper unit 222 and the lens unit 222c including the tunable prism through the first driving part 72M, which is a magnet driving part, and an electromagnetic force, and thus the OIS may be implemented with low power consumption.

In addition, according to the embodiment, the OIS is implemented by controlling the lens unit 222c including a tunable prism through the second driving part 72C stably fixed on the housing side portion 214P and the first driving part 72M which is a magnet driving part, and thus occurrence of a decenter or tilt phenomenon may be minimized to achieve the best optical characteristics.

Next, the fixed prism 232 may be a right-angle prism, and may be disposed inside the first driving part 72M of the image shaking control unit 220. In addition, in the embodiment, a predetermined prism cover 234 is disposed above the fixed prism 232 so that the fixed prism 232 may be tightly coupled to the housing 210, and thus there is a technical effect that prism tilt and occurrence of decenter at the second camera actuator 200 may be prevented.

In addition, according to the embodiment, the image shaking control unit 220 is disposed so as to utilize a space below the prism unit 230 and overlap each other, and thus there is a technical effect that it is possible to provide an ultra-thin and ultra-small camera actuator and a camera module including the same.

In particular, according to the embodiment, the prism unit 230 and the lens unit 222c including the tunable prism may be disposed very close to each other, and thus there is a special technical effect that even though a change in an optical path is made fine in the lens unit 222c, the change in the optical path may be widely secured in the actual image sensor unit.

Figure 20A:
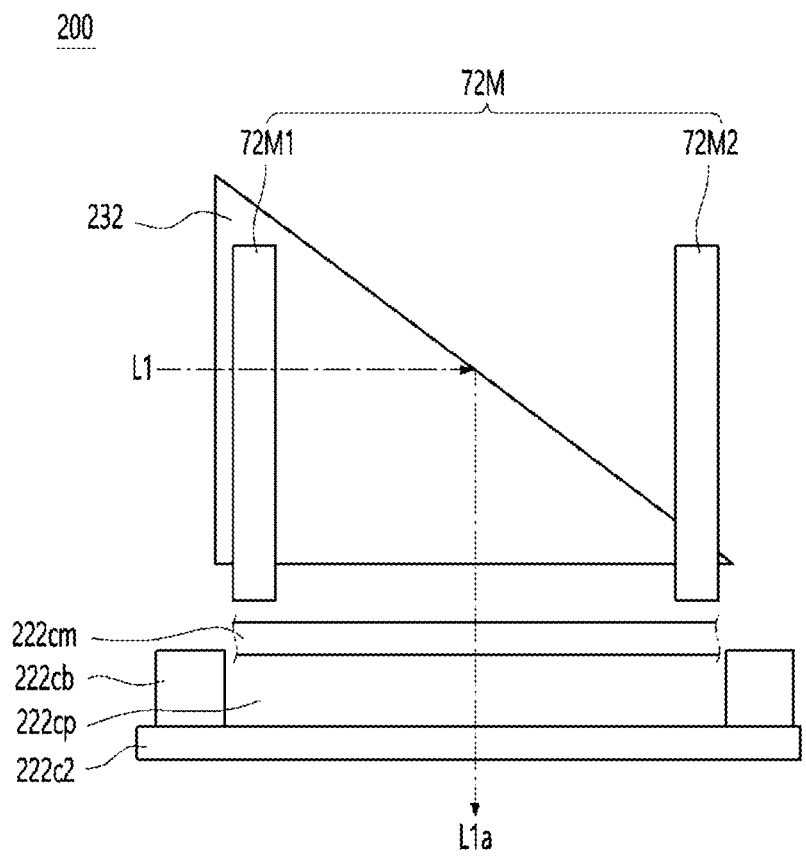
FIGS. 20A to 20B are operation example views of a second camera actuator of an embodiment.
Figure 20B:
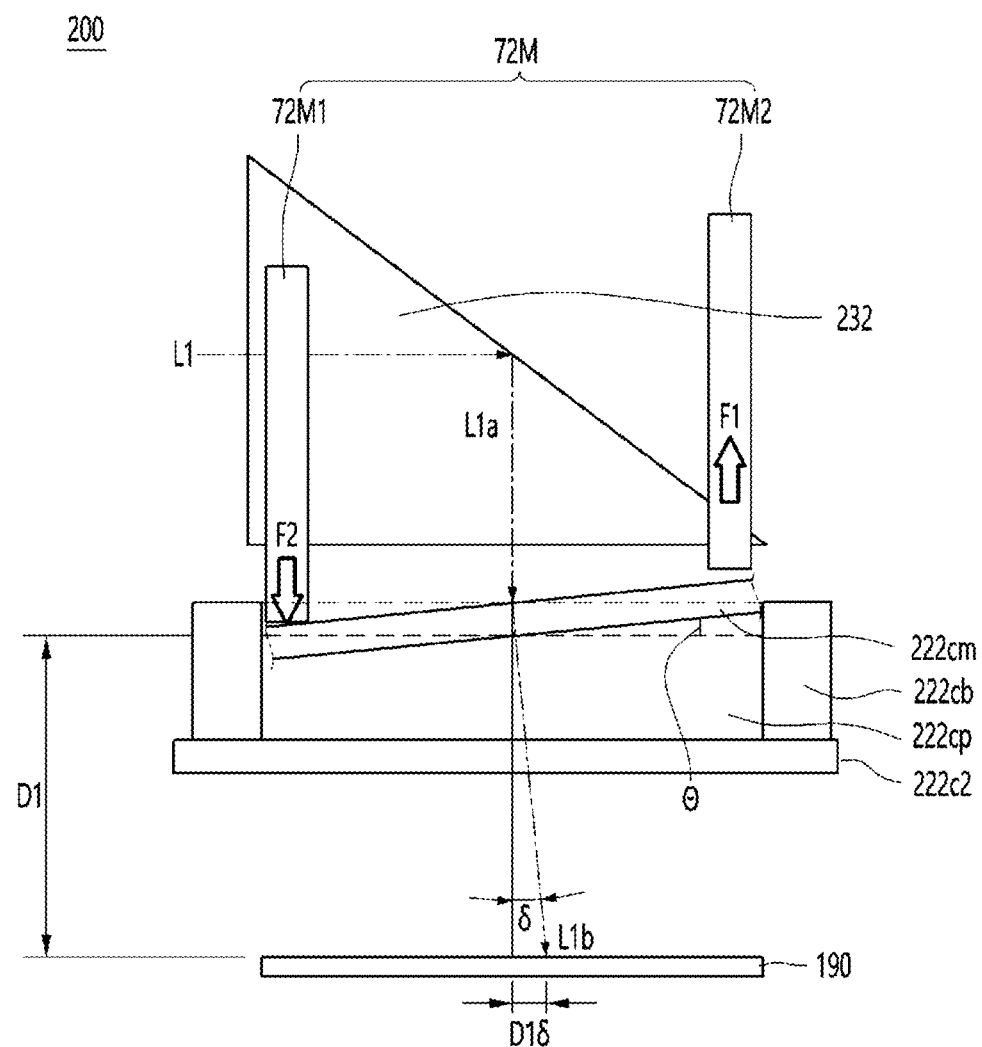

For example, referring briefly to FIG. 20B, a second moving path L1a of light beam changed by the fixed prism 232 may be changed by the tunable prism 222cp to be changed to a third moving path L1b.

At this time, according to the embodiment, the fixed prism 232 and the lens unit 222c including the tunable prism may be disposed very close to each other, and a distance between the lens unit 222c and an image plane 190P of the first lens assembly (not shown) may be secured to be relatively long.

Accordingly, a first distance D1δ reflected on the image plane 190P may be secured widely according to a change in an inclination of a predetermined angle Θ in the tunable prism 222cp, and thus there is a special technical effect that even though the change in the optical path is made fine in the lens unit 222c, the change in the optical path may be widely secured in the actual image sensor unit.

Meanwhile, according to the embodiment, as shown in FIGS. 11A and 11B, it is possible to implement OIS technology that corrects image quality by changing an optical path according to a change in the inclination of the predetermined angle Θ of the tunable prism 222cp by disposing the gyro sensor 151 in the first camera actuator 100 and detecting the movement of the camera module.

Meanwhile, in the related art, there is a technical problem that an error occurs in the degree of movement of the lens unit and the degree of movement sensed by the gyro sensor according to the user's movement as the gyro sensor is disposed to be spaced apart from the lens unit. For example, when the camera module rotates around the gyro sensor, there is a problem that a difference between the degree of movement of the gyro sensor and the degree of movement of the lens unit increases, and thus the accuracy of angular acceleration data is lowered.

However, according to the embodiment, an error in the degree of movement of the lens unit and the degree of movement sensed by the gyro sensor according to the user's movement is remarkably reduced as the gyro sensor 251 is disposed in close contact with the side surface of the base 20 on which the lens unit is disposed, and thus there is a special technical effect that may greatly improve the precision of the angular acceleration of the gyro sensor.

Figure 17A:
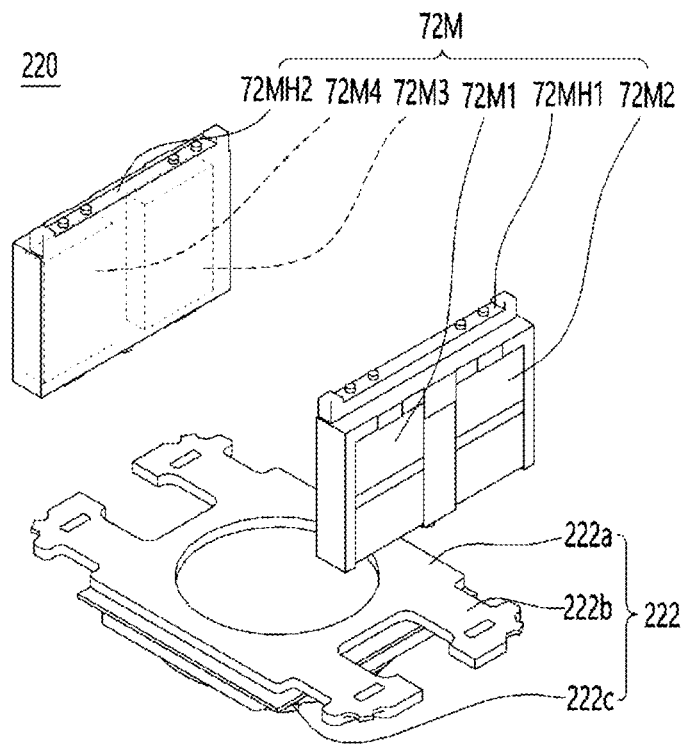
FIG. 17A is an exploded perspective view of an image shake control unit of the second camera actuator of the embodiment shown in FIG. 16A.
Figure 17B:
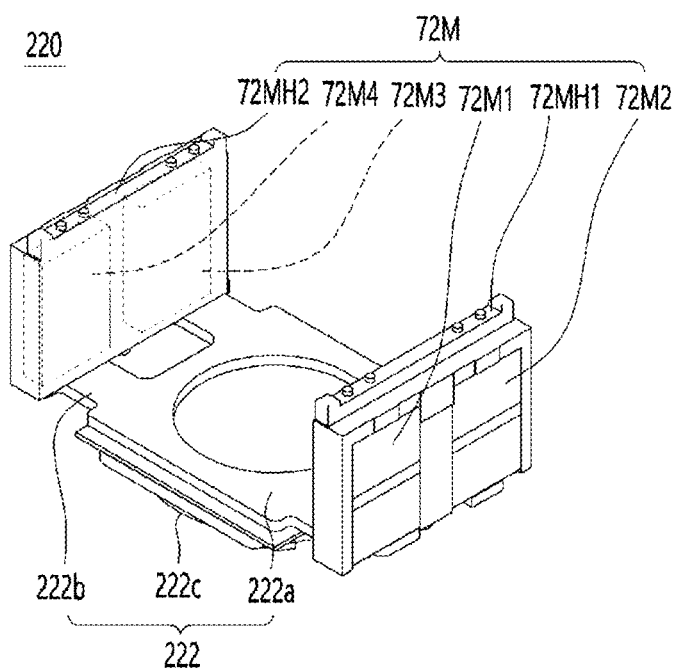
FIG. 17B is a combined perspective view of the image shake control unit of the second camera actuator of the embodiment shown in FIG. 17A.
Figure 17C:
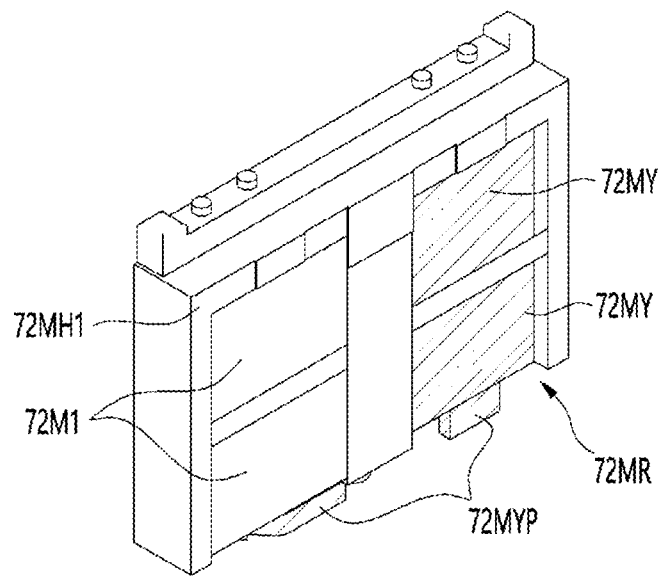
FIG. 17C is an exploded perspective view of a first driving part in the image shake control unit shown in FIG. 17A.

Next, FIG. 17A is an exploded perspective view of the image shaking control unit 220 of the second camera actuator 300 of the embodiment shown in FIG. 16A, and FIG. 17B is a combined perspective view of the image shaking control unit 220 of the second camera actuator of the embodiment shown in FIG. 17A, and FIG. 17C is an exploded perspective view of the first driving part 72M of the image shaking control unit 220 shown in FIG. 17A.

Referring to FIGS. 17A and 17B, in the embodiment, the image shaking control unit 220 may include the shaper unit 222 and the first driving part 72M.

The shaper unit 222 may include a shaper body 222a including a hole through which light may pass, and a protrusion 222b extending laterally from the shaper body 222a and coupled to the first driving part 72M in a first vertical direction.

In addition, the shaper unit 222 may include a lens unit 222c disposed on the shaper body 222a in a second vertical direction opposite to the first vertical direction and including a tunable prism.

Accordingly, according to the embodiment, OIS is implemented through the image shaking control unit 220 including the shaper unit 222 and the first driving part 72M, and the lens unit 222c including the tunable prism, and thus there is a technical effect that occurrence of a decenter or tilt phenomenon may be minimized to achieve the best optical characteristics.

Specifically, referring to FIGS. 17A and 17B, the first driving part 72M may include a single or a plurality of magnet frames 72MH1 and 72MH2 coupled to the protrusion 222b, and a unit driving part disposed on the magnet frames 72MH1 and 72MH2.

For example, the first driving part 72M may include a first magnet frame 72MH1 and a second magnet frame 72MH2, and a first unit driving part 72M1 and a second unit driving part 72M2 may be disposed on the first magnet frame 72MH, and a third unit driving part 72M3 and a fourth unit driving part 72M4 may be disposed on the second magnet frame 72MH2.

Each of the first to fourth unit driving parts 72M1, 72M2, 72M3, and 72M4 may include first to fourth magnets.

FIG. 17C is an exploded perspective view of the first driving part 72M of the image shaking control unit 220 shown in FIG. 17A.

In the embodiment, the first driving part 72M may block the interference of the magnetic field by further including yokes 72MY disposed on the first and second magnet frames 72MH1 and 72MH2.

For example, the first magnet frame 72MH1 of the first driving part 72M may include a frame groove 72MR, and the yoke 72MY may be disposed on the frame groove 72MR. Thereafter, the first unit driving part 72M1 and the second unit driving part 72M2 may be disposed on the yoke 72MY, respectively.

At this time, the yoke 72MY may include a yoke protrusion 72MYP to be firmly coupled to the protrusion 222b of the shaper unit 222.

According to the embodiment, there is a technical effect that it is possible to provide a camera actuator capable of inhibiting a magnetic field interference with a magnet for AF or Zoom and a camera module including the same when the OIS is implemented.

For example, according to the embodiment, when the OIS is implemented, the first driving part 72M, which is a magnet driving part, is disposed on the second camera actuator 200 separated from the first camera actuator 100, and thus there is a technical effect that that it is possible to provide a camera actuator capable of inhibiting a magnetic field interference with a magnet for AF or Zoom and a camera module including the same.

Thus, according to the embodiment, when the camera module is applied to an advanced driver assistance system (ADAS) of a vehicle, it is possible to provide a camera actuator capable of implementing OIS technology with high data precision when vehicle vibration occurs, and a camera module including the same.

For example, according to the embodiment, when the camera module is applied to an advanced driver assistance system (ADAS) of a vehicle, the first driving part 72M, which is a magnet driving part, is disposed on the second camera actuator 200, so that a magnetic field interference with the first magnet 116 or the second magnet 126 for AF or Zoom of the first camera actuator 100 may be inhibited, and accordingly, it is possible to provide a camera actuator capable of implementing OIS technology with high data precision when vehicle vibration occurs, and a camera module including the same.

For example, according to the embodiment, the first driving part 72M, which is the magnet driving part, is disposed in a first side direction of the housing 210 in the second camera actuator 200, and the fourth driving part 160 including the first magnet 116 and the second magnet 126 is disposed in the first camera actuator 100 disposed in a direction opposite to the first side direction so that magnetic field interference between the first driving part 72M and the fourth driving part 160 is inhibited, and accordingly, there is a technical effect capable of implementing OIS technology with high data precision when vehicle vibration occurs.

Figure 18:
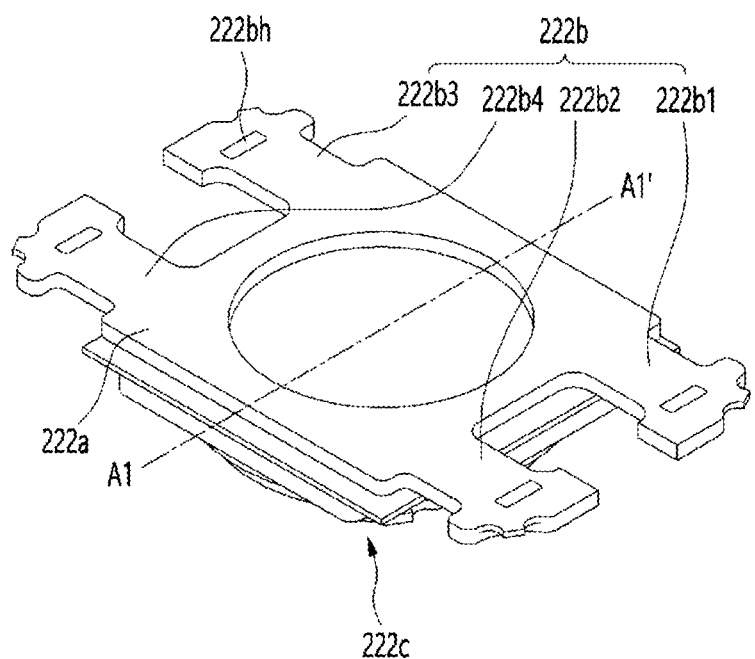
FIG. 18 is a perspective view of a shaper unit of the second camera actuator of the embodiment shown in FIG. 17A.

Next, FIG. 18 is a perspective view of the shaper unit 222 of the second camera actuator of the embodiment shown in FIG. 17A.

Referring to FIG. 18, the shaper unit 222 may include a shaper body 222a including an opening through which light may pass, a protrusion 222b extending laterally from the shaper body 222a and coupled to the first driving part 72M in a first vertical direction, and a lens unit 222c disposed on the shaper body 222a in a second vertical direction opposite to the first vertical direction and including a tunable prism 222cp.

Specifically, in the embodiment, the shaper unit 222 may include a plurality of magnet support portions extending from the shaper body 222a to both sides thereof, respectively. For example, the shaper unit 222 may include a first protrusion 222b1 and a second protrusion 222b2 that are branched and extend from the shaper body 222a to a first side thereof, and a third protrusion 222b3 and a fourth protrusion 222b4 that are branched and extend to a second side thereof.

The first driving part 72M may include first to fourth unit driving parts 72M1, 72M2, 72M3, and 72M4 coupled to the first to fourth protrusions 222b1, 222b2, 222b3, and 222b4, respectively.

Referring to FIG. 18, in the embodiment, the shaper unit 222 may include a coupling groove 222bh in the magnet support portion to be coupled to a magnet frame. Accordingly, the image shaking control unit 220 as shown in FIG. 17B may be coupled to the shaper unit 222.

According to the embodiment, in a state in which the first driving part 72M is firmly coupled to the shaper unit 222, OIS is implemented through an optical path control of the lens unit 222c including a tunable prism, and thus there is a special technical effect that occurrence of a decenter or tilt phenomenon may be minimized to achieve the best optical characteristics.

Figure 19:
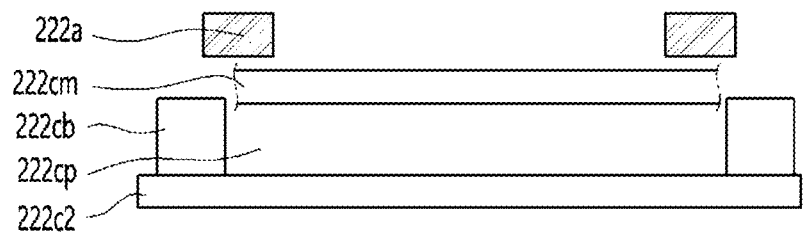
FIG. 19 is a cross-sectional view of a lens unit taken along line A1-A1' of the shaper unit shown in FIG. 18.

Next, FIG. 19 is a cross-sectional view of the lens unit 222c taken along line A1-A1' of the shaper unit 222 shown in FIG. 18.

Referring to FIG. 19, in the embodiment, the lens unit 222c may include a translucent support 222c2, a bracket 222cb disposed on the translucent support 222c2 with a predetermined accommodation space, a tunable prism 222cp or a liquid lens (not shown) disposed in the accommodation space of the bracket 222cb, a flexible plate 222cm disposed on the tunable prism 222cp or the liquid lens, and a second translucent support (not shown) disposed on the flexible plate 222cm. The flexible plate 222cm may be formed of a translucent material.

The translucent support 222c2 and the second translucent support (not shown) may be formed of a translucent material. For example, the translucent support 222c2 and the second translucent support may be formed of glass, but the embodiment is not limited thereto.

The translucent support 222c2 and the second translucent support may have a hollow circular ring shape or a square ring shape.

A size of the second translucent support (not shown) may be formed smaller than that of the accommodation space of the bracket 222cb.

The tunable prism 222cp may include an optical liquid disposed in a space created by the translucent support 222c2, the support bracket 222cb, and the flexible plate 222cm.

In the embodiment, an optical liquid used by the tunable prism 222cp may be a transparent, low-fluorescent, non-toxic material or a wedge prism. For example, the optical liquid of the embodiment may use a chlorofluorocarbon (CFC) component or the like, but the embodiment is not limited thereto.

The bracket 222cb may be formed of a stretchable material or a non-stretchable material. For example, the bracket 222cb may be formed of an elastic film material or a metal material, but the embodiment is not limited thereto.

When the flexible plate 222cm receives a predetermined force by the shaper body 222a according to movement of the first driving part 72M, as shown in FIG. 20B, a part of the flexible plate 222cm moves upward or downward due to characteristics of a flexible elastic material, and the form of the tunable prism 222cp may be variable.

For example, the flexible plate 222cm may be a reverse osmosis (RO) membrane, a nano filtration (NF) membrane, a ultra-filtration (UF) membrane, a micro filtration (MF) membrane, and the like, but the embodiment is not limited thereto. Here, the RO membrane may be a membrane having a pore size of about 1 to 15 angstroms, the NF membrane may be a membrane having a pore size of about 10 angstroms, the UF membrane may be a membrane having a pore size of about 15 to 200 angstroms, and the MF membrane may be a membrane having a pore size of about 200 to 1000 angstroms.

According to the embodiment, the image shaking control unit 220 stably disposed on the housing 310 is provided, and the shaper unit 222 and the first driving part 72M are included, and thus there is a technical effect that when the OIS is implemented through the lens unit 222c including the tunable prism 222cp, occurrence of a decenter or tilt phenomenon may be minimized to achieve the best optical characteristics.

Next, FIGS. 20A to 20B are operation example views showing an operation of the first camera actuator 100 of the embodiment.

For example, FIG. 20A is an example view before an operation of the OIS actuator of the embodiment, and FIG. 20B is an example view after the operation of the OIS actuator of the embodiment.

In a broad sense, in an embodiment, the prism may include a fixed prism 232 that changes a path of a predetermined light beam, and a tunable prism 222cp that is disposed below the fixed prism 232 and changes a path of a light beam emitted from the fixed prism 232.

Referring to FIGS. 20A and 20B, the second camera actuator 300 of the embodiment may change a form of the tunable prism 222cp through the first driving part 72M and the second driving part 72C to control the path of the light beam.

For example, in the embodiment, the second camera actuator 300 may control the path of the light beam by changing an apex angle Θ of the tunable prism 222cp through the first driving part 72M which is a magnet driving part.

For example, referring to FIG. 20A, an incident light L1 is changed to the second moving path L1a by the fixed prism 232, but the light path is not changed by the tunable prism 222cp.

On the other hand, referring to FIG. 20B, the second moving path L1a of the light beam changed by the fixed prism 232 may be changed in the tunable prism 222cp to be changed to the third moving path L1b.

For example, when the flexible plate 222cm receives a predetermined force by the shaper body 222a according to movement of the first driving part 72M, the second translucent support (not shown) receives the force, and the force is transmitted to the flexible plate 222cm, and a part of the flexible plate 222cm moves upward or downward due to characteristics of a flexible elastic material, and the form of the tunable prism 222cp may be variable.

For example, as a left upper end of the shaper body 222a receives a force F2 in a second direction by the first unit driving part 72M1, and a right upper end of the shaper body 222a receives a force F1 in a first direction by the second unit driving part 72M2, it may be varied. The second translucent support (not shown) receives a force according to movement of the shaper body 222a, and the flexible plate 222cm may be changed in an inclination of a predetermined angle Θ of by the force.

Hereinafter, with reference to FIG. 20B, in the embodiment, an image stabilizing device for controlling the path of the light beam will be described in further detail by deforming the shape of the tunable prism 222cp through the first driving part 72M.

First, according to the embodiment, due to occurrence of camera shake, an image needs to move to a side surface by a first distance D1δ on an image plane (not shown) of a lens assembly provided in the first camera actuator 100.

At this time, D1 is a distance from the tunable prism 222*cp* to the image plane of the lens assembly, δ is a chromatic aberration of the tunable prism 222*cp*, and Θ is an apex angle of the tunable prism 222*cp*.

That is, according to the embodiment, after calculating a changed apex angle Θ of the tunable prism 222*cp*, the path of the light beam may be controlled to the third moving path L1*b* by changing the apex angle Θ of the tunable prism 222*cp* through the first driving part 72M.

At this time, a relationship of δ=n−1XΘ may be established between the chromatic aberration δ of the tunable prism 222*cp* and the apex angle Θ of the tunable prism 222*cp* (where n is a refractive index of the tunable prism 222*cp* with respect to a center wavelength of a band of interest).

According to the embodiment, the prism unit 230 and the lens unit 222*c* including the tunable prism may be disposed very close to each other, and thus there is a special technical effect that even though a change in an optical path is made fine in the lens unit 222*c*, the change in the optical path may be widely secured in the actual image sensor unit.

For example, according to the embodiment, the fixed prism 232 and the lens unit 222*c* including the tunable prism may be disposed very close to each other, and a distance between the lens unit 222*c* and an image plane 190P of the first lens assembly (not shown) may be secured to be relatively long. Accordingly, a first distance D1δ reflected on the image plane 190P may be secured widely according to a change in an inclination of a predetermined angle Θ in the tunable prism 222*cp*, and thus there is a special technical effect that even though the change in the optical path is made fine in the lens unit 222*c*, the change in the optical path may be widely secured in the actual image sensor unit.

Figure 21A:
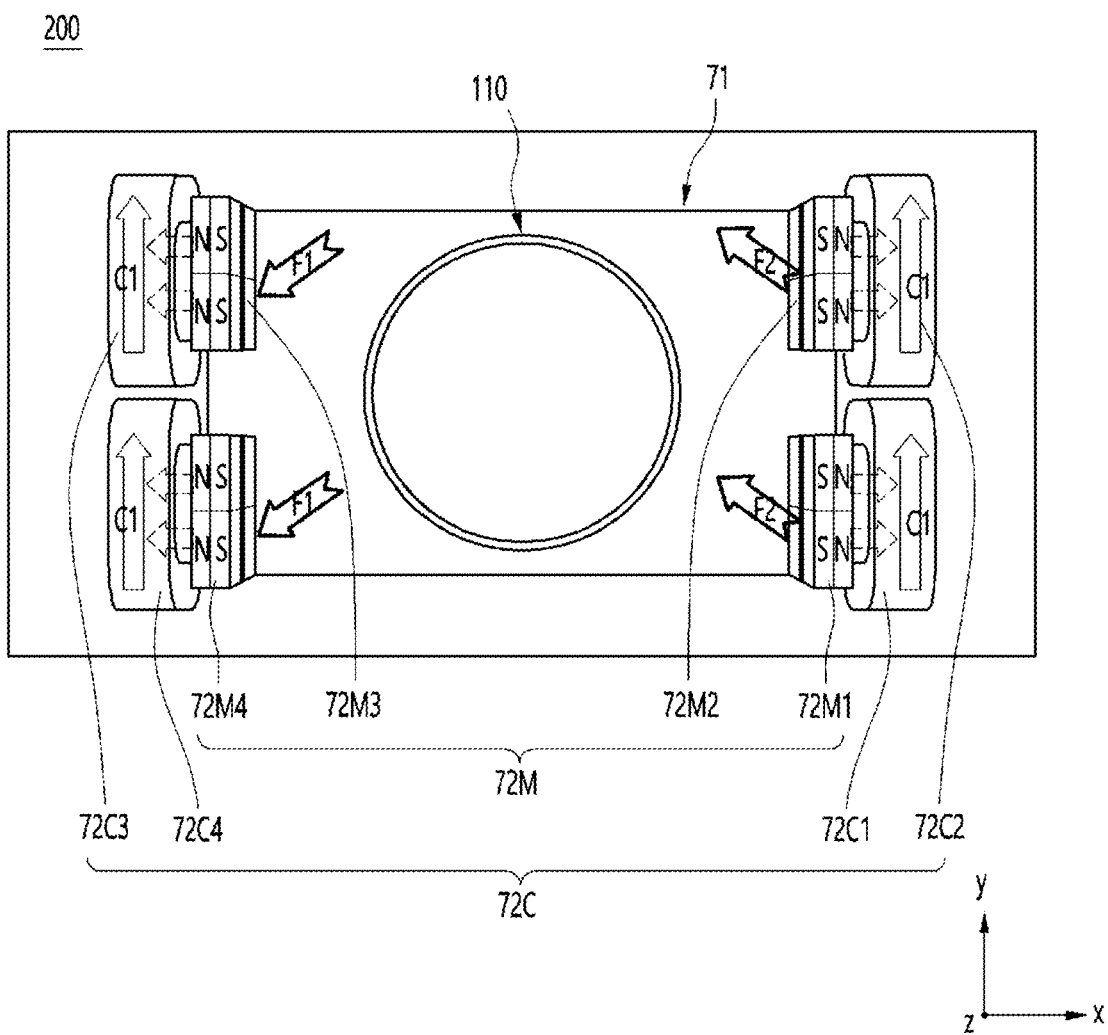
FIG. 21A is a first operation example view of the second camera actuator of the embodiment.

Next, FIG. 21A is a first operation example view of the second camera actuator of the embodiment.

For example, FIG. 21A is the first operation example view viewed from a z-axis direction of the second camera actuator 300 according to the embodiment shown in FIG. 14B.

Referring to FIG. 21A, power is applied to the second driving part 72C through the second circuit board 350, and current flow through each coil, and accordingly, an electromagnetic force may be generated between the second driving part 72C and the first driving part 72M in a first direction F1 or a second direction F2, and the flexible plate 222*cm* may be tilted at a predetermined angle by the first driving part 72M that is moved, thereby controlling the apex angle Θ of the tunable prism 222*cp*.

For example, referring to FIG. 21A, the first unit driving part 72M1 and the second unit driving part 72M2 may be disposed so that a direction of the magnetic force may be generated in a direction of the fifth unit driving part 72C1 and the sixth unit driving part 72C2, and the third unit driving part 72M3 and the fourth unit driving part 72M4 may be disposed so that the direction of the magnetic force may be generated in a direction of the seventh unit driving part 72C3 and the eighth unit driving part 72C4.

At this time, when a current C1 in the first direction flows in the fifth unit driving part 72C1 and the sixth unit driving part 72C2, the force F2 may be applied in the second direction. On the other hand, when the current C1 in the first direction flows in the seventh unit driving part 72C3 and the eighth unit driving part 72C4, the force F1 may be applied in the first direction opposite to the second direction.

Accordingly, in the first unit driving part 72M1 and the second unit driving part 72M2, the force F2 may be applied to the flexible plate 222*cm* in the second direction, and in the third unit driving part 72M3 and the fourth unit driving part 72M4, the force F1 may be applied to the flexible plate 222*cm* in the first direction, and accordingly, the apex angle Θ of the tunable prism 222*cp* may be deformed at a first angle Θ1 to change and control the light path.

Figure 21B:
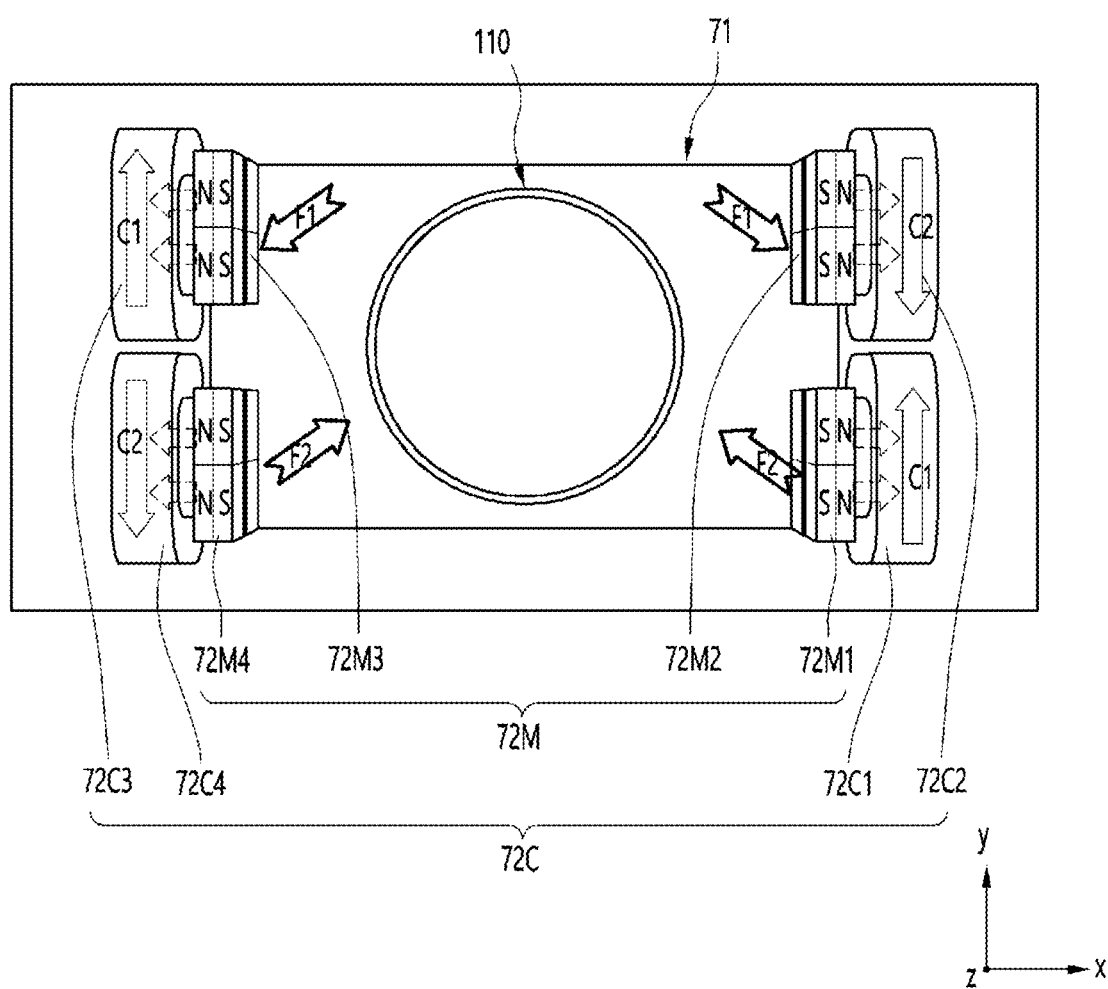
FIG. 21B is a second operation example view of the second camera actuator of the embodiment.

Next, FIG. 21B is a second operation example view of the second camera actuator 300 of the embodiment.

For example, FIG. 21B is the second operation example view viewed from a z-axis direction of the second camera actuator 300 according to the embodiment shown in FIG. 14B.

For example, power is applied to the second driving part 72C, and current flow through each coil, and accordingly, an electromagnetic force may be generated between the second driving part 72C and the first driving part 72M in a first direction F1 or a second direction F2, and the flexible plate 222*cm* may be tilted at a predetermined angle.

For example, referring to FIG. 21B, the first unit driving part 72M1 and the second unit driving part 72M2 may be disposed so that a direction of the magnetic force may be generated in a direction of the fifth unit driving part 72C1 and the sixth unit driving part 72C2, and the third unit driving part 72M3 and the fourth unit driving part 72M4 may be disposed so that the direction of the magnetic force may be generated in a direction of the seventh unit driving part 72C3 and the eighth unit driving part 72C4.

At this time, a current C1 in the first direction may flow in the fifth unit driving part 72C1 and the seventh unit driving part 72C3, and a current C2 in the second direction may flow in the sixth unit driving part 72C2 and the eighth unit driving part 72C4.

Accordingly, the force F2 may be applied in the second direction in the first unit driving part 72M1 and the fourth unit driving part 72M4, and the force F1 may be applied in the first direction in the second unit driving part 72M2 and the third unit driving part 72M3.

Accordingly, in the first unit driving part 72M1 and the fourth unit driving part 72M4, the force F2 may be applied to the flexible plate 222*cm* of the variable prism 222*cp* in the second direction, and in the second unit driving part 72M2 and the third unit driving part 72M3, the force F1 may be applied to the flexible plate 222*cm* of the variable prism 222*cp* in the first direction, and accordingly, the apex angle Θ of the tunable prism 222*cp* may be deformed at a second angle Θ2 to change and control the light path.

According to the embodiment, it is possible to implement OIS technology that corrects image quality by changing an optical path according to a change in the inclination of the predetermined angle Θ of the tunable prism 222*cp* by disposing the gyro sensor 151 in the first camera actuator 100 and detecting the movement of the camera module.

Meanwhile, in the related art, there is a technical problem that an error occurs in the degree of movement of the lens unit and the degree of movement sensed by the gyro sensor according to the user's movement as the gyro sensor is disposed to be spaced apart from the lens unit. For example, when the camera module rotates around the gyro sensor, there is a problem that a difference between the degree of movement of the gyro sensor and the degree of movement of the lens unit increases, and thus the accuracy of angular acceleration data is lowered.

However, according to the embodiment, an error in the degree of movement of the lens unit and the degree of movement sensed by the gyro sensor according to the user's movement is remarkably reduced as the gyro sensor 251 is disposed in close contact with the side surface of the base 20 on which the lens unit is disposed, and thus there is a special technical effect that may greatly improve the precision of the angular acceleration of the gyro sensor.

In addition, according to the embodiment, the image shaking control unit 220 is disposed so as to utilize a space below the prism unit 230 and overlap each other, and accordingly, there is a technical effect that it is possible to provide an ultra-slim and ultra-small camera actuator and a camera module including the same.

In addition, according to the embodiment, lens size limitation of an optical system lens assembly is eliminated when implementing the OIS by disposing the image shaking control unit 220 under the prism unit 230, and thus there is a technical effect that it is possible to secure a sufficient amount of light and a camera module including the same.

In addition, according to the embodiment, the image shaking control unit 220 stably disposed on the housing 210 is provided, and a shaper unit 222 and a first driving part 72M are included, and thus there is a technical effect that it is possible to achieve the best optical characteristics and a camera module including the same by minimizing occurrence of a decenter or tilt phenomenon when the OIS is implemented through a lens unit 222c including a tunable prism 222cp.

In addition, according to the embodiment, when the OIS is implemented, the first driving part 72M, which is a magnet driving part, is disposed in the second camera actuator 200 separated from the first camera actuator 100, and thus there is a technical effect that it is possible to inhibit a magnetic field interference with a magnet for AF or Zoom and a camera module including the same.

Figure 21C:
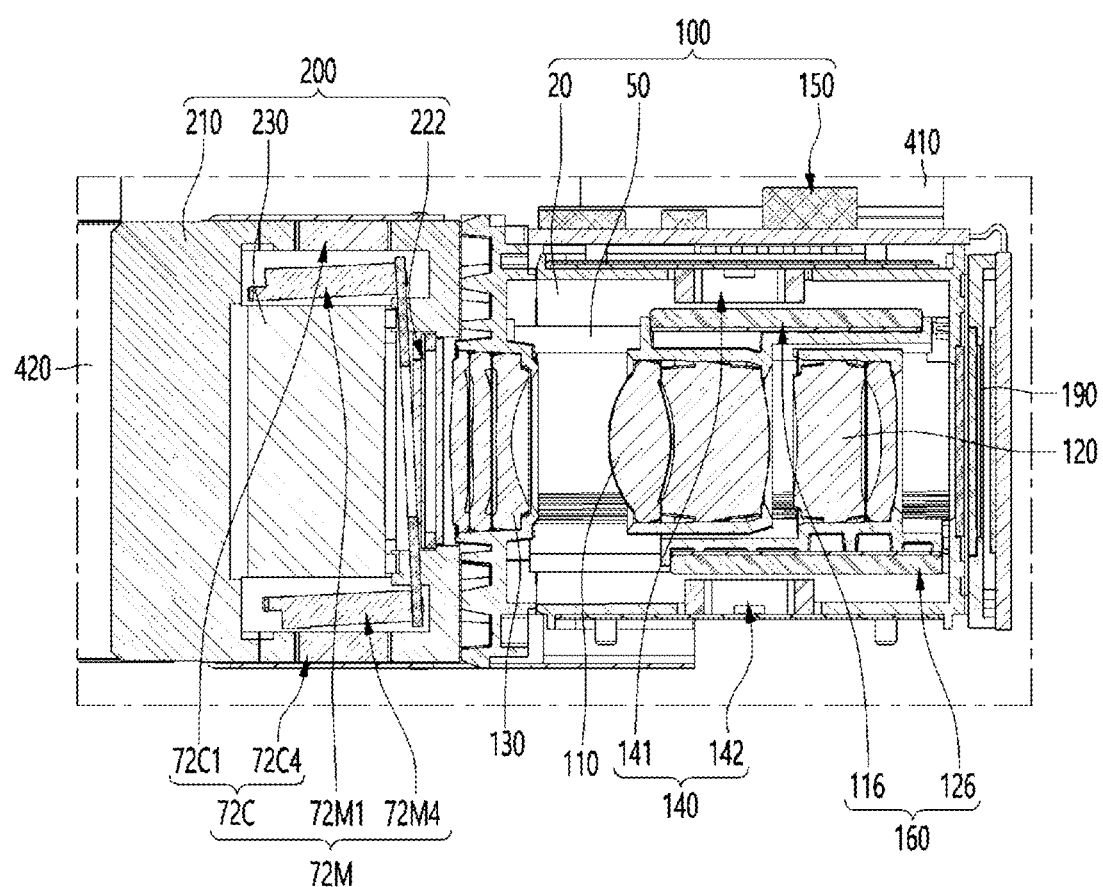
FIG. 21C is an operation example view of a first camera module of the embodiment.

FIG. 21C is an operation example view of a first camera module 1000 of the embodiment.

Referring to FIG. 21C, power is applied to the second driving part 72C, and current flow through each coil, and accordingly, electromagnetic force may be generated between the second driving part 72C and the first driving part 72M in the first direction or the second direction, and the flexible plate 222cm may be tilted at a predetermined angle by the first driving part 72M that is moved, thereby controlling the apex angle Θ of the tunable prism 222cp.

For example, referring to FIG. 21C, the first unit driving part 72M1 may be disposed so that a direction of the magnetic force may be generated in a direction of the fifth unit driving part 72C1, and the fourth unit driving part 72M4 may be disposed so that the direction of the magnetic force may be generated in a direction of the eighth unit driving part 72C4.

At this time, when a current in the first direction flows in the fifth unit driving part 72C1, the force may be applied in the second direction. On the other hand, when the current in the first direction flows in the eighth unit driving part 72C4, the force may be applied in the first direction opposite to the second direction.

Accordingly, in the first unit driving part 72M1, the force may be applied to the flexible plate 222cm in the second direction, and in the fourth unit driving part 72M4, the force may be applied to the flexible plate 222cm in the first direction, and accordingly, the apex angle Θ of the tunable prism 222cp may be deformed at a first angle to change and control the light path.

Meanwhile, according to the embodiment, there is a technical effect that it is possible to provide a camera actuator capable of inhibiting a magnetic field interference with a magnet for AF or Zoom and a camera module including the same when the OIS is implemented.

For example, according to the embodiment, when the OIS is implemented, the first driving part 72M, which is a magnet driving part, is disposed on the second camera actuator 200 separated from the first camera actuator 100, and thus there is a technical effect that that it is possible to provide a camera actuator capable of inhibiting a magnetic field interference with a magnet for AF or Zoom and a camera module including the same.

Thus, according to the embodiment, when a vehicle vibration occurs when a camera module is applied to an advanced driver assistance system (ADAS) of a vehicle, it is possible to provide a camera actuator capable of implementing OIS technology with high data precision and a camera module including the same.

For example, according to the embodiment, when the camera module is applied to the advanced driver assistance system (ADAS) of the vehicle, the first driving part 72M, which is a magnet driving part, is disposed on the second camera actuator 200, so that a magnetic field interference with the first magnet 116 or the second magnet 126 for AF or Zoom of the first camera actuator 100 may be inhibited, and accordingly, it is possible to provide a camera actuator capable of implementing OIS technology with high data precision when vehicle vibration occurs, and a camera module including the same.

For example, according to the embodiment, the first driving part 72M, which is the magnet driving part, is disposed in a first side direction of the housing 210 in the second camera actuator 200, and the fourth driving part 160 including the first magnet 116 and the second magnet 126 is disposed in the first camera actuator 100 disposed in a direction opposite to the first side direction so that magnetic field interference between the first driving part 72M and the fourth driving part 160 is inhibited, and accordingly, there is a technical effect capable of implementing OIS technology with high data precision when vehicle vibration occurs.

Figure 22:
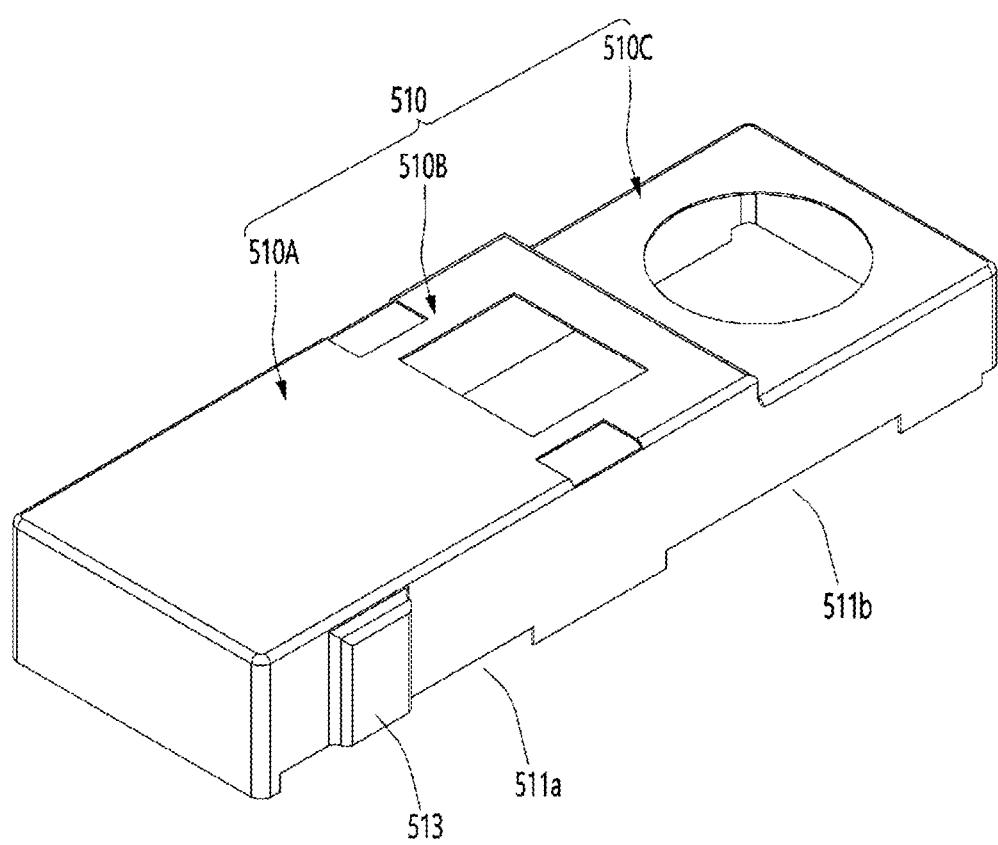
FIG. 22 is a perspective view of a first shaper unit of the second camera actuator of the embodiment.

Next, FIG. 22 is a detailed perspective view of the first shaper unit 222A of the second camera actuator 200 of the embodiment.

Referring to FIG. 22, the first shaper unit 222A may include a shaper body 222a including an opening 222ah through which light may pass, and a protruding region extending from the shaper body 222a to a side surface thereof.

For example, the first shaper unit 222A may be disposed on the lens unit 222c, and may include the shaper body 222a including a first side surface and a second side surface corresponding to the first side surface, a first protruding region b12 protruding from the first side surface of the shaper body 222a and a second protruding region b34 protruding from the second side surface of the shaper body 222a.

The first protruding region b12 may include the first protrusion 222b1 protruding from one surface of the first side surface and the second protrusion 222b2 protruding from the other surface of the first side surface and spaced apart from the first protrusion 222b1.

The second protruding region b34 may include the third protrusion 222b3 protruding from one surface of the second side surface and the fourth protrusion 222b4 protruding from the other surface of the second side surface and spaced apart from the third protrusion 222b3.

In this case, the first protrusion 222b1 may include a first extension part b1p extending from the shaper body 222a to the first side, a first support part b1e, and a first coupling groove bh1 disposed on the first support part b1e.

In addition, the second protrusion 222b2 may include a second extension part b2p extending from the shaper body 222a to the first side by branching from the first extension part b1p, a second support part b2e, and a second coupling groove b2h disposed on the support b2e.

The first and second driving part 72M1 and 72M2 may be coupled to the first coupling groove 222bh1 and the second coupling groove b2h.

In addition, the third protrusion 222b3 may include a third extension part b3p extending from the shaper body 222a to the second side by branching from the third extension part b3p, a third support part b3e, and a third coupling groove b3h disposed on the third support part b3e.

In addition, the fourth protrusion 222b4 may include a fourth extension part b4p extending from the shaper body 222a to the second side by branching from the third extension part b3p, a fourth support part b4e, and a fourth coupling groove b4h disposed on the fourth support part b4e.

The third and fourth driving parts 72M3 and 72M4 may be coupled to the third coupling groove b3h and the fourth coupling groove b4h.

In this case, referring to FIG. 22, in the embodiment, the first support part b1e which is an end of the first protrusion 222b1, and the second support part b2e which is an end of the second protrusion 222b2, are disposed to be spaced apart from each other at a second distance D2.

In addition, referring to FIG. 22, in the embodiment, the third support part b3e, which is an end of the third protrusion 222b3, and the fourth support part b4e, which is an end of the fourth protrusion 222b4, are disposed to be spaced apart from each other at a second distance D2.

Figure 23:
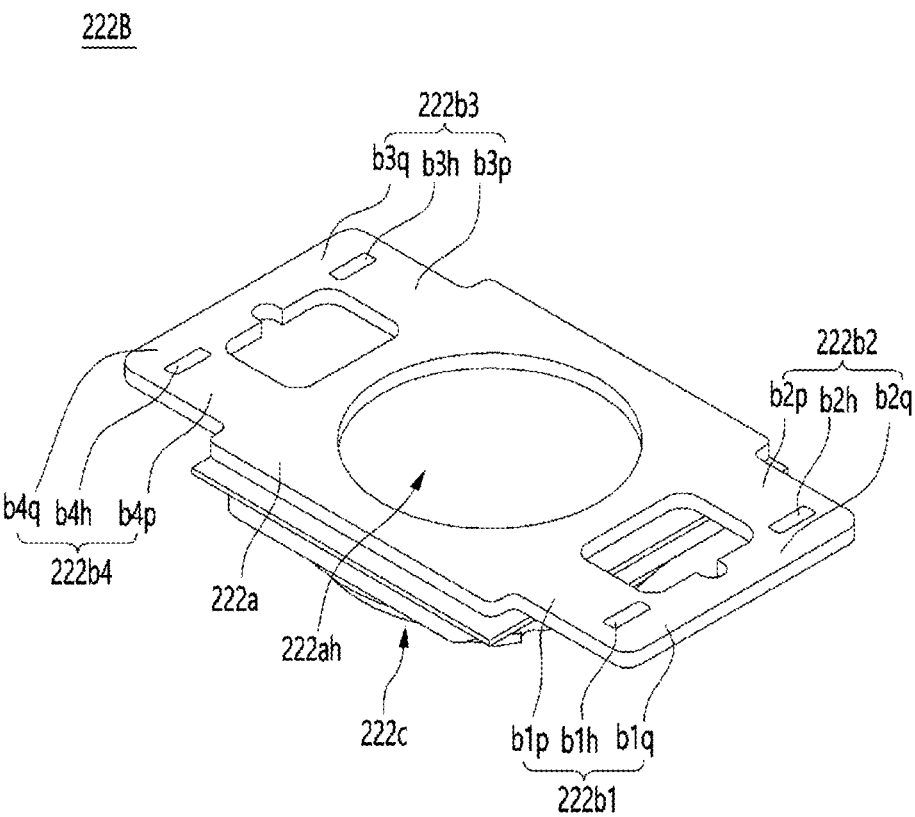
FIG. 23 is a perspective view of a second shaper unit of the second camera actuator of the embodiment.

Meanwhile, FIG. 23 is a perspective view of the second shaper unit 222B of the second camera actuator 200 of the embodiment.

Referring to FIG. 23, in the embodiment, the shaper unit 222 may include a plurality of magnet support portions extending from the shaper body 222a to both sides thereof, respectively. For example, the shaper unit 222 may include a first protrusion 222b1 and a second protrusion 222b2 that are branched and extend from the shaper body 222a to a first side thereof, and a third protrusion 222b3 and a fourth protrusion 222b4 that are branched and extend to a second side thereof.

In addition, the first protrusion 222b1 may include the first extension part b1p extending from the shaper body 222a to the first side, and the first coupling groove bh1 disposed on a first-second support part b1q and a first-second support part b1q.

In addition, the second protrusion 222b2 may include the second extension part b2p extending from the first shaper body 222a to the first side by branching from the first extension part b1p, a second-second support part b2q, and the second coupling groove b2h disposed on the second-second support part b2q.

In addition, the third protrusion 222b3 may include the third extension part b3p extending from the shaper body 222a to the second side, the second support part b3q, and the third coupling groove b3h disposed on the third-second support part b3q.

In addition, the fourth protrusion 222b4 may include the fourth extension part b4p extending from the body to the second side by branching from the third extension part b3p, a fourth-second support part b4q, and the fourth coupling groove b4h disposed on the fourth-second support part b4q.

In this case, referring to FIG. 23, in the embodiment, the first-second support part b1q which is the end of the first protrusion 222b1 and the second-second support part b2q which is the end of the second protrusion 222b2 may be connected to each other.

In addition, referring to FIG. 23, in the embodiment, the third-second support part b3q which is the end of the third protrusion 222b3 and the fourth-second support part b4q which is the end of the fourth protrusion 222b4 may be connected to each other.

Figure 24:
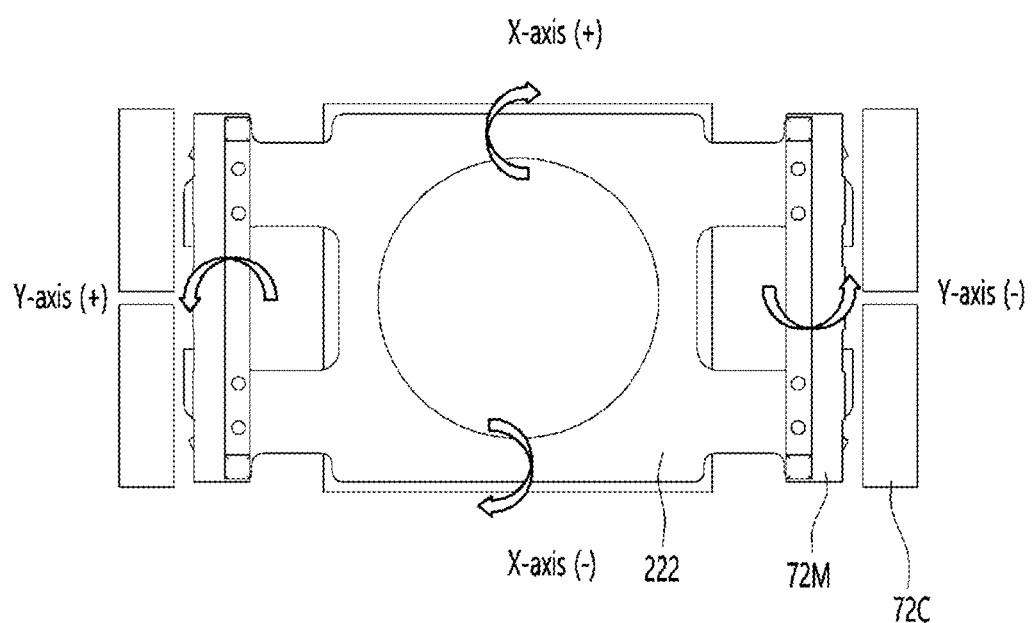
FIG. 24 is a third operation example view of the second camera actuator according to the embodiment.

FIG. 24 is an operation example view of the second camera actuator 200 according to the embodiment, and the x-axis direction and y-axis direction in FIG. 24 may be the same as or different from the previously illustrated directions.

Referring to FIG. 24, when power is applied to the second driving part 72C and current flow through each coil, an electromagnetic force may be generated between the second driving part 72C and the first driving part 72M in the first direction or the second direction, and the flexible plate 222cm may be tilted at a predetermined angle by the first driving part 72M that is moved by the electromagnetic force, thereby controlling the apex angle Θ of the tunable prism 222cp.

Figure 25A:
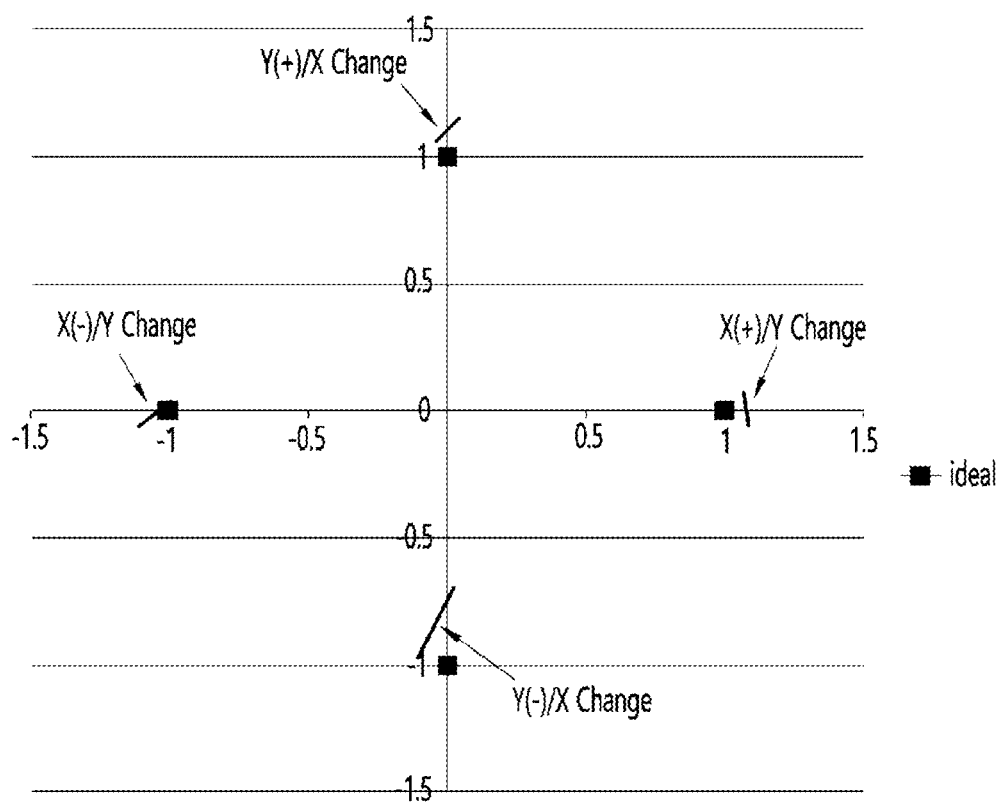
FIG. 25A shows a characteristic of change amount when implementing a second shaper unit of the second camera actuator according to the embodiment.
Figure 25B:
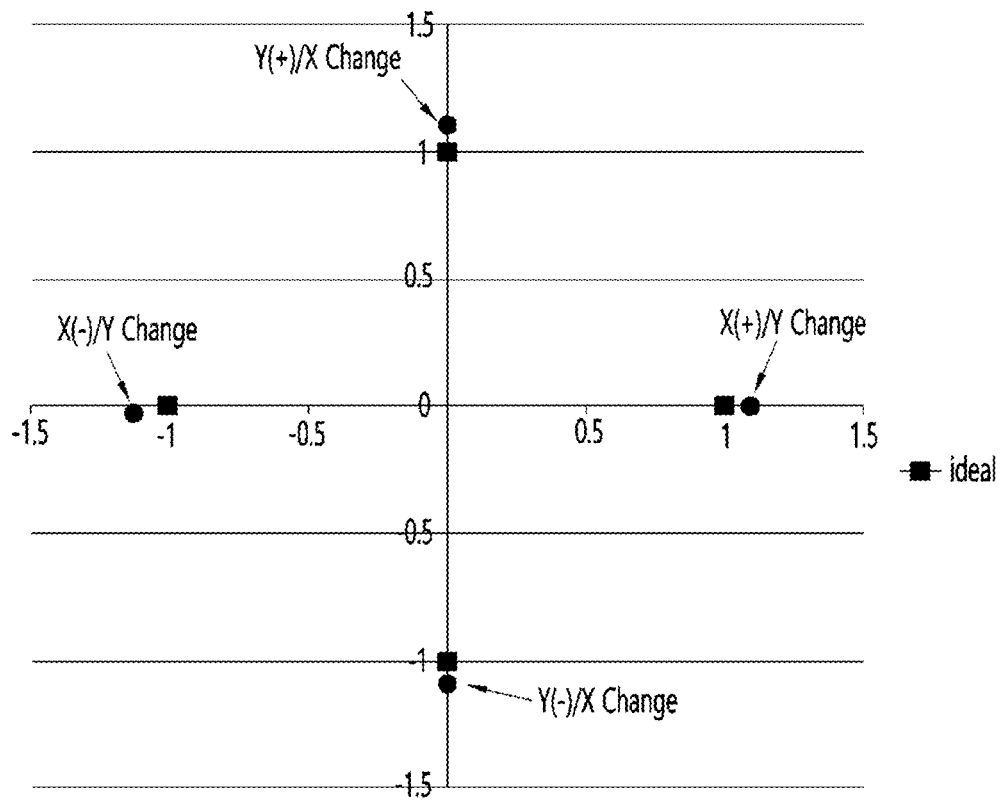
FIG. 25B shows a characteristic of change amount when implementing the first shaper unit of the second camera actuator according to the embodiment.

In this case, FIG. 25A shows a characteristic when implementing the second shaper unit 222B of the second camera actuator 200 according to the embodiment, and FIG. 25B shows a characteristic when implementing the first shaper unit 222A of the second camera actuator 200 according to the embodiment.

According to a private internal experiment using the second shaper unit 222B in the embodiment, as shown in FIG. 25A, when the first-second support portion b1q and the second-second support portion b2q are connected to each other, and the third-second support portion b3q and the fourth-second support portion b4q are connected to each other, a change amount is generated in an error range compared to a target value (ideal) when driving in each axial direction.

Meanwhile, according to a private internal experiment using the first shaper unit 222A in the embodiment, as shown in FIG. 25B, when the first support portion b1e and the second support portion b2e are spaced apart from each other by the second separation distance D2, or the third support portion b3e and the fourth support portion b4e are spaced apart from each other by the second separation distance D2, the change amount is remarkably reduced compared to the target value (ideal) when driving in each axial direction, and a remarkable performance improvement effect was derived.

That is, in the embodiment, in a case in which the first protrusion 222b1 and the second protrusion 222b2 are spaced apart from each other and the third protrusion 222b3 and the fourth protrusion 222b4 are spaced from each other, when each protrusion moves on the x-axis or y-axis, it may have less influence on other protrusions, and thus, there is a special technical effect that the change amount in error that occurs is remarkably reduced compared to the target value (ideal) when driving in each axial direction, and performance is improved.

Figure 26A:
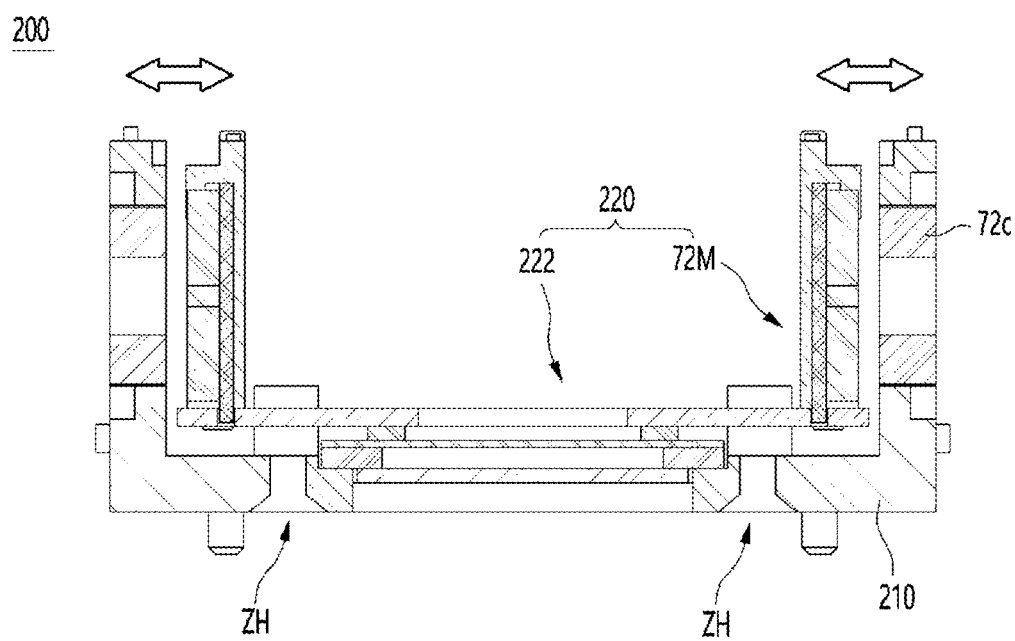
FIG. 26A is a first cross-sectional view of the second camera actuator according to the embodiment.
Figure 26B:
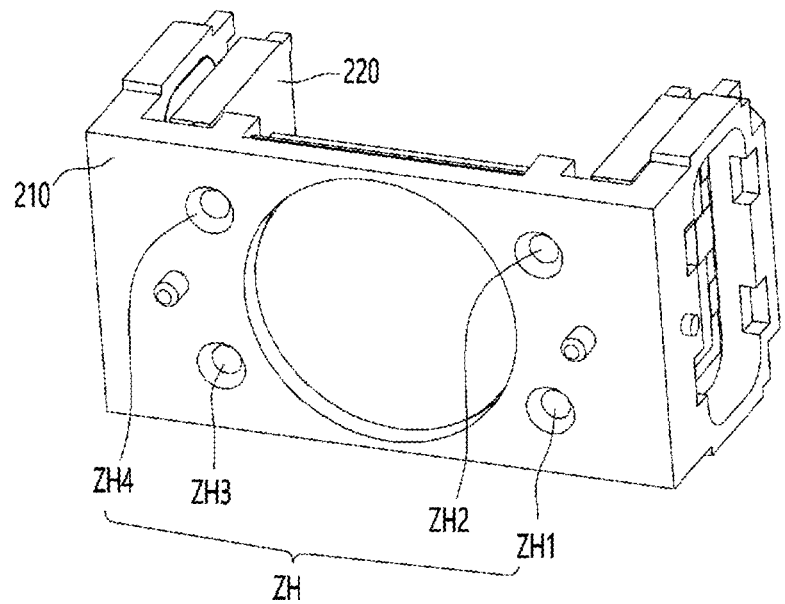
FIG. 26B is a bottom view of the second camera actuator according to the embodiment.

Next, FIG. 26A is a first cross-sectional view of the second camera actuator 200 according to the embodiment, and FIG. 26B is a perspective view of a bottom surface side of the second camera actuator 200 according to the embodiment.

Referring to FIGS. 26A and 26B, the second camera actuator 200 of the embodiment may include the housing 210, the shaper unit 222, and the first driving part 72M, and may include the image shaking control unit 220 disposed on the housing 210, the second driving part 72C disposed on the housing 210, and the prism unit 230 disposed on the image shaking control unit 220.

According to a private internal technology, when the shaper unit 222 is not firmly supported on the housing 210, a technical problem in which a tilt occurs in the lens unit 222c and the prism unit 230 has been studied.

Accordingly, in this embodiment, a jig hole ZH may be provided in the housing 210, and an assembly process may be carried out in a state in which a predetermined jig (not shown) is firmly coupled to the jig hole ZH of the housing 210 during the assembly process of the second camera actuator 200.

The jig hole ZH may be provided in plural, and may include first, second, third, and fourth jig holes ZH1, ZH2, ZH3, and ZH4. The jig may also include first, second, third, and fourth jigs.

For example, the housing 210 may include the first to fourth jig holes ZH1, ZH2, ZH3, and ZH4 formed to overlap the first to fourth protrusions 222b1, 222b2, 222b3, and 222b4 of the shaper body in the vertical direction.

The housing 210 may include an opening 212H through which light formed between the first to fourth jig holes ZH1, ZH2, ZH3, and ZH4 may pass.

In this case, the jig may pass through the jig hole ZH and protrude upward from the housing 210, and the shaper unit 222 may be firmly disposed on the protruding jig.

The first to fourth jigs may be disposed so as to overlap the first to fourth protrusions 222b1, 222b2, 222b3, and 222b4 of the shaper body in the vertical direction.

Thereafter, the first driving part 72M, the second driving part 72C, and the like may be firmly coupled on the shaper unit 222, and there is a special technical effect that may remarkably inhibit the occurrence of tilt.

According to the embodiment, there is a technical effect that it is possible to provide an ultra-slim and ultra-small camera actuator and a camera module including the same.

In addition, according to the embodiment, there is a technical effect that it is possible to provide a camera actuator capable of securing a sufficient amount of light and a camera module including the same by eliminating lens size limitation of an optical system lens assembly when the OIS is implemented.

In addition, according to the embodiment, there is a technical effect that it is possible to provide a camera actuator capable of achieving the best optical characteristics and a camera module including the same by minimizing occurrence of a decenter or tilt phenomenon when the OIS is implemented.

In addition, according to the embodiment, there is a technical effect that it is possible to provide a camera actuator capable of inhibiting a magnetic field interference with a magnet for AF or Zoom and a camera module including the same when the OIS is implemented.

In addition, according to the embodiment, there is a technical effect that it is possible to provide a camera actuator capable of implementing the OIS with low power consumption and a camera module including the same.

In addition, according to the embodiment, the prism unit 230 and the lens unit 222c including the tunable prism may be disposed very close to each other, and thus there is a special technical effect that even though a change in an optical path is made fine in the lens unit 222c, the change in the optical path may be widely secured in the actual image sensor unit.

Figure 27:
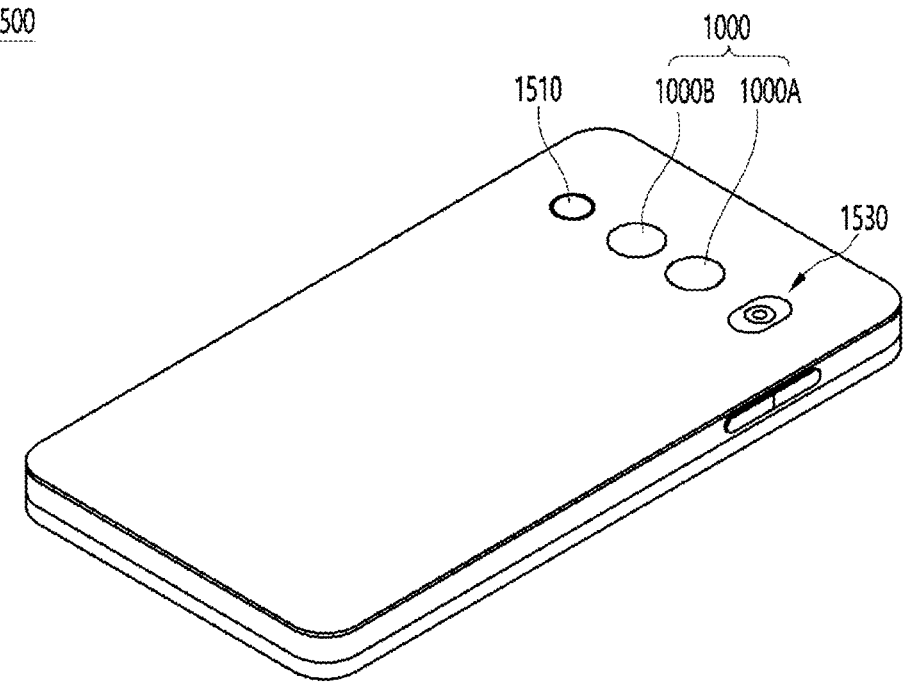
FIG. 27 is a perspective view of a mobile terminal to which a camera module according to an embodiment is applied.

Next, FIG. 27 is a perspective view of a mobile terminal to which a camera module according to an embodiment is applied.

As shown in FIG. 27, the mobile terminal 1500 according to the embodiment may include a camera module 1000, a flash module 1530, and an autofocus device 1510 provided on a back surface.

The camera module 1000 may include an image capturing function and an autofocus function. For example, the camera module 1000 may include an autofocus function using an image.

The camera module 1000 processes a still image or a moving image frame obtained by an image sensor in a photographing mode or a video call mode. The processed image frame may be displayed on a predetermined display unit, and may be stored in a memory. A camera (not shown) may be disposed on a front surface of the body of the mobile terminal.

For example, the camera module 1000 may include a first camera module 1000A and a second camera module 1000B, and OIS may be implemented together with an AF or zoom function by the first camera module 1000A. For example, the first camera module 1000A may include the first camera actuator that functions as the AF or zoom function and the second camera actuator that functions as the OIS function.

The flash module 1530 may include a light-emitting device that emits light therein. The flash module 1530 may be operated by a camera operation of a mobile terminal or by user control.

The autofocus device 1510 may include one of packages of a surface emitting laser element as a light-emitting unit.

The autofocus device 1510 may include an autofocus function using a laser. The autofocus device 1510 may be mainly used in a condition in which an autofocus function using an image of the camera module 1000 is deteriorated, for example, in a close environment of 10 m or less or a dark environment. The autofocus device 1510 may include a light-emitting unit including a vertical cavity surface emitting laser (VCSEL) semiconductor device, and a light receiving unit that converts light energy into electric energy such as a photodiode.

INDUSTRIAL APPLICABILITY

Figure 28:
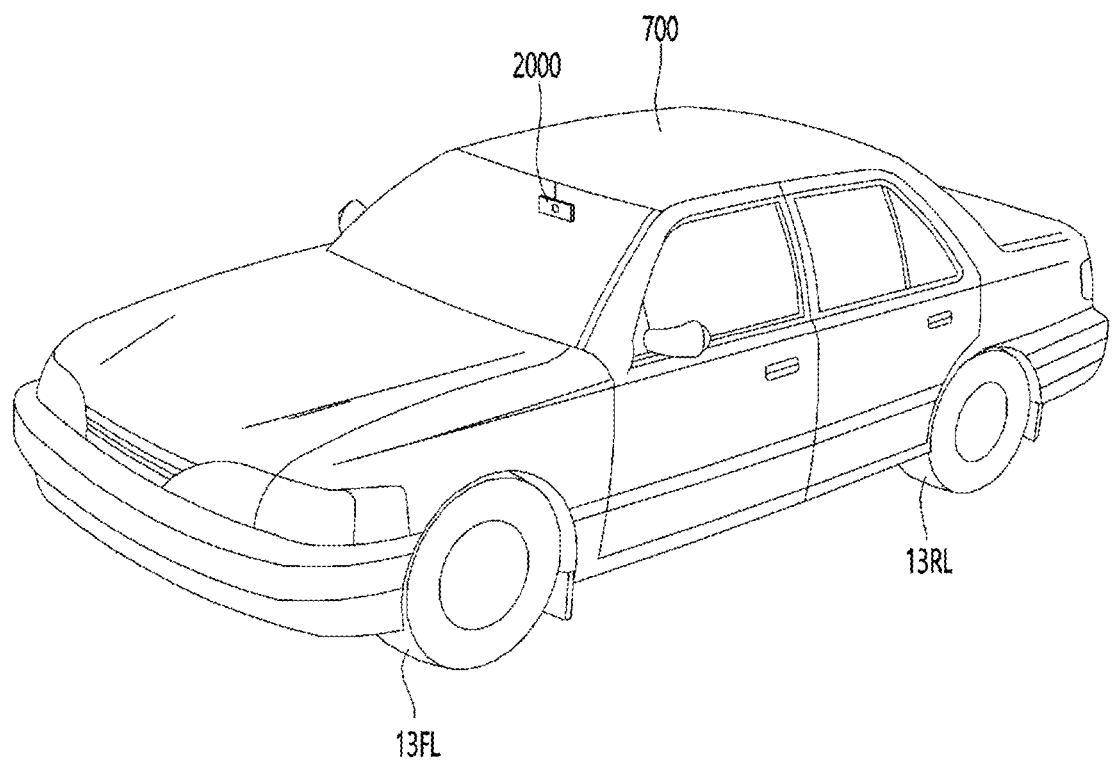
FIG. 28 is a perspective view of a vehicle to which the camera module according to an embodiment is applied.

FIG. 28 is a perspective view of a vehicle 700 to which a camera module according to an embodiment is applied.

For example, FIG. 28 is an appearance view of a vehicle having a vehicle driving assistance device to which a camera module 1000 according to the embodiment is applied.

Referring to FIG. 28, the vehicle 700 according to the embodiment may include wheels 13FL and 13FR that rotate by a power source, and a predetermined sensor. The sensor may be a camera sensor 2000, but the embodiment is not limited thereto.

The camera sensor 2000 may be a camera sensor to which the camera module 1000 according to the embodiment is applied.

The vehicle 700 according to the embodiment may acquire image information through the camera sensor 2000 that photographs a front image or a surrounding image, and may determine an unidentified situation of a lane by using the image information and generate a virtual lane at the time of unidentification.

For example, the camera sensor 2000 may acquire the front image by photographing a front of the vehicle 700, and a processor (not shown) may acquire the image information by analyzing an object included in the front image.

For example, when an object such as a lane, a neighboring vehicle, a traveling obstacle, and a median strip, a curb, and a street tree corresponding to an indirect road marking is photographed in an image photographed by the camera sensor 2000, the processor detects such an object to include in the image information.

In this case, the processor may acquire distance information with the object detected through the camera sensor 2000 to further complement the image information. The image information may be information about an object captured in the image.

Such a camera sensor 2000 may include an image sensor and an image processing module. The camera sensor 2000 may process a still image or moving image obtained by the image sensor (e.g., CMOS or CCD). The image processing module may process the still image or moving image acquired through the image sensor to extract necessary information, and may transmit the extracted information to the processor.

At this time, the camera sensor 2000 may include a stereo camera so as to improve the measurement accuracy of the object and to secure more information such as a distance between the vehicle 700 and the object, but the embodiment is not limited thereto.

According to the embodiment, there is a technical effect that it is possible to provide a camera actuator capable of inhibiting a magnetic field interference with a magnet for AF or Zoom and a camera module including the same when the OIS is implemented.

For example, according to the embodiment, when the OIS is implemented, the first driving part 72M, which is a magnet driving part, is disposed on the second camera actuator 200 separated from the first camera actuator 100, and thus there is a technical effect that that it is possible to provide a camera actuator capable of inhibiting a magnetic field interference with a magnet for AF or Zoom and a camera module including the same.

Thus, according to the embodiment, when a vehicle vibration occurs when a camera module is applied to an advanced driver assistance system (ADAS) of a vehicle, it is possible to provide a camera actuator capable of implementing OIS technology with high data precision and a camera module including the same.

For example, according to the embodiment, when the camera module is applied to the advanced driver assistance system (ADAS) of the vehicle, the first driving part 72M, which is a magnet driving part, is disposed on the second camera actuator 200, so that a magnetic field interference with the first magnet 116 or the second magnet 126 for AF or Zoom of the first camera actuator 100 may be inhibited, and accordingly, it is possible to provide a camera actuator capable of implementing OIS technology with high data precision when vehicle vibration occurs, and a camera module including the same.

For example, according to the embodiment, the first driving part 72M, which is the magnet driving part, is disposed in a first side direction of the housing 210 in the second camera actuator 200, and the fourth driving part 160 including the first magnet 116 and the second magnet 126 is disposed in the first camera actuator 100 disposed in a direction opposite to the first side direction so that magnetic field interference between the first driving part 72M and the fourth driving part 160 is inhibited, and accordingly, there is a technical effect capable of implementing OIS technology with high data precision when vehicle vibration occurs.

The characteristics, structures and effects described in the embodiments above are included in at least one embodiment but are not limited to one embodiment. Furthermore, the characteristics, structures, effects, and the like illustrated in each of the embodiments may be combined or modified even with respect to other embodiments by those of ordinary skill in the art to which the embodiments pertain. Thus, it would be construed that contents related to such a combination and such a modification are included in the scope of the embodiments.

The above description has been focused on the embodiment, but it is merely illustrative and does not limit the embodiment. A person skilled in the art to which the embodiment pertains may appreciate that various modifications and applications not illustrated above are possible without departing from the essential features of the embodiment. For example, each component particularly represented in the embodiment may be modified and implemented. In addition, it should be construed that differences related to such changes and applications are included in the scope of the present invention defined in the appended claims.

The invention claimed is:

1. A camera actuator comprising:
a housing;
a base coupled to the housing and on which a lens assembly is disposed;
a shaper unit disposed in the housing;
a first driving part coupled to the shaper unit and including a magnet;
a second driving part disposed on the housing and including a coil; and
a prism unit coupled to the housing,
wherein the housing includes a housing body having an opening and a housing side portion extending from the housing body,
wherein the housing side portion includes a first driving part hole formed in a region facing the first driving part,
wherein the second driving part is disposed in the first driving part hole,
wherein the first driving part overlaps the prism unit in a direction perpendicular to an optical axis, and
wherein the shaper unit includes:
a shaper body including a hole;
a lens unit disposed on the shaper body; and
four protrusions extending laterally from the shaper body, spaced apart from each other and coupled to the first driving part.

2. The camera actuator of claim 1, comprising:
a guide pin coupled to the base;
a third driving part including a coil and disposed on the base; and
a fourth driving part including a magnet configured to move along the guide pin.

3. The camera actuator of claim 2, wherein the first driving part is disposed in a first side direction of the housing, and
wherein the fourth driving part is disposed on the base in a direction opposite to the first side direction.

4. The camera actuator of claim 2, wherein the lens assembly includes first and second lens assemblies configured to move along the guide pin, and
wherein the fourth driving part includes a first magnet disposed on the first lens assembly and a second magnet disposed on the second lens assembly.

5. The camera actuator of claim 4, wherein the third driving part includes a third-first driving part facing the first magnet and a third-second driving part facing the second magnet.

6. The camera actuator of claim 1, wherein the lens unit includes a tunable prism or a liquid lens.

7. The camera actuator of claim 1, wherein the prism unit includes a fixed prism.

8. The camera actuator of claim 1, wherein the housing includes a plurality of jig holes respectively overlapping the four protrusions of the shaper body,
wherein the housing includes an opening through which light passes, and
wherein the opening in the housing is formed between the plurality of jig holes.

9. The camera actuator of claim 1, wherein the shaper unit includes a coupling groove to which the first driving part is coupled.

10. A camera actuator comprising:
a first camera actuator configured to perform a zooming function; and
a second camera actuator that is disposed on one side of the first camera actuator and configured to perform an OIS function,
wherein the first camera actuator includes:
a base on which an optical system is disposed,
a guide pin coupled to the base,
a third driving part including a coil and disposed on the base; and
a fourth driving part including a magnet and configured to move along the guide pin,
wherein the second camera actuator includes:
a housing;
a shaper unit disposed in the housing;
a first driving part disposed on the housing, coupled to the shaper unit, and including a magnet;
a second driving part including a coil and disposed on the housing outside the first driving part; and
a prism unit disposed on the shaper unit,
wherein the shaper unit includes:
a shaper body including a hole;
a lens unit disposed on the shaper body; and
four protrusions extending laterally from the shaper body, spaced apart from each other and coupled to the first driving part, and
wherein the prism unit includes a fixed prism.

11. The camera actuator of claim 10, wherein the third driving part is a coil driving part, and includes a third-first driving part and a third-second driving part,
wherein the fourth driving part includes a first magnet and a second magnet,
wherein the first driving part is disposed in a first side direction of the housing in the second camera actuator, and
wherein the fourth driving part including the first magnet and the second magnet is disposed in the first camera actuator in a direction opposite to the first side direction.

12. The camera actuator of claim 11, wherein the lens unit of the second camera actuator includes a tunable prism or a liquid lens,
wherein the first camera actuator includes a second circuit board disposed on a sidewall of the base and a gyro sensor disposed on the second circuit board, and
wherein the second circuit board is disposed extending in a vertical axis direction on a horizontal coordinate plane perpendicular to an optical axis.

13. The camera actuator of claim 12, comprising:
a shield can disposed on an outer surface of the base of the first camera actuator,
wherein the shield can includes a support bracket and a guide groove disposed on the support bracket and having the gyro sensor disposed therein.

14. The camera actuator of claim 13, wherein the gyro sensor is spaced apart from the second camera actuator and is disposed perpendicular to a side surface of the first camera actuator.

15. The camera actuator of claim 11, wherein the housing includes a plurality of jig holes respectively overlapping the four protrusions of the shaper body.

16. The camera actuator of claim 15, wherein the housing includes an opening through which light passes, wherein the opening in the housing is formed between the plurality of jig holes.

17. The camera actuator of claim 11, wherein the shaper unit includes a coupling groove to which the first driving part is coupled.

18. The camera actuator of claim 10, wherein the first driving part overlaps the prism unit in a direction perpendicular to an optical axis.

* * * * *